United States Patent
Holson et al.

(10) Patent No.: US 12,436,546 B2
(45) Date of Patent: Oct. 7, 2025

(54) SYSTEMS AND METHODS FOR AN AUTONOMOUS MOBILE ROBOT FLEET COORDINATION

(71) Applicant: Robust AI, Inc., San Carlos, CA (US)

(72) Inventors: Benjie Holson, Sunnyvale, CA (US); Anthony Sean Jules, Hillsborough, CA (US); Kyle Wray, Jamaica Plain, MA (US); Marina Kolmitz, Freiburg (DE); Jamie Luong, San Mateo, CA (US); Justine Rembisz, San Carlos, CA (US); Heather Klaubert, San Jose, CA (US); Rodney Allen Brooks, San Francisco, CA (US); Leila Takayama, Palo Alto, CA (US)

(73) Assignee: Robust AI, Inc., San Carlos, CA (US)

( * ) Notice: Subject to any disclaimer, the term of this patent is extended or adjusted under 35 U.S.C. 154(b) by 0 days.

(21) Appl. No.: 18/819,180

(22) Filed: Aug. 29, 2024

(65) Prior Publication Data
US 2025/0278100 A1    Sep. 4, 2025

Related U.S. Application Data

(63) Continuation-in-part of application No. 18/655,609, filed on May 6, 2024.
(Continued)

(51) Int. Cl.
*G05D 1/69* (2024.01)
*G05D 1/622* (2024.01)
(Continued)

(52) U.S. Cl.
CPC ............ *G05D 1/69* (2024.01); *G05D 1/622* (2024.01); *G05D 1/667* (2024.01); *G05D 1/686* (2024.01);
(Continued)

(58) Field of Classification Search
CPC .......... G05D 1/69; G05D 1/667; G05D 1/622; G05D 1/686
See application file for complete search history.

(56) References Cited

U.S. PATENT DOCUMENTS

| 4,028,135 A | 6/1977 | Vig |
| 6,408,230 B2 | 6/2002 | Wada |
| (Continued) | | |

FOREIGN PATENT DOCUMENTS

| JP | 2018140692 A | * 9/2018 | ............. B62B 5/003 |
| JP | 2021175631 | 11/2021 | |
| (Continued) | | | |

OTHER PUBLICATIONS

English WIPO translation of JP-2018140692-A (Year: 2018).*
(Continued)

*Primary Examiner* — Thomas E Worden
*Assistant Examiner* — Christopher A Buksa
(74) *Attorney, Agent, or Firm* — Polygon IP, LLP

(57) ABSTRACT

A computing system may be configured as a fleet controller for autonomous mobile robots operating within a physical environment. The system may include a communication interface receiving sensor data from the robots including image data captured by visible light cameras located on the robots, an environment mapper determining a global scene graph representing the environment and identifying navigable regions of the environment, a workflow coordinator determining a workflow including tasks to be performed within the environment by one or more of the robots in cooperation with a human, and a route planner configured to determine routing information for the one or robots including a nominal route from a source location to a destination
(Continued)

location. The robots may be configured to autonomously navigate the environment to execute the tasks based on the routing information.

20 Claims, 38 Drawing Sheets

Related U.S. Application Data

(60) Provisional application No. 63/571,352, filed on Mar. 28, 2024, provisional application No. 63/560,381, filed on Mar. 1, 2024.

(51) Int. Cl.
    *G05D 1/667*     (2024.01)
    *G05D 1/686*     (2024.01)
    *G05D 105/20*     (2024.01)
    *G05D 107/70*     (2024.01)
    *G05D 111/10*     (2024.01)

(52) U.S. Cl.
    CPC ..... *G05D 2105/20* (2024.01); *G05D 2107/70* (2024.01); *G05D 2111/10* (2024.01)

(56) References Cited

U.S. PATENT DOCUMENTS

| | | | |
|---|---|---|---|
| 6,853,877 | B1 | 2/2005 | Slater |
| 6,865,446 | B2 | 3/2005 | Yokono |
| 6,925,679 | B2 | 8/2005 | Wallach |
| 8,428,781 | B2 | 4/2013 | Chang |
| 8,909,370 | B2 | 12/2014 | Stiehl |
| 9,757,486 | B2 | 9/2017 | Dobrinsky |
| 10,279,476 | B2 | 5/2019 | Jaekel |
| 10,793,291 | B2 | 10/2020 | Brown |
| 10,919,555 | B1 | 2/2021 | Spruill |
| 11,099,562 | B1 | 8/2021 | Ebrahimi Afrouzi |
| 11,548,159 | B1 | 1/2023 | Ebrahimi Afrouzi |
| 11,858,573 | B2 | 1/2024 | Lee |
| 2007/0080000 | A1 | 4/2007 | Tobey |
| 2008/0106374 | A1 | 5/2008 | Sharbaugh |
| 2008/0197226 | A1 | 8/2008 | Cooper |
| 2010/0234993 | A1 | 9/2010 | Seelinger |
| 2012/0305787 | A1 | 12/2012 | Henson |
| 2013/0008734 | A1 | 1/2013 | Swasey |
| 2015/0088310 | A1 | 3/2015 | Pinter |
| 2015/0125252 | A1 | 5/2015 | Berzen Ratzel |
| 2016/0271803 | A1 | 9/2016 | Stewart |
| 2016/0317690 | A1 | 11/2016 | Dayton |
| 2016/0354931 | A1 | 12/2016 | Jones |
| 2017/0001656 | A1 | 1/2017 | Katayama |
| 2017/0049915 | A1 | 2/2017 | Brais |
| 2017/0080117 | A1 | 3/2017 | Gordon |
| 2017/0097232 | A1 | 4/2017 | Anderson-Sprecher |
| 2017/0246331 | A1 | 8/2017 | Lloyd |
| 2018/0001946 | A1 | 1/2018 | Yokoya |
| 2018/0101179 | A1 | 4/2018 | Louey |
| 2018/0104368 | A1 | 4/2018 | Dobrinsky |
| 2018/0116479 | A1 | 5/2018 | Gilbert, Jr. |
| 2018/0161986 | A1 | 6/2018 | Kee |
| 2018/0354539 | A1 | 12/2018 | Casey |
| 2019/0217477 | A1 | 7/2019 | Paepcke |
| 2019/0219409 | A1 | 7/2019 | Tan |
| 2019/0224853 | A1 | 7/2019 | Gewecke |
| 2019/0270375 | A1 | 9/2019 | Newell |
| 2020/0061839 | A1* | 2/2020 | Deyle ............... G06Q 10/087 |
| 2020/0086487 | A1 | 3/2020 | Johnson |
| 2020/0094418 | A1 | 3/2020 | Mika |
| 2020/0148520 | A1 | 5/2020 | Luo |
| 2020/0164737 | A1 | 5/2020 | Kozlenok |
| 2020/0189120 | A1 | 6/2020 | Weaver |
| 2020/0401133 | A1 | 12/2020 | Armbrust |
| 2021/0053207 | A1 | 2/2021 | Romanov |
| 2021/0138912 | A1 | 5/2021 | Yamasaki |
| 2021/0155464 | A1 | 5/2021 | Takai |
| 2021/0178001 | A1 | 6/2021 | Bonutti |
| 2021/0179403 | A1 | 6/2021 | Nakamura |
| 2021/0259497 | A1 | 8/2021 | Park |
| 2021/0379952 | A1 | 12/2021 | Zhou |
| 2022/0088237 | A1 | 3/2022 | Hauser |
| 2022/0194763 | A1 | 6/2022 | Canuto Gil |
| 2023/0050980 | A1 | 2/2023 | Zahdeh |
| 2023/0101404 | A1 | 3/2023 | Lee |
| 2023/0191589 | A1 | 6/2023 | Lee |
| 2024/0004391 | A1 | 1/2024 | Galluzzo |

FOREIGN PATENT DOCUMENTS

| | | |
|---|---|---|
| WO | 2018233853 A1 | 12/2018 |
| WO | 2018233858 A1 | 12/2018 |

OTHER PUBLICATIONS

Costa et al., "Designing for Uniform Mobility Using Holonomicity," 2017 IEEE International Conference on Robotics and Automation (ICRA) Singapore, May 29-Jun. 3, 2017.

Huang, Feixiang; Robotic Delivery System for Material Handling [Master's Thesis, University of Akron], Dec. 2014.

Jones et al., "Design and Evaluation of Magnetic Hall Effect Tactile Sensors for Use in Sensorized Splints," Sensors, Feb. 19, 2020, 20, 1123.

Int'l Application Serial No. PCT/US21/24416, Int'l Search Report and Written Opinion mailed Jun. 10, 2021.

Mobile Autonomous Robotic Cart 3 Series Overview, 3 Series Data Sheet v220301A, retrieved on Jul. 22, 2022, https://www.multechnologies.com/hubfs/manuals/MARC_3_Series_data_sheet_2203a.pdf.

Nasab et al., "Design and development of a multi-axis force sensor based on the hall effect with decouple structure," Mechatronics, vol. 84, Jun. 2022.

Nie et al., "A Soft Four Degree-of-Freedom Load Cell Based on the Hall Effect," IEEE Sensors Journal, vol. 17, No. 22, Nov. 15, 2017.

Office Action (Non-Final Rejection) dated Feb. 10, 2023 for U.S. Appl. No. 17/207,195 (pp. 1-18).

Office Action (Non-Final Rejection) dated Sep. 14, 2023 for U.S. Appl. No. 17/207,204 (pp. 1-21).

Office Action (Non-Final Rejection) dated Sep. 28, 2023 for U.S. Appl. No. 17/208,672 (pp. 1-15).

Office Action (Non-Final Rejection) dated Dec. 19, 2023 for U.S. Appl. No. 17/538,668 (pp. 1-31).

Office Action (Notice of Allowance and Fees Due (PTOL-85)) dated Mar. 4, 2024 for U.S. Appl. No. 17/208,672 (pp. 1-9).

Office Action (Notice of Allowance and Fees Due (PTOL-85)) dated Jun. 12, 2023 for U.S. Appl. No. 17/207,195 (pp. 1-8).

Office Action (Notice of Allowance and Fees Due (PTOL-85)) dated Jul. 2, 2024 for U.S. Appl. No. 17/538,668 (pp. 1-8).

Office Action dated May 22, 2024 for U.S. Appl. No. 18/622,640 (pp. 1-13).

Rakovic et al., "3-Axis Contact Force Fingertip Sensor Based on Hall Effect Sensor," Advances in Robot Design and Intelligent Control. RAAD, Nov. 2016.

Scholz, Jonathan et al.; Cart Pushing with a Mobile Manipulation System: Towards Navigation with Moveable Objects, retrieved on Jul. 7, 2022, https://www.cs.cmu.edu/~maxim/files/cartplanner_icra11.pdf.

Shenawy et al., "Comparing Different Holonomic Mobile Robots," Oct. 2007 IEEE International Conference on Systems, Man and Cybernetics, Montreal, QC, Canada, pp. 1584-1589.

Temizer et al., "Holonomic planar motion from non-holonomic driving mechanisms: The Front-Point Method," Proc. SPIE 4573, Mobile Robots XVI, (Feb. 18, 2002).

Tomo et al., "Design and Characterization of a Three-Axis Hall Effect-Based Soft Skin Sensor," Sensors, Apr. 7, 2016; 16(4):491.

Tomo et al., "Development of a Hall-Effect Based Skin Sensor," IEEE Sensors, Busan, Korea (South), Nov. 1-4, 2015.

Wada et al., "Caster Drive Mechanisms for Holonomic and Omnidirectional Mobile Platforms with No. Over Constraint," Proceed-

(56) References Cited

OTHER PUBLICATIONS ings of the 2000 IEEE International Conference on Robotics & Automation San Francisco, CA Apr. 2000.

Wang, Ziyu; Autonomous Robotic Cart for Food Delivery on Airplane, [Master's Thesis, NYU Tandon School of Engineering], Fall 2017, retrieved on Jul. 22, 2022 http://engineering.nyu.edu/mechatronics/projects/MSprojects/2017-2018/4/report.pdf.

Int'l Application Serial No. PCT/US22/79883 Int'l Search Report and Written Opinion mailed Feb. 3, 2023.

Notice of Allowance dated Sep. 18, 2024 for U.S. Appl. No. 18/622,640 (pp. 1-10).

Office Action dated Oct. 18, 2024 for U.S. Appl. No. 18/795,630 (pp. 1-14).

* cited by examiner

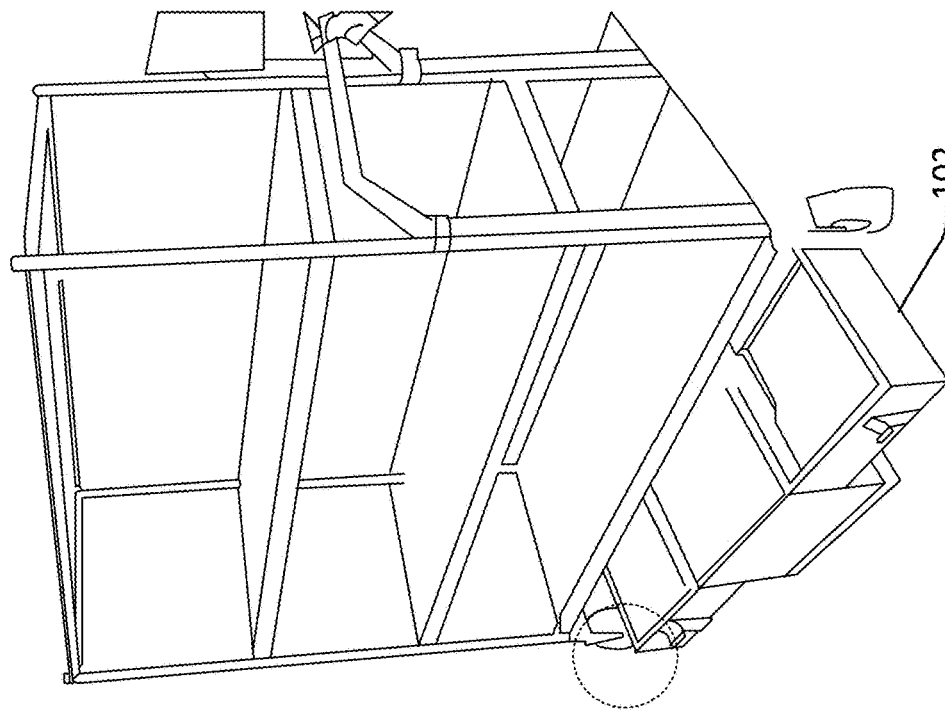
Figure 10C
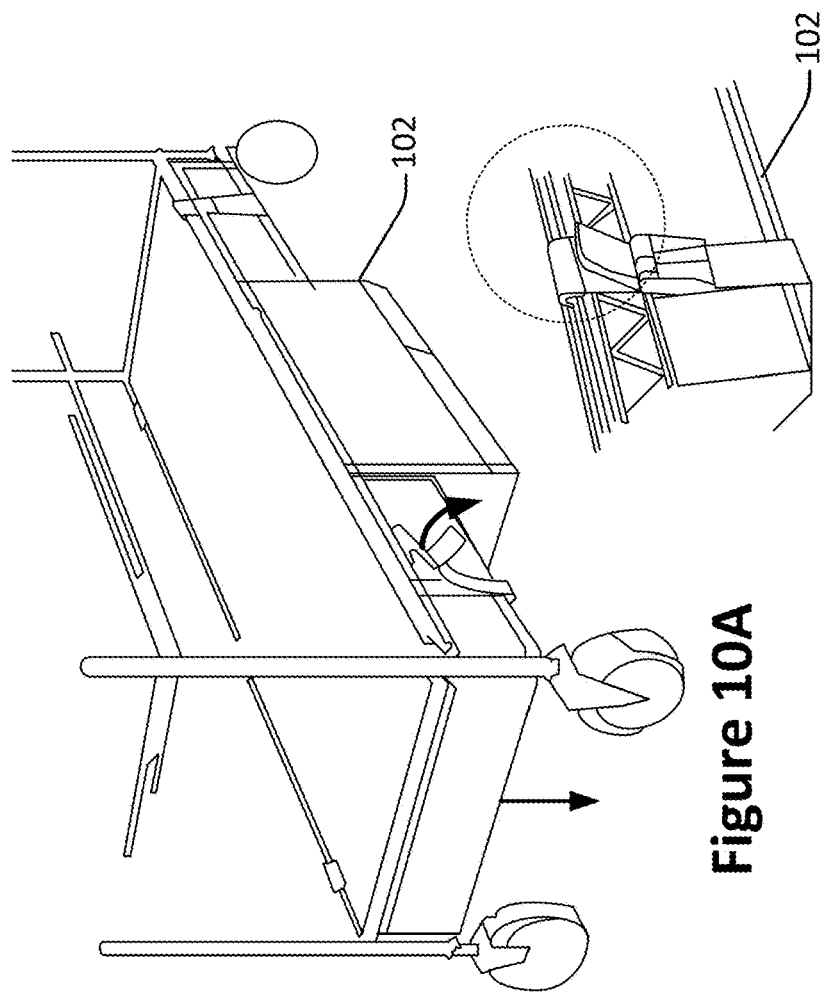
Figure 10B
Figure 10A

SYSTEMS AND METHODS FOR AN AUTONOMOUS MOBILE ROBOT FLEET COORDINATION

CROSS-REFERENCE TO RELATED APPLICATIONS

This application claims priority to of U.S. Provisional Patent Application 63/560,381 filed on Mar. 1, 2024 by Jules et al., titled "AUTONOMOUS MOBILE ROBOT", and to U.S. patent application Ser. No. 18/655,609, filed May 6, 2024 by Luong et al., titled "Autonomous Robot with Force Sensing User Handlebar", which claims priority to U.S. Provisional Patent Application 63/571,352 by Luong et al., titled: "Autonomous Robot with Force Sensing User Handlebar", filed on Mar. 28, 2024, all of which are incorporated herein by reference in their entirety and for all purposes.

FIELD OF TECHNOLOGY

This patent application relates generally to robotics, and more specifically to autonomous mobile robots.

BACKGROUND

Autonomous and semi-autonomous robots can be operated without user input, but in some situations user operation is desirable. User operation of autonomous and semi-autonomous robots may be achieved through a control interface, such as a graphical user interface to allow a user to control the autonomous or semi-autonomous robot from the point of view of the robot. However, autonomous and semi-autonomous robots may operate in environments with other human workers. Such workers may not be specifically tasked with operating the autonomous and semi-autonomous robots and may not include specific devices to do so, but may still find themselves in situations where they may need to operate such autonomous and semi-autonomous robots. Accordingly, improved mechanisms and techniques for autonomous robots capable of being controlled by humans are desired.

SUMMARY

Techniques and mechanisms described herein provide systems, methods, and non-transitory computer readable media having instructions stored thereon for an autonomous mobile robot.

According to various embodiments, a computing system may be configured as a fleet controller for a plurality of autonomous mobile robots operating within a physical environment. The computing system may include a communication interface, a workflow coordinator, a route planner, and an environment mapper. The communication interface may be configured to receive sensor data from the plurality of autonomous mobile robots. The sensor data may include image data captured by a plurality of visible light cameras located on the autonomous mobile robots. The environment mapper may be configured to determine a global scene graph representing the physical environment based at least in part on the sensor data. The global scene graph may identify navigable regions of the physical environment. The workflow coordinator may be configured to determine a workflow based on the global scene graph. The workflow may include a plurality of tasks to be performed within the physical environment by one or more autonomous mobile robots of the plurality of autonomous mobile robots in cooperation with a human. The plurality of tasks may include autonomous navigation by the one or more autonomous mobile robots. The route planner may be configured to determine routing information for the one or more autonomous mobile robots. The routing information may include a nominal route from a source location to a destination location. The one or more autonomous mobile robots may be configured to autonomously navigate the physical environment to execute the plurality of tasks based at least in part on the routing information.

In some embodiments, the physical environment is a warehouse. The workflow may involve retrieving or replenishing items stored in the warehouse.

In some implementations, the tasks may include autonomously navigating a warehouse in coordination with the human to facilitate transfer of the plurality of items between a plurality of storage locations in the warehouse and the one or more autonomous mobile robots. The plurality of tasks may include activating one or more lighting elements at the one or more autonomous mobile robots to indicate a location of an item of the plurality of items. Alternatively, or additionally, the plurality of tasks may include autonomously following the human.

In some embodiments, the plurality of tasks includes coordinating movement between two or more autonomous mobile robots included in the workflow. The tasks may include facilitating the transfer of some or all of the plurality of items from a first autonomous mobile robot to a second autonomous mobile robot. Alternatively, or additionally, the tasks may include instructing the two or more autonomous mobile robots to act together as a virtual pick wall or a virtual put wall.

In some implementations, the tasks may include receiving scanner data or weight sensor data indicating that an item of the plurality of items has been scanned or moved by the human.

In some implementations, an autonomous mobile robot of the one or more autonomous mobile robots is configured to update a local scene graph representing the physical environment based at least in part on the sensor data. Autonomously navigating the physical environment may involve avoiding obstacles based on the local scene graph.

In some embodiments, the nominal route includes a plurality of waypoints indicated within the global scene graph and corresponding to locations in the physical environment.

In some implementations, the global scene graph is determined based on a knowledge map that represents locations of elements within the physical environment over time.

In some embodiments, an autonomous mobile robot of the one or more autonomous mobile robots includes a handlebar unit coupled with a chassis. The handlebar unit may include a handlebar and a force sensor configured to detect a translational force and a rotational force exerted on the handlebar. The autonomous mobile robot may include a mechanical drive unit configured to move the autonomous mobile robot in a direction determined based on the translational force and the rotational force. The mechanical drive unit may be holonomic, omnidirectional, and backdriveable.

BRIEF DESCRIPTION OF THE DRAWINGS

The included drawings are for illustrative purposes and serve only to provide examples of possible structures and operations for the disclosed inventive systems, apparatus, methods, and computer program products for an autonomous mobile robot. These drawings in no way limit any changes in form and detail that may be made by one skilled in the art without departing from the spirit and scope of the disclosed implementations.

FIG. 10A, FIG. 10B, and FIG. 10C illustrate perspective views of portions of an autonomous mobile robot, configured in accordance with one or more embodiments.

DETAILED DESCRIPTION

Introduction

Figure 1:
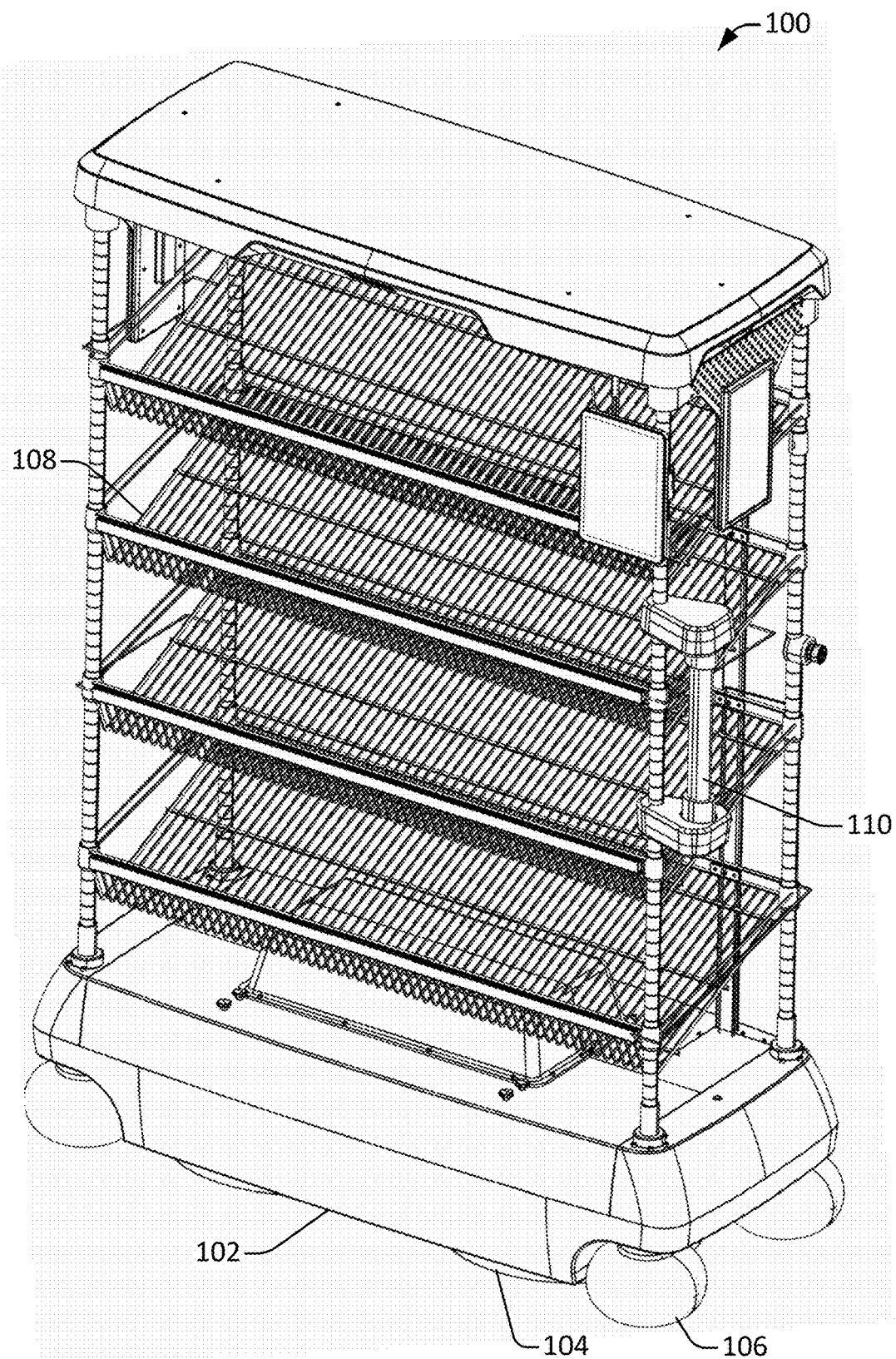
FIG. 1 illustrates a perspective view of an autonomous robot, configured in accordance with one or more embodiments.

Techniques and mechanisms described herein provide for the coordination and control of a fleet of autonomous mobile robots to perform workflows in coordination with humans. For example, autonomous mobile robots operating in a warehouse environment may coordinate with humans to move items within the warehouse environment. According to various embodiments, a workflow executed by an autonomous mobile robot in coordination with a human may include tasks such as autonomously navigating to a location proximate to the human, following the human as the human moves through the environment, indicate to the human the locations of items that need to be transferred and the locations to which to transfer the items, and the like.

According to various embodiments, providing coordination and control of a fleet of autonomous mobile robots may involve aggregating sensor data from the autonomous mobile robots to construct a global scene graph representing the environment. The global scene graph may indicate the locations of elements of the environment in a manner that supports reasoning about the actions of robots and humans within the environment. For instance, items in a set of orders to be picked from a warehouse may be divided into logical groupings based on geographic proximity. Then, one or more robots may be selected to coordinate with one or more humans to retrieve a group of items included in a group. The one or more robots may be provided with nominal routing information that identifies waypoints that may be traversed by the one or more robots to reach locations in the physical environment. Thus, workflows determined in accordance with techniques and mechanisms described herein can reflect a complex combination of factors, including high-level instructions (e.g., workflow assignments, task assignments, nominal routing paths, etc.) determined by a fleet management system, low-level instructions (e.g., navigation, obstacle avoidance, etc.) determined and executed by one or more robots based on both the high-level instructions and localized information such as user input and sensor data, and human interactions (e.g., object movement, user input, etc.).

Techniques and mechanisms described herein provide for an autonomous mobile robot configured to operate in cooperation with people. In some embodiments, the autonomous mobile robot may be configured as a cart capable of transporting one or more objects. The robot may operate in one of various modes. For example, in an autonomous mode the robot may operate without physical human intervention, for instance autonomously moving from one location to another and/or performing various types of tasks. As another example, in a robot-guided mode, the robot may direct a human to perform a task, such as guiding a human from one location to another. As another example, in a person-guided mode, the robot may operate in a manner responsive to human guidance. The robot may be configured to seamlessly switch between such modes, for instance with the aid of computer vision, user interaction, and/or artificial intelligence.

In some embodiments, an autonomous mobile robot may be configured for operation in a warehouse environment. For example, the robot may be equipped and configured to perform and support warehouse operations such as item picking, item transport, and item replenishment workflows. As another example, the robot may be equipped to perform automated item pickup and/or dropoff, for instance via one or more arms or conveyer belts. As still another example, the robot may be equipped to perform automated charging and/or battery swapping. As yet another example, the robot may be equipped to autonomously navigate to a particular location, follow a user, respond to user instructions, amplify a force exerted on the robot by a user, and/or perform other types of operations. The robot may be adapted to site-specific environmental conditions and/or processes.

The robot may include a drive assembly to provide motive power. In some embodiments, the drive assembly may include one or more drive units, with each drive unit orientable in an independent manner to that of the other drive units. Each drive unit may include a plurality of driven wheels that may be independently driven. Independent drive of each of the drive wheels of the drive assembly allows for the drive assembly to move the robot in a holonomic manner. That is, the robot may be driven without constraints in direction of motion.

In some embodiments, the robot may include a force sensing assembly to allow for a user to manipulate the robot. The force sensing assembly may include, for example, a handlebar. The handlebar may be mounted in any orientation, such as in a horizontally or vertically mounted orientation. Additionally or alternatively, the force sensing assembly may be a force sensing base or another mechanism configured to receive physical input from a user (e.g., a hand, arm, foot, or leg of a user).

In some implementations, a user may manipulate the force sensing assembly by, for example, providing force to a handlebar to move the handlebar from a neutral position. The manipulation of the force sensing assembly may provide instructions to the robot and cause the drive assembly to move the robot in accordance with the instructions provided via the force sensing assembly. Such commands may, for example, override autonomous or semi-autonomous operation of the robot.

Techniques and mechanisms described herein also provide for control of a robot, which may be one or more of omnidirectional, holonomic, backdrivable, and autonomous. Input may be received from a force sensor identifying a force exerted on the force sensor. Based on this input, a physical input force vector quantifying a force exerted on the force sensor in two or more dimensions may be determined. A force output vector may be determined by combining the physical input force vector with a second force input vector. The force output vector may quantify a force to apply to move the robot in another direction. The second force input vector may include, for instance, a frictional force and/or a functional force determined based on one or more operational objectives. The force output vector may include a force multiplier multiplying the physical force exerted on the force sensor. An indication of the force output vector may be sent to a mechanical drive unit at the robot and then used to direct the movement of the robot via the mechanical drive unit.

In some embodiments, an autonomous mobile robot may support omnidirectional movement. That is, the autonomous mobile robot may be capable of movement in any direction.

In some embodiments, an autonomous mobile robot may support holonomic movement. That is, the autonomous mobile robot may be capable of powered movement in any direction corresponding with a degree of freedom associated with the robot. For instance, a conventional automobile is not holonomic because it has three motion degrees of freedom (i.e., x, y, and orientation) but only two controllable degrees of freedom (i.e., speed and steer angle). In contrast, a conventional train is holonomic because has one controllable degree of freedom (i.e., speed) and one motion degree of freedom (i.e., position along the track).

In some embodiments, an autonomous mobile robot may support omnidirectional and holonomic movement. That is, the autonomous mobile robot may be capable of powered movement and rotation in any direction from any position.

In some embodiments, an autonomous mobile robot may be backdriveable. That is, the drive unit may operate so as to maintain a desired force of interaction at a level close to zero. For instance, when pressure is exerted on the robot, even in an area other than the handlebar, the drive unit may operate to move the robot in a direction consistent with the force so as to reduce the force of interaction. For example, if a person were to exert 10 Newtons of force on a fixed object, such as a wall, the wall would exert an equal and opposite force on the person due to the wall's immobility, causing the person to experience 10 Newtons of force in the opposite direction of the force. In contrast, if a person were to exert 10 Newtons of force on a backdriveable autonomous mobile robot, the drive unit may cause the robot to move in the direction of the force at a speed such that the person would experience approximately 0 Newtons of force. The robot may be configured to control the drive unit to keep the level of force experienced by the operator below a designated threshold under normal operating conditions.

According to various embodiments, an autonomous mobile robot may synthesize various types of instructions and input to provide a seamless experience. In some configurations, an autonomous mobile robot may support one or more of the following mobility input mechanisms. First, an autonomous mobile robot may be backdriveable in the sense that the drive unit may operate to move in a direction to effectively cancel out force exerted on the robot from any direction. Second, an autonomous mobile robot may be responsive to force exerted on a force sensor, for instance by instructing the drive unit so as to multiply the exerted force in the direction of movement. Third, an autonomous mobile robot may respond to the presence of a human, for instance based on touch sensor and/or optical sensor data. As one example, a robot may cease autonomous movement and wait for more instructions when grasped or approached by a human. Fourth, an autonomous mobile robot may autonomously navigate along a nominal trajectory based on information determined at the autonomous mobile robot and/or information received from a remote computing device, such as a fleet controller. Fifth, an autonomous mobile robot may autonomously act in support of operational guidelines and objectives, for instance to avoid both static obstacles (such as walls) and dynamic obstacles (such as humans).

When using conventional techniques and mechanisms, onboarding autonomous mobile robots in an industrial setting takes a significant amount of time. In contrast, various embodiments described herein facilitate rapid onboarding. In some embodiments, an autonomous mobile robot can be on-boarded without bringing an autonomous mobile robot on-site for an initial survey. Such rapid deployment can significantly increase adoption speed. When using conventional techniques and mechanisms, even small changes to autonomous mobile robot configuration and workflows cannot be made in real time. In contrast, various embodiments described herein provide for easy adjustments to daily workflows without intervention by a technical support team.

When using conventional techniques and mechanisms, industrial autonomous mobile robots are typically configured with expensive hardware that is customized to particular environments. In contrast, various embodiments described herein provide for autonomous mobile robots may be configured with standardized hardware and software that is easily and cheaply applicable and adaptable to a range of environments.

When using conventional techniques and mechanisms, industrial autonomous mobile robots avoid people and typically treat them like objects. In contrast, various embodiments described herein provide for autonomous mobile robots that employ semantic perception to differentiate people from static objects and move around them intelligently. An autonomous mobile robot may thus perform and/or facilitate human-centric operations such as zone picking, human following, wave picking, a virtual conveyer belt, and user training. Such operations can increase human engagement and reduce the autonomous mobile robot's impact on foot traffic, for instance when its work is unrelated to people nearby.

When using conventional techniques and mechanisms, industrial autonomous mobile robots are difficult to troubleshoot, requiring trained employees or remote support resources to resolve issues. In contrast, various embodiments described herein provide for issue resolution by individuals using the autonomous mobile robots rather than experts with specialized training.

When using conventional techniques and mechanisms, industrial autonomous mobile robots typically provide limited interaction mechanisms. In contrast, various embodiments described herein provide for various types of user interaction mechanisms. For example, a user may interact with the autonomous mobile robot via a touch screen display and force-sensitive handlebars. Using such techniques, individuals may perform tasks such as moving heavy loads, teaching a fleet of autonomous mobile robots about new locations, and resolving issues without interacting with technical support services.

When using conventional techniques and mechanisms, autonomous mobile robots operate using centralized and cloud computing system architectures that increase cost and latency to the robots' ability to respond to rapidly changing warehouse environments. In contrast, various embodiments described herein provide for arms that employ localized processing systems such as neural network architectures. Such approaches provide for lower latency and improved performance, increasing the safety of the autonomous mobile robot and rendering it more responsive to both people and potential hazards in a physical environment.

When using conventional techniques and mechanisms, many industrial autonomous mobile robots rely on expensive LIDAR sensors that observe only a narrow slice of the surrounding environment in limited detail. In contrast, various embodiments described herein provide for autonomous mobile robots with detailed, three-dimensional views of the surrounding environment. Such configurations provide for greater safety, smarter movement and coordination, and deeper data-enabled interactions.

When using conventional techniques and mechanisms, autonomous mobile robots and automated guided vehicles treat people and dynamic objects (e.g., forklifts) as static obstacles to be avoided. In contrast, various embodiments described herein provide for autonomous mobile robots that differentiate between persistent, temporary, and in-motion objects, interacting with them fluidly and efficiently.

When using conventional techniques and mechanisms, an autonomous mobile robot cannot visually distinguish between different individuals. In contrast, various embodiments described herein provide for autonomous mobile robots that can respond to requests from particular individuals and navigate around an environment in more fluid, less disruptive ways. For instance, an autonomous mobile robot may be configured to follow a particular person around a warehouse environment upon request.

System Architecture

FIG. 1 illustrates a perspective view of an autonomous robot 100, configured in accordance with one or more embodiments. The autonomous robot 100 includes a drive assembly 102, a payload 108, and a force sensing assembly 110.

In some embodiments, the drive assembly 102 may include one or more drive units 104 and one or more payload support element 106. Each of the one or more drive units 104 may include one or more powered wheels. Each of the one or more drive units 104 may be configured to be operated, jointly or independently, to power autonomous robot 100 and provide movement to autonomous robot 100 in a backdrivable and holonomic manner.

According to various embodiments, the payload support element 106 may be one or more support features (e.g., castor wheels, sliding pads, and/or other structures that may provide stability while accommodating movement). The payload support element 106 may be disposed within portions of drive assembly 102 and/or coupled to portions of the payload 108 to provide stability for autonomous robot 100. In various embodiments, the payload support element 106 may be disposed or coupled to any portion of the drive assembly 102 and/or the payload 108 to provide stability. As described herein, "coupled" may refer to direct or indirect (e.g., with intermediate elements) relationships between elements while "connected" may refer to direct (e.g., with no intermediate elements) relationships between elements.

In some embodiments, the payload support element 106 may provide sufficient support for the payload 108 to allow for the one or more drive units 104 to be positioned in a manner to provide for predictable backdrivable and holonomic movement. For instance, the payload support element 106 may provide for stability while the payload 108 (which may include, for example, a shelf) is loaded or unloaded and/or while the autonomous robot 100 is in motion.

The drive assembly 102 may configured to couple to the payload 108 to move the payload 108. According to various embodiments, the drive assembly 102 may couple to the payload 108 via any technique. For example, one or more openings on a body, such as one or more portions of payload 108, may be inserted into one or more openings disposed within the body of drive assembly 102. As another example, one or more mechanical fasteners such as bolts, screws, and/or rivets may be employed. As still another example, permanent or semi-permanent techniques such as welding or adhesives may be used. As such, drive assembly 102 may be a module that may, in some embodiments, be coupled to any number of different versions of the payload 108.

In some configurations, the payload 108 may be a commercially available (e.g., off-the-shelf) utility body, such as a shelf. Alternatively, the payload 108 may be customized for use with the drive assembly 102.

According to various embodiments, the payload 108 may include any tool or assembly that may assist in operations. For example, the payload 108 may include one or more elements of a cart (which may include a mounted shelf), a mounted robot, a container box, and/or other such item. While description may be provided in the manner of autonomous carts and shelves, other embodiments of payload 108, such as assembly robots, are within the scope of the disclosure.

In some embodiments, the force sensing assembly 110 may include, for example, a vertically oriented handle (e.g., a handle with a major axis that is within 10 degrees of vertical) coupled to the autonomous robot 100 and communicatively coupled to the drive assembly 102. Other embodiments of the force sensing assembly 110 may include a handlebar oriented in another orientation (e.g., a horizontally oriented handle within 10 degrees of horizontal) a force sensing base (e.g., a base, such as the base of drive assembly 102, configured to receive input from a foot of a user) of autonomous robot 100, and/or other such mechanism or technique configured to receive directional input from a user. Such input may, for example, allow for the distinguishing of different types of inputs, such as inputs that are intended to cause the autonomous robot 100 to translate in a certain direction as well as inputs that are intended to cause the autonomous robot 100 to rotate in a certain direction.

In some embodiments, the robot may include one or more sensors for supporting whole body force sensing. Using a whole body force sensing approach, force exerted anywhere on the robot can be detected, even if not exerted on a handlebar connected with a force sensor. For example, the robot's drive unit may detect a force exerted on the robot by comparing a direction and magnitude of motion of the robot compared to an instruction sent to the drive assembly to estimate a force exerted on the robot outside of the handlebar. As another example, the robot may be configured to exert a force to support backdriveability in which the robot moves in a direction of a force exerted on the robot so as to negate the force felt by the robot.

In some implementations, the force sensing assembly 110 may be configured to provide operating instructions to the drive assembly 102. That is, a user may manipulate the force sensing assembly 110 and appropriate operating instructions may be determined (e.g., by a controller disposed within the force sensing assembly 110 and/or coupled to the force sensing assembly 110 and configured to receive signals from the force sensing assembly 110) for drive assembly 102. Such operating instructions may be communicated to the drive assembly 102.

In some embodiments, the force sensing assembly 110 may be a force sensing handlebar assembly that is positioned between a human operator and the payload 108 to significantly reduce the effort involved in moving the payload 108 by operating drive assembly 102 via commands determined by manipulation of the force sensing assembly 110. The force sensing assembly 110 may, thus, operate the drive assembly 102 to push, pull, and/or rotate the autonomous robot 100 and, thus, payload 108.

In various embodiments, the force sensing assembly 110 may be positioned on various areas of the autonomous robot 100. For instance, the force sensing assembly 110 may be positioned along the top of autonomous robot 100, along the base of the autonomous robot 100, or in a different location. Signals from manipulation of the force sensing assembly 110 may be communicated to the drive assembly 102 in a wired or wireless fashion.

In some embodiments, vertical orientation of a force sensing handlebar may allow for ergonomic improvements for user interactions with the autonomous robot 100. For example, a human operator may instinctively grab and manipulate items with a vertically oriented hand (e.g., with the thumb of the hand located at the top). Additionally, vertical orientation allows for intuitive rotational control of the autonomous robot 100 as the rotational controls may mimic the wrist rotation of the user.

Figure 2:
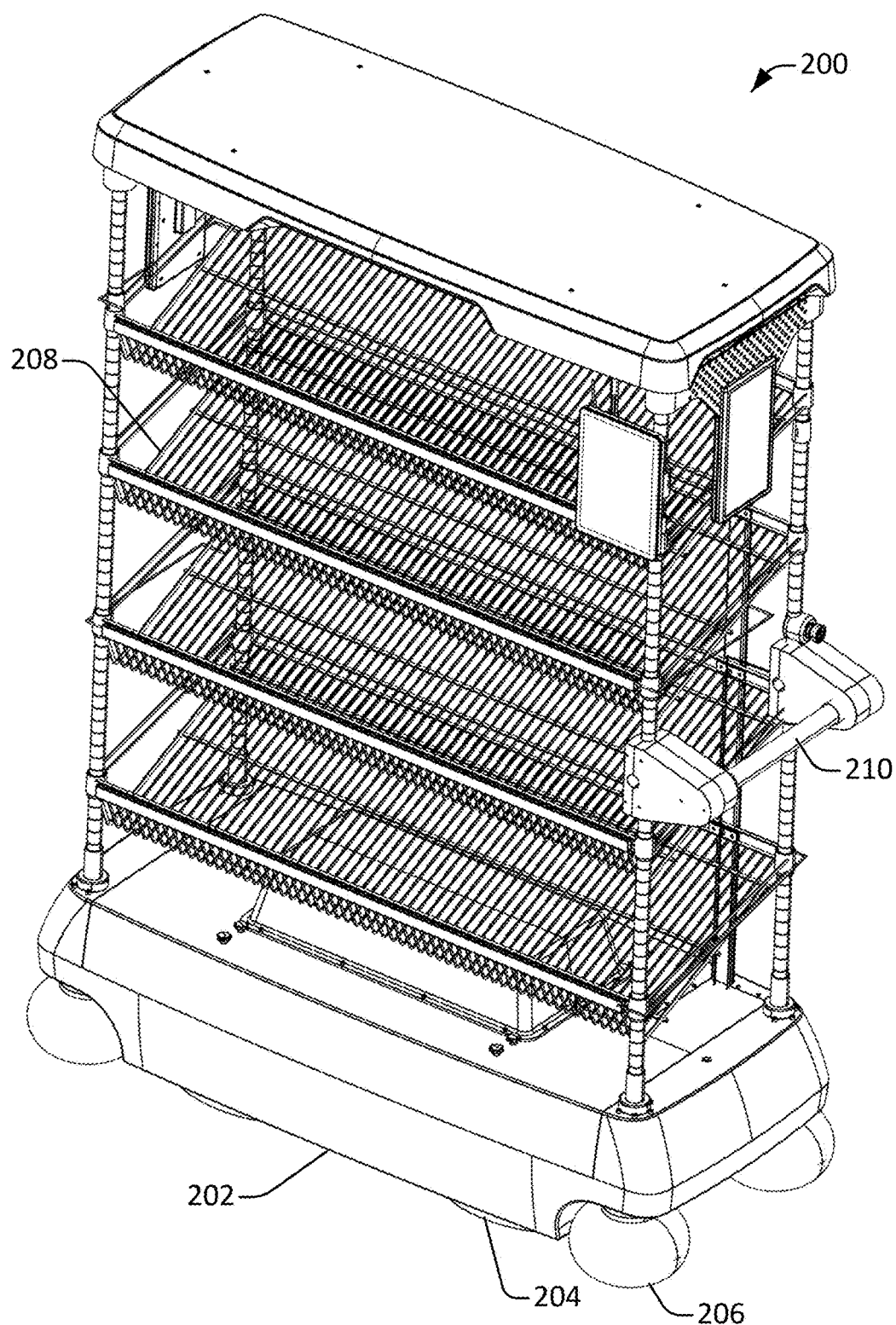
FIG. 2 illustrates a perspective view of an autonomous robot with a horizontal handlebar, configured in accordance with one or more embodiments.

FIG. 2 illustrates a perspective view of an autonomous robot 200 with a horizontal handlebar, configured in accordance with one or more embodiments. The autonomous robot 200 that includes drive assembly 202 with one or more drive units 204, a payload support element 206, a payload 208, and a force sensing assembly 210. In many respects, the autonomous robot 200 is substantially similar to the autonomous robot 100 shown in FIG. 1. However, as shown in FIG. 2, force sensing assembly 210 may include a horizontal handlebar. The horizontal handlebar of FIG. 2 may include sensors, as described herein, disposed at one or both ends (e.g., the horizontal ends) and/or other portions of the handlebar. In certain embodiments, translational pushes on the horizontal handlebar may cause autonomous robot 200 to translate, but twisting of the horizontal handlebar (e.g., around a vertical axis such that, for example, one end of the handlebar may be moved "forward" while the other end may be moved "backward") may cause rotation of autonomous robot 200.

Figure 3:
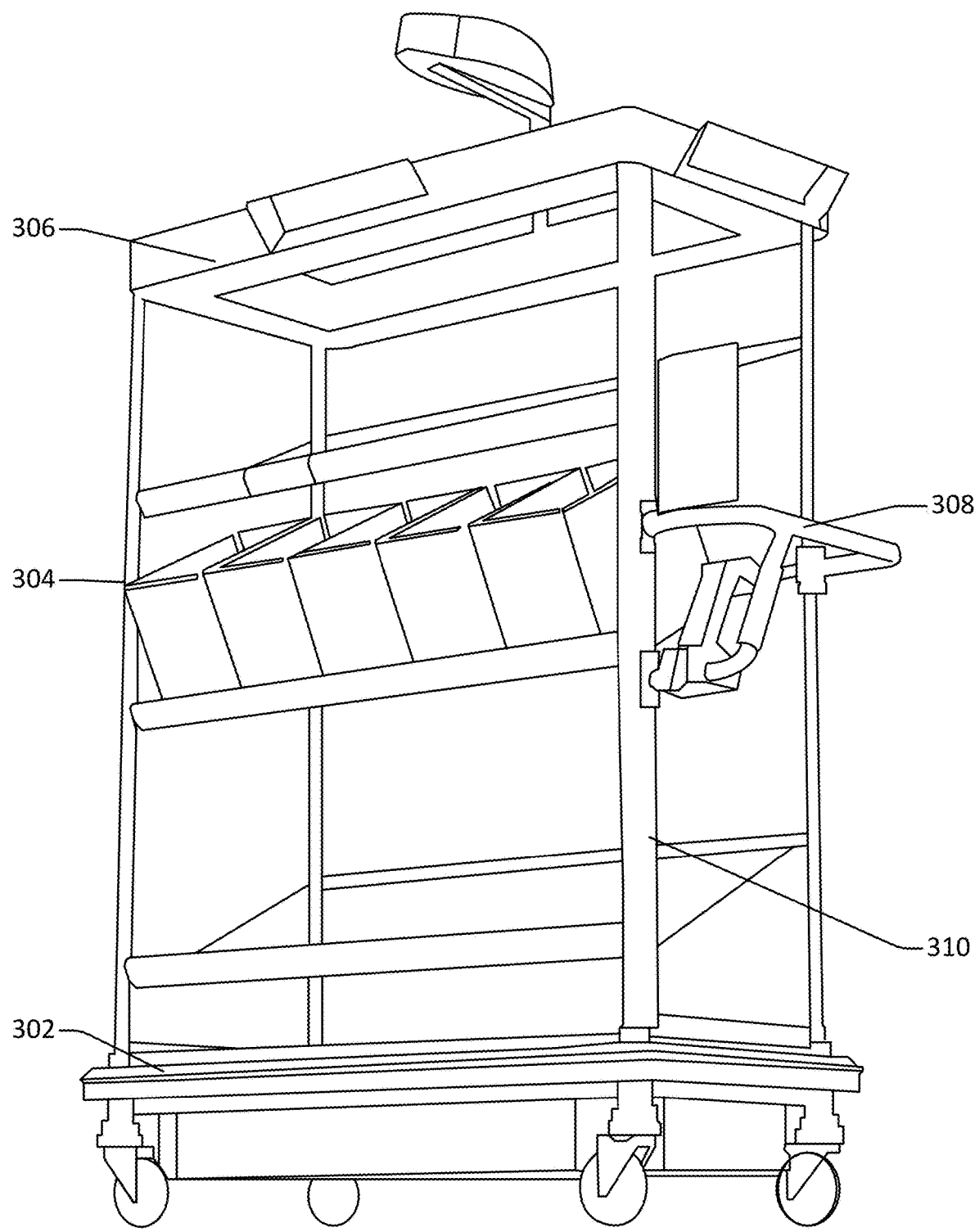
FIG. 3 illustrates an additional configuration of an autonomous mobile robot, arranged in accordance with one or more embodiments.

FIG. 3 illustrates an additional configuration of an autonomous mobile robot 300, configured in accordance with one or more embodiments. The autonomous mobile robot 300 includes a base unit and drive assembly 302, a chassis 304, a sensor unit 306, a user interaction unit 308, and a communication channel 310.

According to various embodiments, the base unit 302 may be configured with an omnidirectional and/or holonomic drive assembly. The drive assembly may include elements such as one or more wheels, treads, motors, controllers, batteries, and/or other components. In some configurations, the base unit and drive assembly 302 may include a force sensor such as a whole-robot force sensor. Alternatively, or additionally, such a force sensor may be included in a different portion of the autonomous mobile robot 300, such as within the user interaction unit 308. The base unit 302 may also include a bump sensor configured to detect an impact.

According to various embodiments, the chassis 304 may include one or more rigid members providing physical support and connection between and among other components of the robots. For instance, the chassis 304 may be composed of one or more rods, shelves, bins or other elements. In some configurations, some or all of the chassis 304 may be composed of components from standardized shelving units or carts.

According to various embodiments, various types and configurations of chassis may be used. In some embodiments, the chassis may be composed in part of a commodity shelving unit. For instance, in some configurations the commodity shelving unit may be 48 inches long, 38 inches wide, and 73 inches tall.

According to various embodiments, the sensor unit 306 may include one or more sensors configured to sense the physical environment in which the autonomous mobile robot 300 is situated. For instance, in particular embodiments the sensor unit 306 may include four stereo pairs of visible light cameras arranged with one on each of four sides of the robot providing 360-degree or near 360-degree visual coverage. However, depending on the configuration, various numbers and types of sensors may be employed. Examples of such sensors may include, but are not limited to: visible light cameras, infrared cameras, time-of-flight depth sensors, structured light depth sensors, RADAR sensors, LIDAR sensors, microphones, and chemical sensors. In addition to one or more sensors, the sensor unit 306 may include other elements such as one or more autonomous mobile robot controllers or computing units, one or more communication interfaces for communicating with other computing devices, and/or one or more digital display screens for displaying information.

According to various embodiments, the user interaction unit 308 may include one or more elements for facilitating user interaction. For example, the user interaction unit 308 may include a display (e.g., a touch-screen display) for presenting information and/or receiving user input. As another example, the user interaction unit 308 may include a force-sensitive handlebar configured to force exerted on the handlebar. The force detected may include degree, direction, and/or rotational elements. As still another example, the user interaction unit 308 may include a barcode scanner or other sensor.

According to various embodiments, the communication channel 310 may include one or more cables and/or busses for transmitting power, sensor data, instructions, and/or other electronic signals between different components of the robot. For instance, the communication channel 310 may include routing for accessor cables, lighting, put-to-light taps, pick-from-light taps, and/or other components.

It should be noted that FIG. 3 illustrates only one example of a configuration of an autonomous mobile robot. However, an autonomous mobile robot may be configured in a different manner in accordance with one or more embodiments. For example, an autonomous mobile robot may include more than one handlebar. As another example, a handlebar may be configured in a different orientation, such as a vertical orientation. As another example, a handlebar may be integrated into the chassis. As still another example, one or more elements of the sensor unit may be distributed elsewhere on the chassis 304 or base unit 302. As yet another example, the chassis may be arranged with different configurations of shelving or other components.

Figure 4:
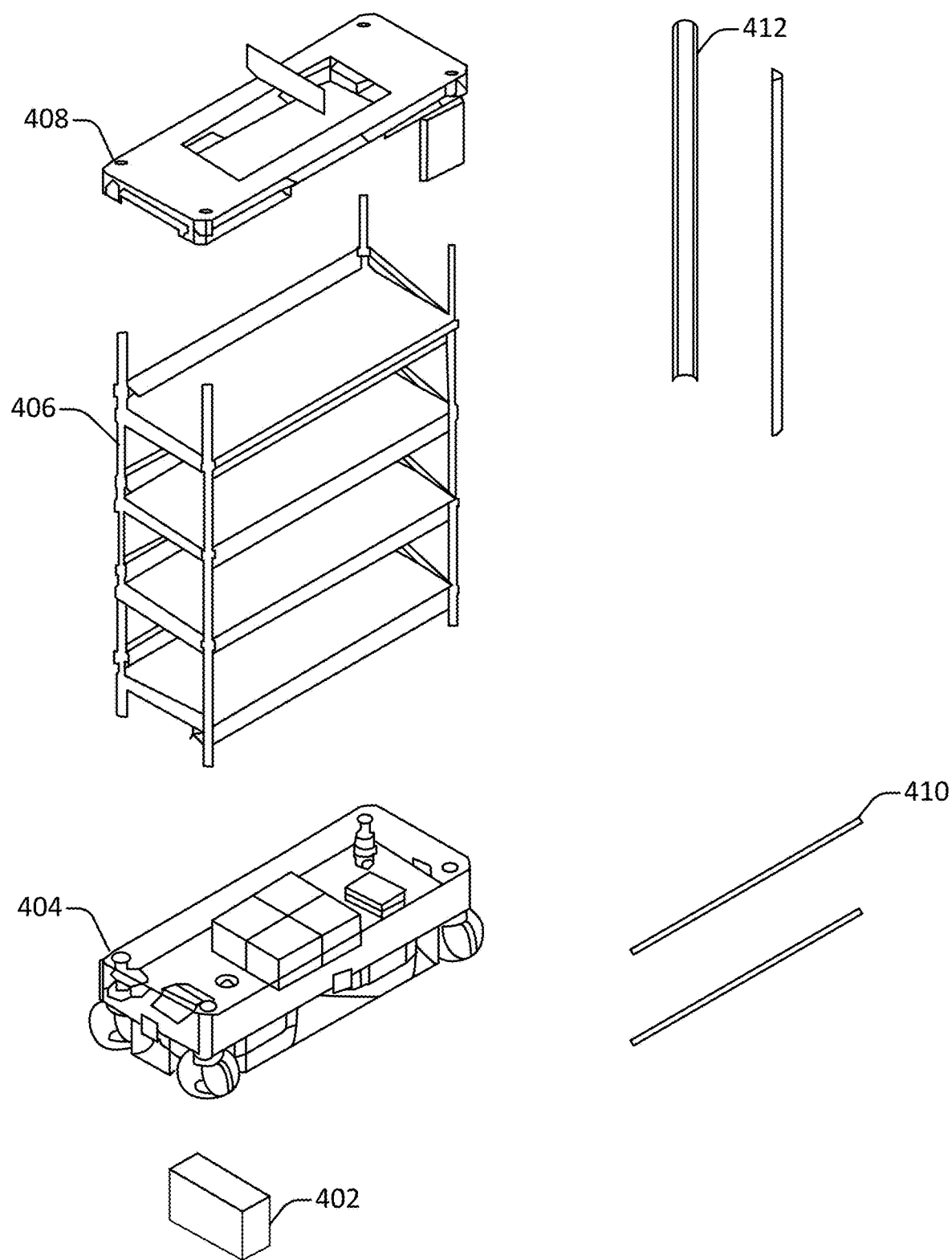
FIG. 4 illustrates a disassembled view of an autonomous mobile robot, configured in accordance with one or more embodiments.

FIG. 4 illustrates a disassembled view of an autonomous mobile robot, configured in accordance with one or more embodiments. As shown in FIG. 4, the autonomous mobile robot may be separated into components for easy assembly, including a charging dock 402, a base unit and drive assembly 404, a payload 406, a head unit 408, a light bar 410, and a communication channel 412. For example, the components may be shipped in a disassembled state and assembled on site. In some embodiments, a mobile robot may dock with the charging dock 402 to charge a battery included within the base assembly 404.

Figure 5:
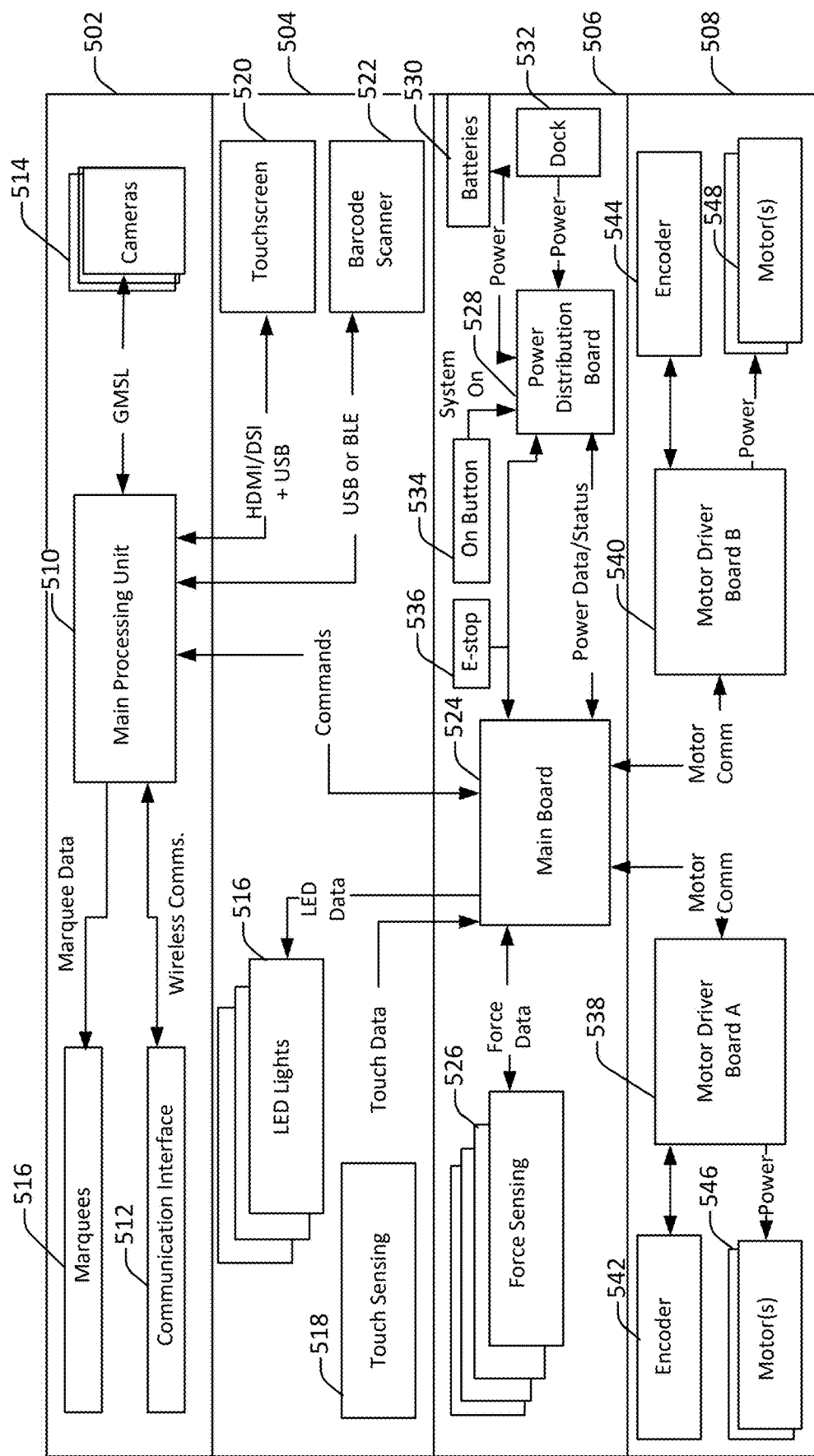
FIG. 5 illustrates a communication architecture diagram of the autonomous mobile robot, configured in accordance with one or more embodiments.

FIG. 5 illustrates a communication architecture diagram 500 of the autonomous mobile robot, configured in accordance with one or more embodiments. The communication architecture diagram 500 is conceptually divided into regions. A sensor unit region 502 corresponds with the sensor unit 306. A user interaction region 504 corresponds with the user interaction unit 308. A base unit region 506 corresponds with the base unit and drive assembly 302. A drive unit region 508 corresponds with one or more drive units within the base unit and drive assembly 102.

According to various embodiments, the sensor unit region 502 may include a main processing unit 510, a communication interface 512, one or more sensors 514, and/or one or more marquees 516. The main processing unit 510 may be a computing device such as an AGX Orin provided by Nvidia. The communication interface 512 may include a hardware radio or other device facilitating communication using a communication protocol such as WiFi, Bluetooth, and/or cellular. The sensors 514 may transmit sensor data to the main processing unit.

In some embodiments, the main processing unit 510 may be configured to process and/or instruct the sensors 514. For instance, the main processing unit 510 may be configured to determine a model of a physical environment based on camera data from one or more visible light cameras included in the sensors 514.

According to various embodiments, the base unit region 506 includes a main board 524, which includes one or more processors and/or other components. The main board 524 facilitates communication between and among other components. The base unit region 506 also includes one or more force sensors 526 and a power distribution board 528. The power distribution board 528 communicates with one or more battery systems 530, a power dock interface 532, an on button 534, and an electronic stop interface 536.

According to various embodiments, the user interaction region 504 may include one or more end points for interacting with user interface devices such as one or more touch sensors 518, lighting elements 516, touch screens 520, barcode scanners 522, and/or other such devices. Such devices may communicate with the main processing unit 510 and/or the main board 524.

According to various embodiments, the drive unit region 510 may communicate with motor driver boards 538 and 540 corresponding to different drive units within the autonomous mobile robot, which may have one, two, or more drive units. Each drive unit may correspond to one or more wheels, treads, or other mechanisms for locomotion. The motor driver boards may communicate with the encoders 542 and 544 and one or more motors 546 and 548. For instance, the encoders 542 and 544 may be absolute encoders, and the motors 546 and 548 may be brushless DC motors.

The communication architecture diagram 500 is one example of a possible configuration of components within the autonomous mobile robot 100, provided for the purpose of illustration. According to various embodiments, various arrangements and combinations of components may be employed in a manner consistent with techniques and mechanisms described herein.

Additional details regarding a mechanical drive unit that may be used in conjunction with techniques and mechanisms described herein are described in U.S. patent application Ser. No. 18/622,640 by Davey et al, filed Mar. 29, 2024, titled "Autonomous Robot Double Drive Assembly", and in U.S. Provisional Patent Application No. 63/561,023 by Davey et al, filed Mar. 5, 2024, titled "Autonomous Robot Double Drive Assembly", both of which are incorporated herein by reference in their entirety and for all purposes.

Figure 6:
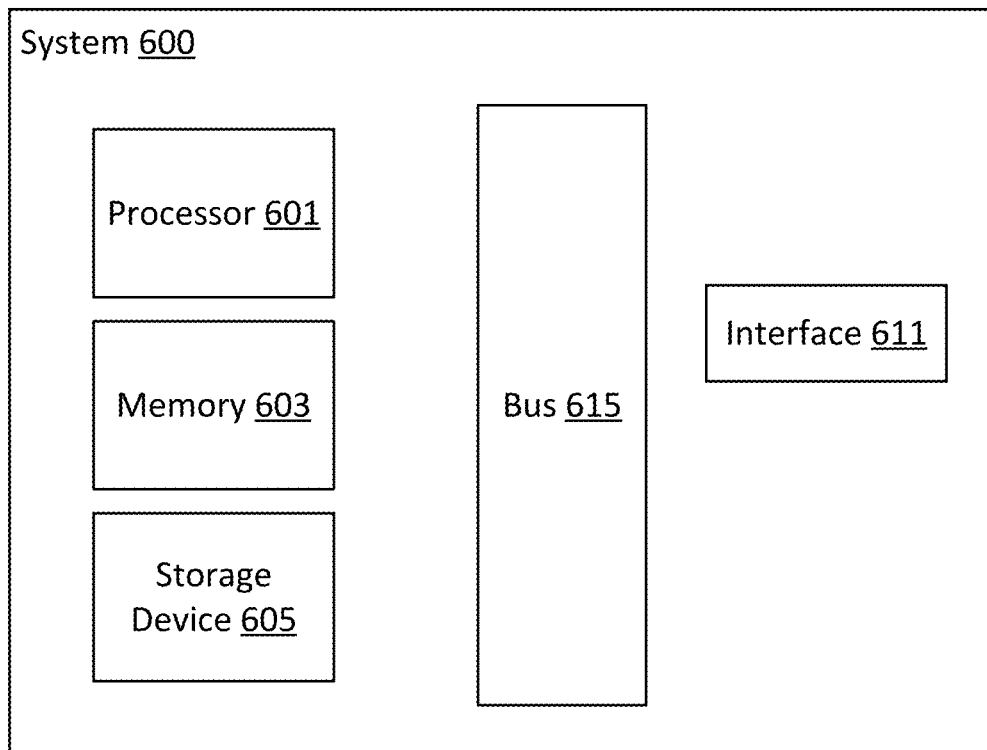
FIG. 6 is a block diagram of a computing device, configured in accordance with one or more embodiments.

FIG. 6 is a block diagram of a computing device, configured in accordance with one or more embodiments. According to various embodiments, a system 600 suitable for implementing embodiments described herein includes a processor 601, a memory module 603, a storage device 605, an interface 611, and a bus 615 (e.g., a PCI bus or other interconnection fabric.) System 600 may operate as variety of devices such an autonomous mobile robot, a remote server configured as a fleet manager, or any other device or service described herein. Although a particular configuration is described, a variety of alternative configurations are possible. The processor 601 may perform operations such as those described herein with respect to the various devices and methods. Instructions for performing such operations may be embodied in the memory 603, on one or more non-transitory computer readable media, or on some other storage device. Various specially configured devices can also be used in place of or in addition to the processor 601. The interface 611 may be configured to send and receive data packets over a network. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by non-transitory computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of non-transitory computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A non-transitory computer-readable medium may be any combination of such storage devices.

Drive Assemblies

Figure 7:
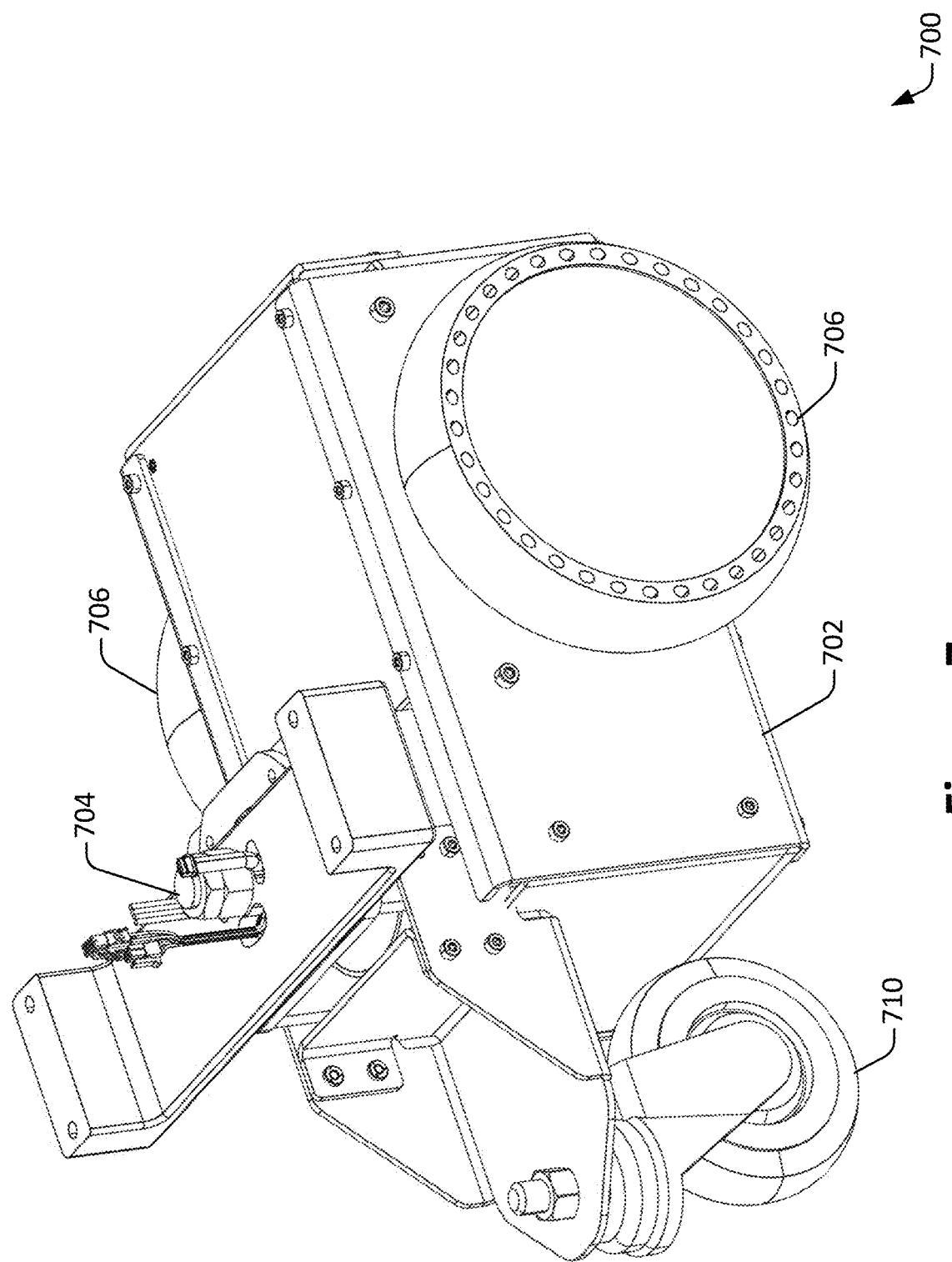
FIG. 7 illustrates a diagram of a drive unit, configured in accordance with one or more embodiments.
Figure 8:
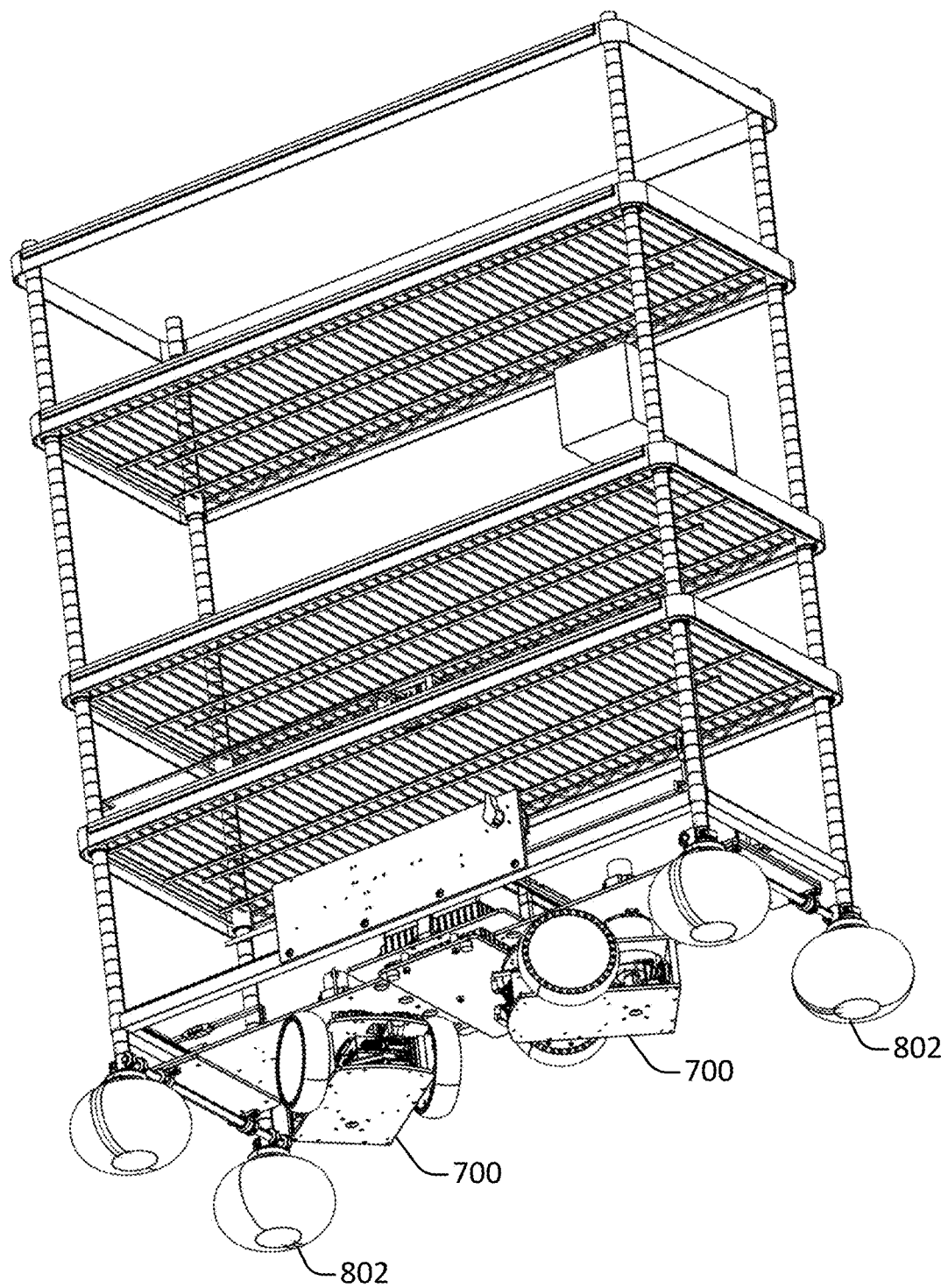
FIG. 8 illustrates a view of an autonomous mobile robot that includes a drive assembly containing two drive units, configured in accordance with one or more embodiments.

Various configurations of autonomous mobile robots may be configured with various types of drive assemblies. FIG. 7 illustrates a diagram of a drive unit 700, configured in accordance with one or more embodiments. FIG. 8 illustrates a different view of the autonomous mobile robot that includes two drive units 700.

The drive unit 700 includes a turntable unit 702 that turns about an axis 704. The drive unit 700 also includes one or more wheels 706 and one or more motors. The wheels 706 are offset from the axis 704 and independently controllable via the motor. The motor may power one or more of the wheels using power supplied by a battery, which may be located inside of the drive unit or outside of the drive unit and may be coupled directly or indirectly with the motor, for instance via a slip ring. The drive unit 700 may include one or more unpowered supports, such as the unpowered freely mobile caster wheel 710, for instance to provide additional stability.

In the configuration shown in FIG. 8, each drive unit rotates freely around an axis 704. That is, the rotation around the axis 704 is unpowered. The autonomous mobile robot can be caused to move in any direction or rotated by applying power from the motors to the wheels 706.

In FIG. 8, an autonomous mobile robot is further supported by one or more support elements 802. For instance, a support element may be a freely spinning and unpowered caster wheel, a slider, or some other component. The support elements may provide additional stability to the autonomous mobile robot.

In some embodiments, an autonomous mobile robot may be equipped with multiple support elements 802. For instance, an autonomous mobile robot may be equipped with four freely spinning and unpowered caster wheels located at approximately the four corners of the autonomous mobile robot.

Figure 9C:
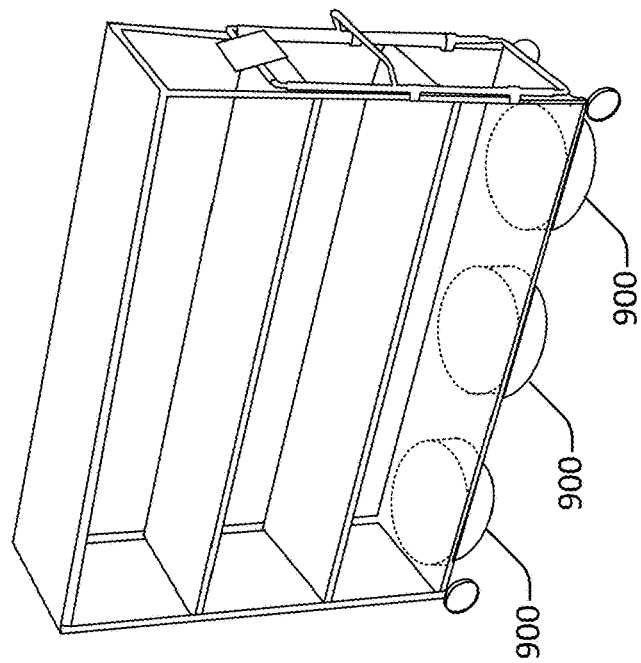
FIG. 9A, FIG. 9B, and FIG. 9C illustrates views of an autonomous mobile robot that includes a drive assembly containing various numbers of drive units, configured in accordance with one or more embodiments.
Figure 9B:
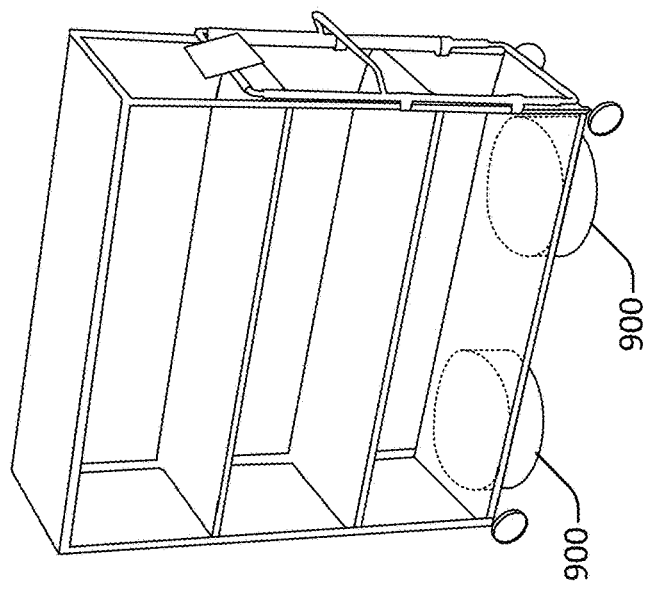
Figure 9A:
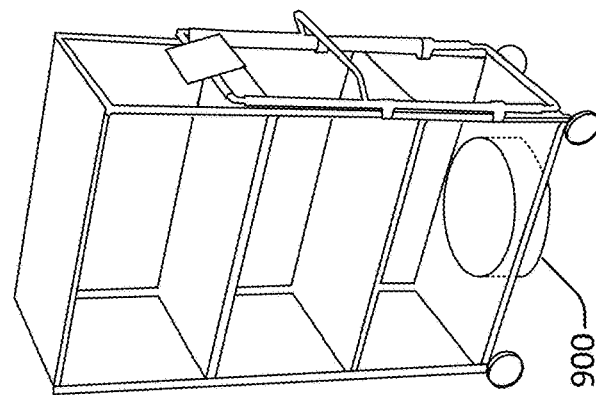

According to various embodiments, an autonomous mobile robot may be equipped with one or more drive units. For example, FIG. 9A illustrates a configuration that includes a single drive unit, FIG. 9B illustrates a configuration that includes a double drive unit, and FIG. 9C illustrates a configuration that includes a triple drive unit. In some implementations, including more than one drive unit may include performance on one or more dimensions. For instance, moving from a single drive unit to a double drive unit may increase backdrivability, decrease torque requirements, decrease the number of unique parts, and decrease the diameter needed for each of the drive units.

In some embodiments, an autonomous mobile robot may be equipped with one or more drive units of a different type from that shown, such as one or more drive units that employ one or more Mecanum wheels.

FIG. 10A, FIG. 10B, and FIG. 10C illustrate perspective views of portions of an autonomous mobile robot. As shown in FIG. 10A, FIG. 10B, and FIG. 10C, a base unit 102 that includes a drive assembly may be removable from the autonomous mobile robot.

Force Sensing

Figure 11A:
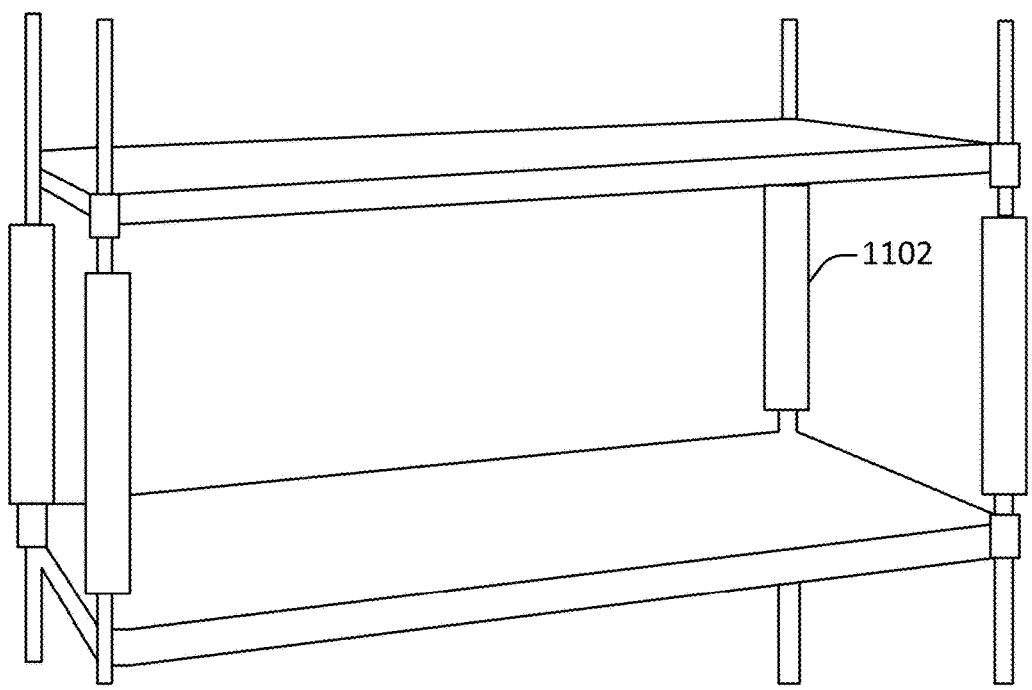
FIG. 11A and FIG. 11B illustrate handlebars for guiding an autonomous mobile robot, configured in accordance with one or more embodiments.
Figure 11B:
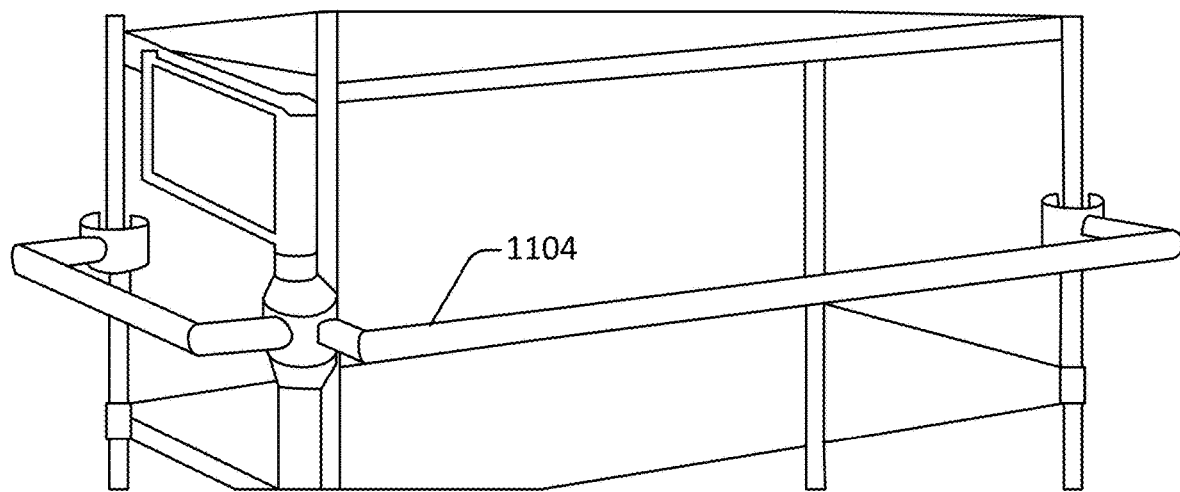

FIG. 11A and FIG. 11B illustrate handlebars for guiding the autonomous mobile robot 100, configured in accordance with one or more embodiments. Depending on the configuration, handlebars may be arranged in any of various ways.

In some embodiments, as shown in FIG. 11A, a handlebar 1102 may be arranged in a substantially vertical orientation. Alternatively, or additionally, a handlebar may be arranged in a substantially horizontal orientation, as shown in FIG. 11B. As still another possibility, a handlebar may be arranged in a different orientation In some embodiments, a handlebar 1102 may be integrated with the chassis, as shown in FIG. 11A. Alternatively, or additionally, a handlebar 1104 may be set off from the chassis, as shown in FIG. 11B.

In some embodiments, an autonomous mobile robot may be equipped with a single handlebar. Alternatively, in some configurations an autonomous mobile robot may be equipped with more than one handlebar, as shown in FIG. 11A and FIG. 11B.

In some embodiments, the handlebars may be used to detect and amplify force applied to the robot. For example, torque as the handlebar is twisted may be detected and used to instruct the drive unit to rotate the robot around the axis of the handlebar. As another example, translational force as the handlebar is pushed may be detected and used to instruct the drive unit to move the robot in the direction of the force, effectively amplifying the force.

Figure 12:
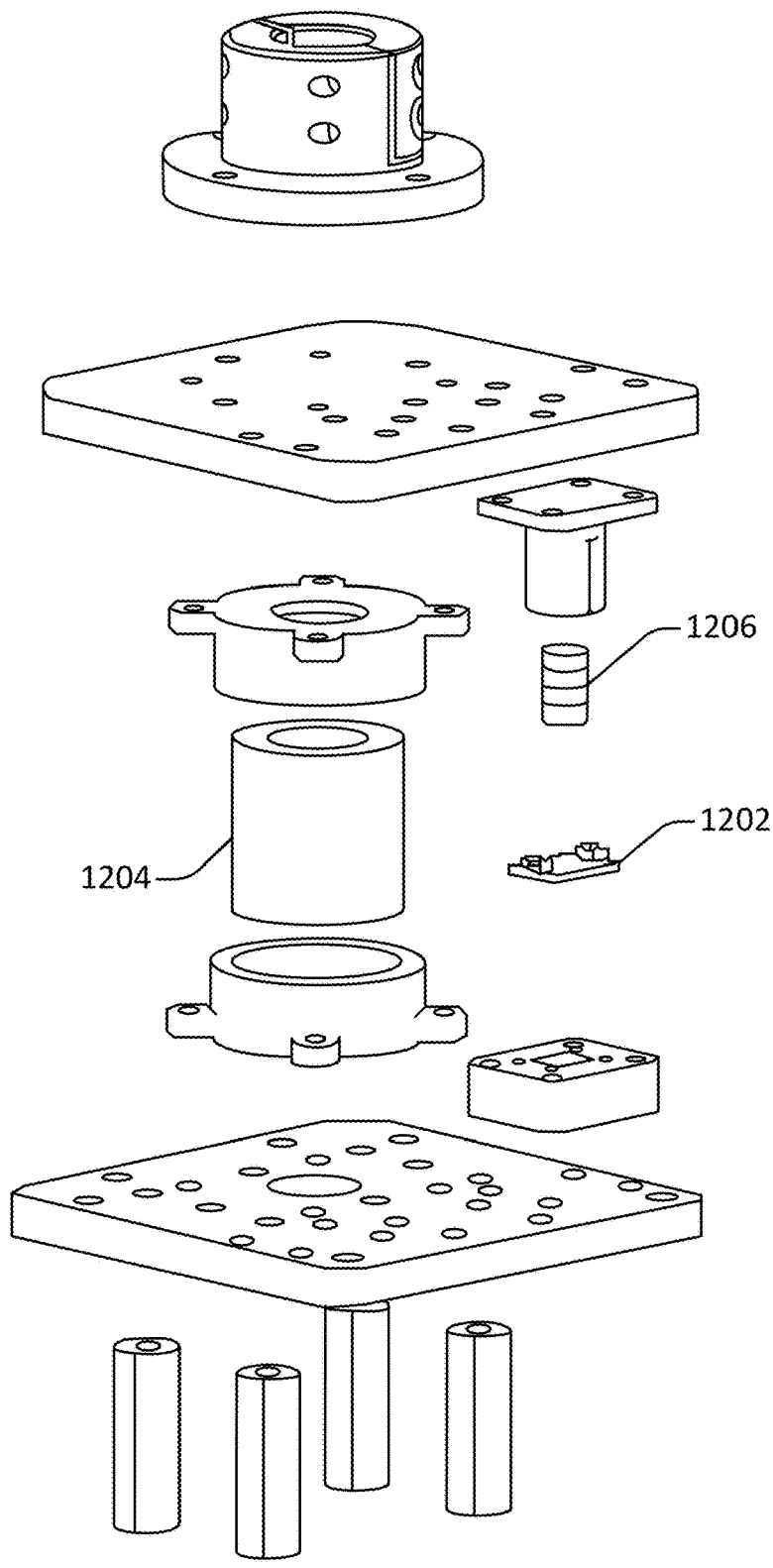
FIG. 12 illustrates a force sensor, configured in accordance with one or more embodiments.

FIG. 12 illustrates a force sensor 1200, configured in accordance with one or more embodiments. The force sensor 1200 may be used to detect force exerted on one or more of handlebars, for instance a handlebar configured as shown in FIG. 11. The force sensor 1200 includes a hall effect sensor 1202, a spring gasket 1204, and one or more magnets 1206.

In some embodiments, a bar passes through the spring gasket 1204. When force is exerted on the bar and then removed, the spring gasket 1204 causes the bar to return to its original central position.

In some embodiments, the one or more magnets 1206 may be arranged to as to generate a magnetic field detected by the hall effect sensor 1202, which may detect disruptions to the magnetic field corresponding with force exerted in one, two, three, or four dimensions. For instance, the hall effect sensor 1202 may detect disruptions to the magnetic field corresponding with force exerted in the x-axis, the y-axis, the z-axis, and/or a rotational force.

In some embodiments, the hall effect sensor 1202 may translate the detected disruptions into force sensor data. The force sensor data may identify a direction of the force in one, two, or three translational dimensions and/or a fourth rotational dimensions. Alternatively, or additionally, the force sensor data may identify a magnitude corresponding with a translational and/or rotational force.

According to various embodiments, an autonomous mobile robot may be equipped with any of various kinds of force sensors. Examples of force sensors may include, but are not limited to: Hall effect sensors, optical sensors, capacitive touch sensors, button switch sensors, break beam sensors, force sensitive resistors, and force sensitive switches.

According to various embodiments, an autonomous mobile robot may be equipped with various numbers and types of force sensors. For example, an autonomous mobile robot 100 may be equipped with force sensors located at some or all of a set of vertical poles included in the chassis and/or at some or all of handlebars coupled with the autonomous mobile robot.

According to various embodiments, a force sensor may be located in any of various locations on an autonomous mobile robot. For example, a force sensor may be located at the handlebar itself. Alternatively, or additionally, a force sensor may be located at the robot chassis, for instance along a vertical pole included in the chassis.

According to various embodiments, force sensor location may give rise to one or more tradeoffs. For instance, locating a force sensor at the chassis may provide for increased flexibility, since the robot may be grabbed and maneuvered from different sides. However, locating a force sensor at the chassis may cause the user to feel the payload mass when exerting force on the robot, and may increase hysteresis. In contrast, locating a force sensor at the handlebar may hide the payload mass from the user. However, locating a force sensor at the handlebar may limit the user to grabbing the cart from the handlebar.

Figure 13:
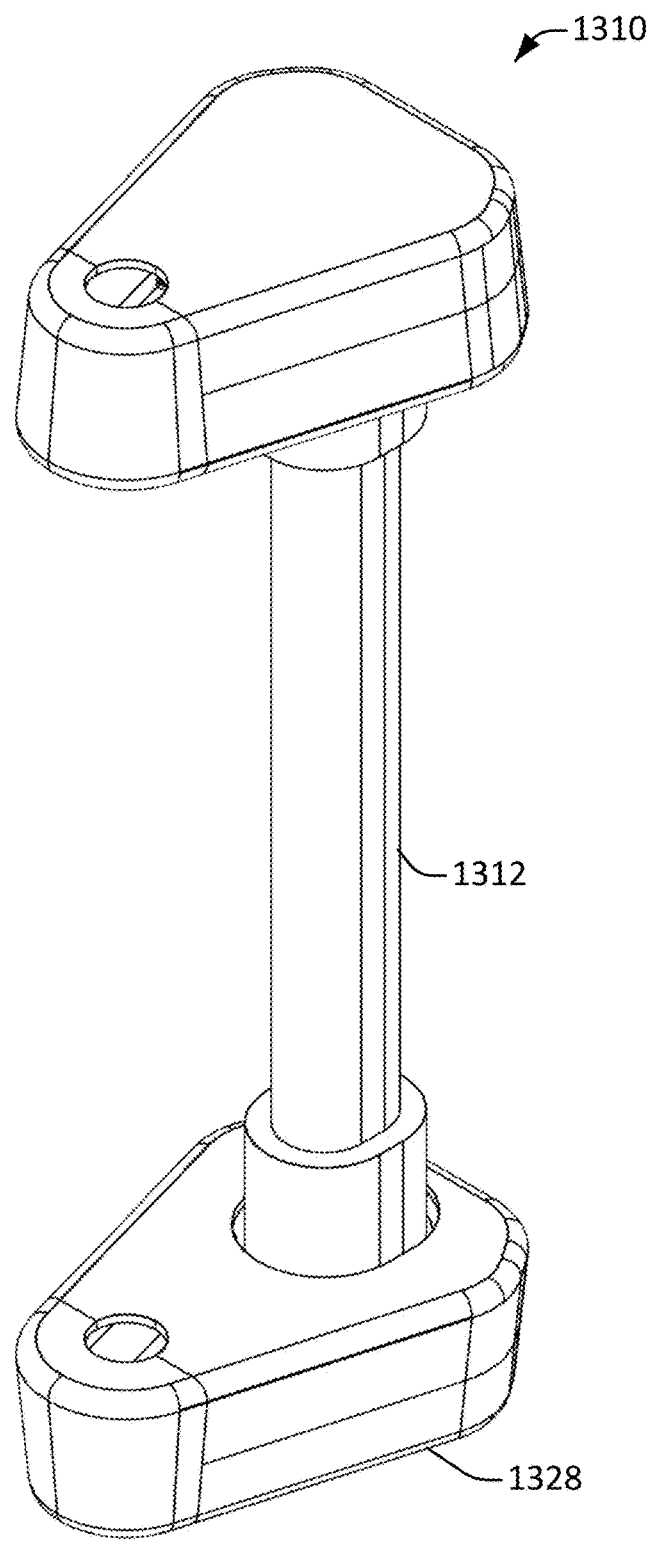
FIG. 13 illustrates a perspective view of a force sensing handlebar, configured in accordance with one or more embodiments.

FIG. 13 illustrates a perspective view of a force sensing handle assembly 1310, configured in accordance with one or more embodiments. The handle assembly 1310 includes a handlebar 1312 and a housing 1328. The handlebar 1312 may be a vertically or horizontally oriented handlebar configured to allow a user to grasp the handlebar to provide operating instructions to the autonomous robot. In various embodiments, the housing 1328 may be configured to interface (e.g., mount) to one or more other portions of the autonomous robot, such as to the payload 108. In certain such embodiments, the housing 1328 may be configured to couple to various different portions and/or versions of the autonomous robot.

Figure 14:
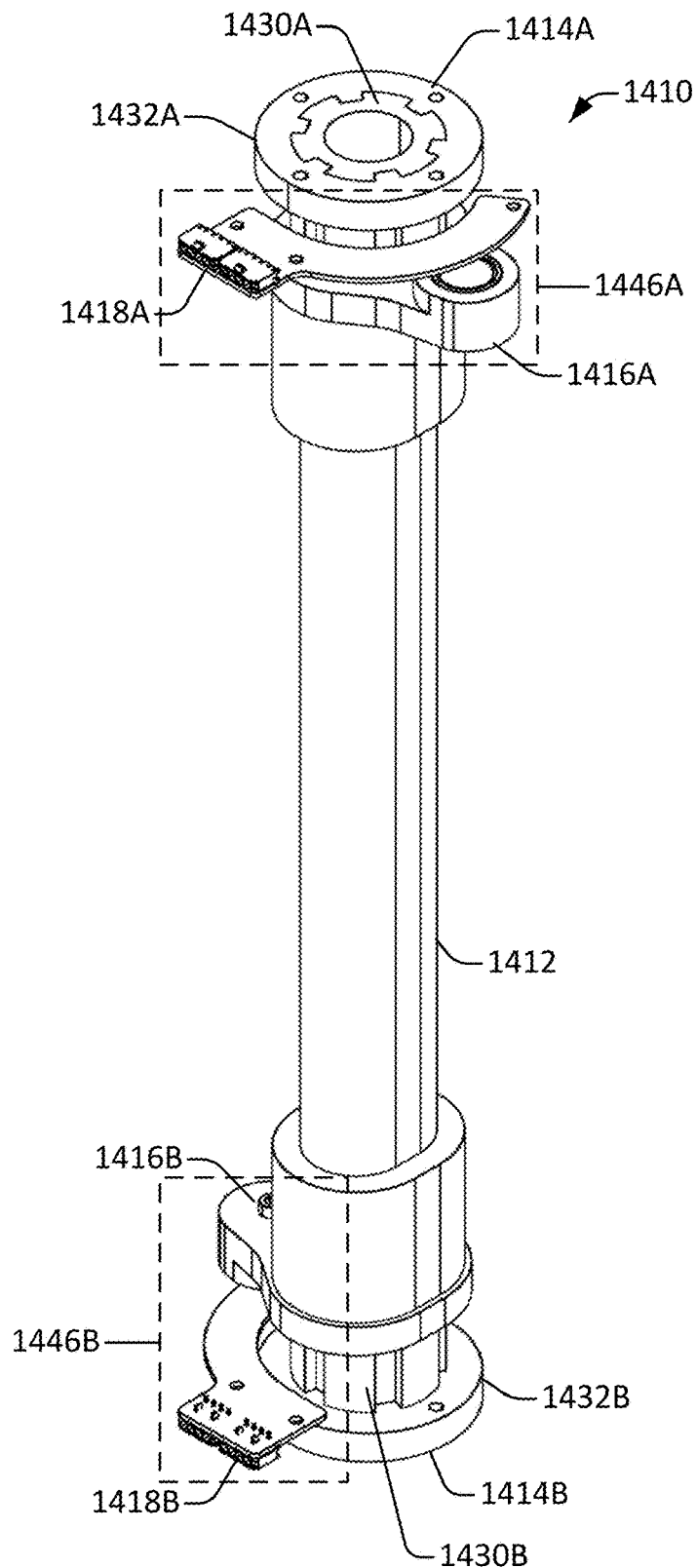
FIG. 14 illustrates a perspective view of portions of a force sensing handlebar, configured in accordance with one or more embodiments.

The ends of the handlebar 1312 may be disposed within the housing 1328. The housing 1328 may include various sensors as well as fixtures that the handlebar 1312 is coupled to. The internal elements of the housing 1328 and the handlebar 1312 are further illustrated in FIG. 14. FIG. 14 illustrates a perspective view of portions of a force sensing handlebar, configured in accordance with one or more embodiments. FIG. 14 illustrates a handle assembly 1410, which may not include the housing 1328.

In FIG. 14, the handle assembly 1410 includes a handlebar 1412. The handlebar 1412 includes a first end 1432A and a second end 1432B on opposite distal portions. The ends of the handlebar 1412 may be coupled to various fixtures. For example, the first end 1432A of the handlebar 1412 may be coupled to the fixture 1414A while the second end 1432B of the handlebar 1412 may be coupled to the fixture 1414B.

In certain embodiments, the handlebar 1412 may be coupled to the fixtures 1414A and/or 1414B via compliant material 1430A and/or 1430B. The compliant material 1430B is not entirely visible in FIG. 14, but an ordinal indicator for 1430B indicates where the compliant material 1430B is located. The compliant material 1430B is coupled to the fixture 1414B in a similar manner to the manner that the compliant material 1430A is coupled to the fixture 1414A. The compliant material 1430A and/or 1430B may be a form or material, such as a spring or bushing made from an elastomer, rubber, metal, and/or other material, that allows the position of handlebar 1412 to change relative to the fixtures 1414A and/or 1414B in response to force applied to the handlebar 1412 by a human operator. In various embodiments, the compliant materials 1430A and/or 1430B may be coupled via casting, friction fit, fasteners, adhesives, and/or another such technique that may allow for the joining of two items (e.g., two items of different materials).

In some embodiments, the fixtures 1414A and/or 1414B may be coupled to another portion of the autonomous robot. For instance, the fixtures 1414A and/or 1414B may be coupled to the autonomous robot via another portion of the handle assembly 1310 that may then be coupled to the autonomous robot. The fixtures 1414A and 1414B may thus be coupled to the housing 1328 to hold the handlebar 1412 in a position relative to the housing 1328.

In some embodiments, the fixtures 1414A and/or 1414B may be directly connected to the autonomous robot (e.g., via any type of direct connection such as adhesives, fasteners, welding, and/or via fasteners or other removable techniques). The compliant material 1430A and/or 1430B may, thus, allow for the handlebar 1412 to translate and/or rotate relative to the fixtures 1414 and/or 1414B in response to force applied by the user. Furthermore, the fixtures 1414A and/or 1414B in combination with the compliant material 1430A and/or 1430B may be configured to hold the handlebar 1412 in a fixed position (e.g., neutral position) when no force is applied to handlebar 1412.

The handle assembly 1410 includes a first sensor 1446A and a second sensor 1446B. The first sensor 1446A includes a first sensor first portion 1416A and a first sensor second portion 1418A. The second sensor 1446B includes a second sensor first portion 1416B and a second sensor second portion 1418B. The first sensor first portion 1416A and the second sensor first portion 1416B may be coupled to handlebar 1412.

In some embodiments, the first sensor first portion 1416A and the second sensor first portion 1416B proximate to the opposite distal ends (e.g., the first end 1432A and the second end 1432B) of the handlebar 1412. Alternatively, the first sensor first portion 1416A and the second sensor first portion 1416B may be coupled to another portion of handlebar 1412.

In some implementations, the first sensor second portion 1418A and the second sensor second portion 1418B may be coupled to portions of handle assembly 1410 and/or autonomous robot that handlebar 1412 may be configured to move relative to. That is, the first sensor second portion 1418A and the second sensor second portion 1418B may be coupled to, for example, the housing 1328, the fixtures 1414A and 1414B, respectively, and/or another portion of autonomous robot. Thus, the first sensor second portion 1418A and the second sensor second portion 1418B may be held in a "fixed" position (e.g., fixed relative to another portion of autonomous robot 100 such as payload 108) so that movement of the handlebar 1412 may cause the first sensor first portion 1416A and the second sensor first portion 1416B to move relative to the first sensor second portion 1418A and the second sensor second portion 1418B.

In some embodiments, relative movement of the first sensor first portion 1416A to the first sensor second portion 1418A and the second sensor first portion 1416B to the second sensor second portion 1418B may allow for a determination as to whether a human operator is pushing on or rotating the handlebar 1412. Based on the human operator's interaction with the handlebar 1412 (e.g., whether the user is pushing on or rotating handlebar 1412), the autonomous robot may be driven in different manners. Operation of the autonomous robot is discussed in additional detail throughout the application, for instance with respect to FIG. 19 through FIG. 26.

In some embodiments, the first sensor first portion 1416A and the first sensor second portion 1418A and the second sensor first portion 1416B and the second sensor second portion 1418B may be offset in different positions (e.g., different positions along a vertical axis for vertically oriented handlebars or different positions along a horizontal axis for horizontally oriented handlebars) to allow for distinguishing of translational and rotational operating instructions.

In some embodiments, the first sensor first portion 1416A may be configured to interact with the first sensor second portion 1418A, while the second sensor first portion 1416B may be configured to interact with the second sensor second portion 1418B. For example, first sensor second portion 1418A first sensor second portion 1418A may be configured to sense movement of first sensor second portion 1418A first sensor first portion 1416A relative to first sensor second portion 1418A first sensor second portion 1418A. The second sensor second portion 1418B may be configured to sense movement of the second sensor first portion 1416B relative to the second sensor second portion 1418B. Such relative movement may be, for example, due to deflection of the compliant materials 1430A and/or 1430B from forces applied to the handlebar 1412.

In some implementations, the first sensor first portion 1416A and the second sensor first portion 1416B include magnets while the first sensor second portion 1418A and second sensor second portion 1418B may include hall effect sensor modules (e.g., 1-axis, 2-axis, or 3-axis hall effect sensors) that includes one or a plurality of hall effect sensors. The hall effect sensor modules may be configured to sense the respective movement of the magnets, or vice versa. Utilizing a plurality of paired sensor portions that are offset from each other allows for measurement of twist theta in addition to that of relative displacement, allowing for estimates of applied force (e.g., linear force) as well as applied torque (e.g., twisting force). Other embodiments may include other types of sensors for the first sensor first portion 1416A, the second sensor first portion 1416B, the first sensor second portion 1418A, and/or the second sensor second portion 1418B, such as optical flow sensor, optical or magnetic encoders, potentiometers, ultrasonic sensors, and/or other such sensors.

In some embodiments, the handlebar assembly may include a break beam sensor. The break beam sensor may transmit a signal when a beam of light is broken and/or reestablished. Such a sensor may be used to detect when a handlebar is grasped and/or released.

Figure 15:
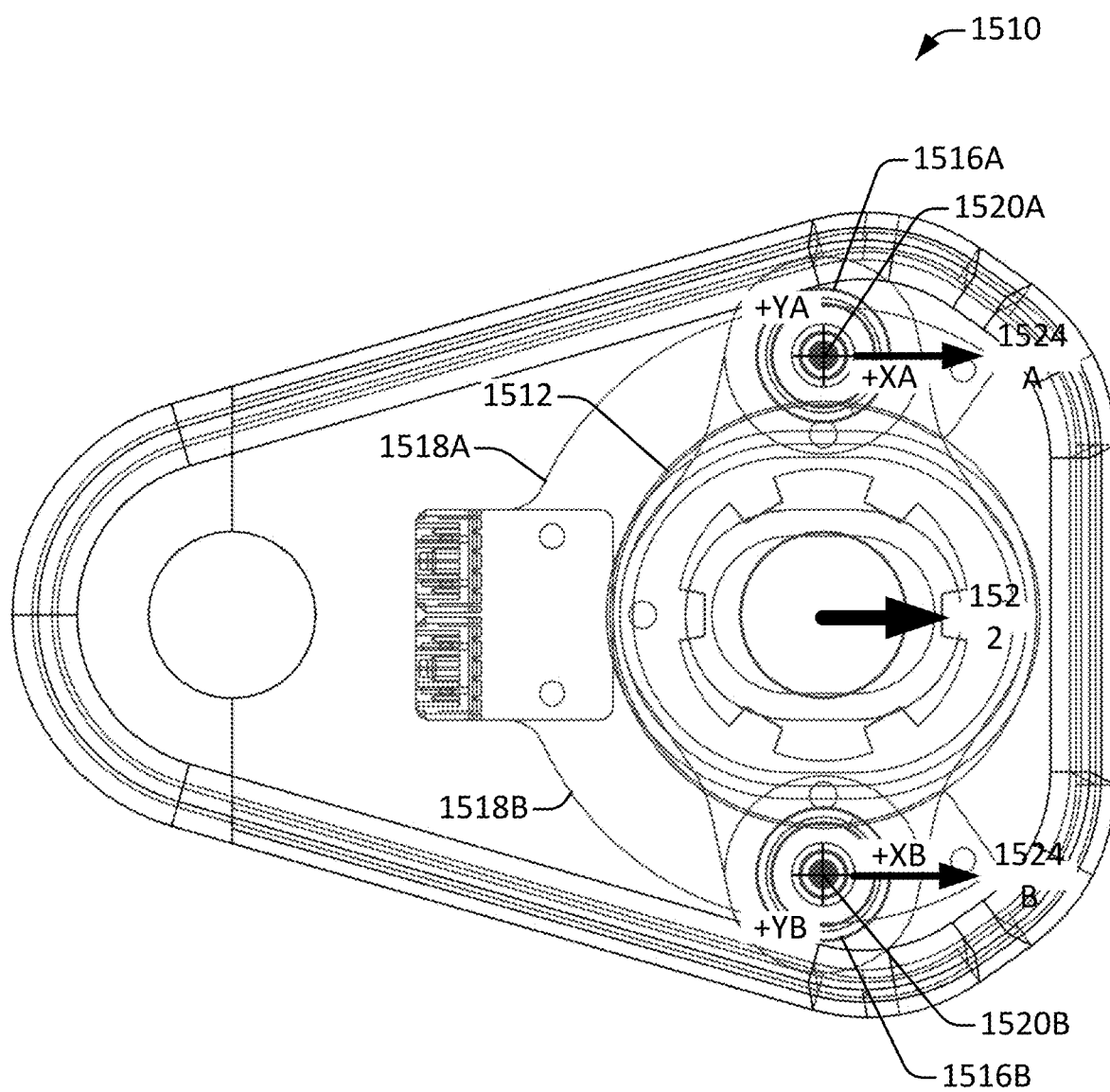
FIG. 15 illustrates a top view of a force sensing handlebar for an autonomous robot in a first manipulated position, configured in accordance with one or more embodiments.

FIG. 15 illustrates a top view of a force sensing handlebar for an autonomous robot in a first manipulated position, configured in accordance with one or more embodiments. FIG. 15 illustrates a linear force 1522 applied to the handlebar 1512 of the handle assembly 1510. In certain embodiments, the linear force 1522 applied to handlebar 1512 may result in drive assembly 102 linearly moving (e.g., translating) the autonomous robot, according to the techniques and mechanisms described herein. The speed of the linear movement may be dependent on the magnitude of the detected force applied to the handlebar 1512.

Movement of the first sensor first portion 1516A may be determined relative to the sensor axis 1520A. When no force is applied to the handlebar of the handle assembly 1510, the first sensor first portion 1516A may be determined to be disposed at the center, or proximate the center (e.g., within a set degree of tolerance, such as within a few millimeters), of the sensor axis 1520A and may be determined to be disposed in a neutral position. The first sensor second portion 1518A may be calibrated to determine the position of the first sensor first portion 1516A. The first sensor second portion 1518A may be calibrated such that when the first sensor first portion 1516A is disposed in the neutral position (e.g., at the center or proximate the center of sensor axis 1520A), the first sensor second portion 1518A may determine that there is no relative movement of the first sensor first portion 1516A.

Additionally, the first sensor second portion 1518A may be configured to detect movement of the first sensor first portion 1516A along two axes (e.g., XA and YA). Thus, when force is applied to the handlebar, in certain instances, the first sensor first portion 1516A may move along the XA and/or YA axes (e.g., in the positive or negative XA and/or YA directions relative to the sensor axis 1520A) and such movement may be detected by the first sensor second portion 1518A. Similarly, movement of the second sensor first portion 1516B may be determined by the second sensor second portion 1518B, relative to the sensor axis 1520B, the center of which may be a neutral position that the second sensor second portion 1518B is calibrated towards.

The linear force 1522 may be applied to the handlebar 1512. Due to the application of the linear force 1522, the first sensor first portion 1516A may move relative to the first sensor second portion 1518A. Such movement may be determined as positive or negative according to defined axes. Thus, in certain embodiments, movement in the positive XA direction and the positive YA direction may be classified as positive magnitude, while movement in the opposite direction may be classified as negative magnitude. Similarly, the second sensor second portion 1518B may be configured to determine movement of the second sensor first portion 1516B in the positive and negative XB and YB directions, as shown. In certain embodiments, the positive directions of XA and XB may be in the same direction while the positive directions of YA and YB may be in opposite directions. The positive and negative directions may allow for the determination of whether the handlebar 1512 is translating or rotating. Other orientations of the axes may be possible in other embodiments.

As shown in FIG. 15, the linear force 1522 applied to the handlebar 1512 may cause the reaction 1524A for the first sensor first portion 1516A (e.g., the reaction 1524A may include movement of the first sensor first portion 1516A in the positive XA direction) and may cause the reaction 1524B for the second sensor first portion 1516B (e.g., the reaction 1524B may be movement of the second sensor first portion 1516B in the positive XB direction). The reactions of the first sensor first portion 1516A and the second sensor first portion 1516B may be detected by the first sensor second portion 1518A and the second sensor second portion 1518B, respectively. Based on the determination that the first sensor first portion 1516A is moving in the positive XA direction and the second sensor first portion 1516B is moving in the positive XB direction, a determination may be made (e.g., by a controller as described herein) that the force 1522 is causing the handlebar 1512 to translate as both first sensor first portion 1516A and the second sensor first portion 1516B may both be determined to be moving in the same direction, along the same vector, and/or with the same magnitude of movement.

Figure 16:
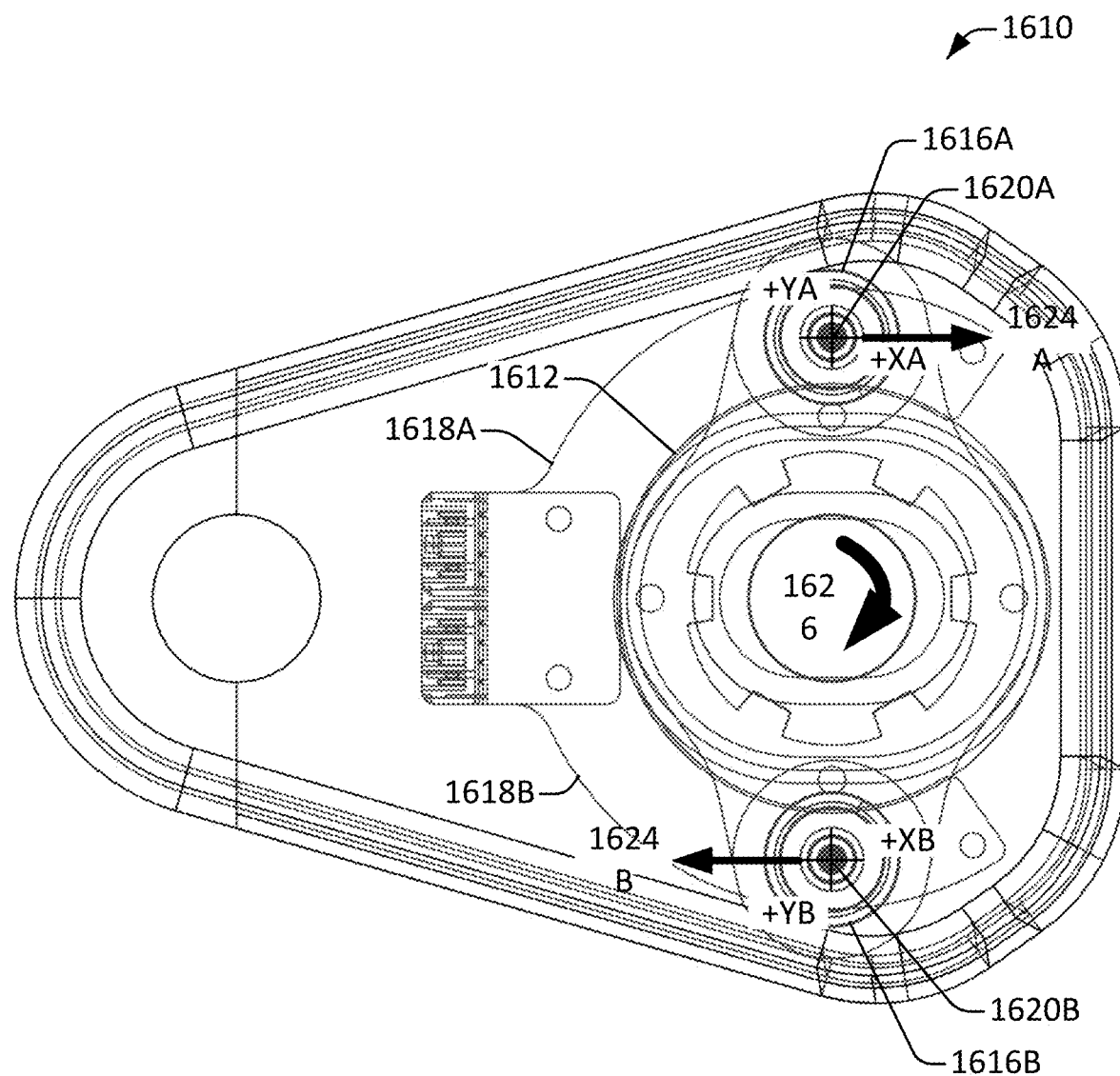
FIG. 16 illustrates a top view of a force sensing handlebar for an autonomous robot in a second manipulated position, configured in accordance with one or more embodiments.

FIG. 16 illustrates a top view of a force sensing handlebar for an autonomous robot in a second manipulated position, configured in accordance with one or more embodiments. FIG. 16 illustrates torque 1626 applied to the handlebar 1612 of the handle assembly 1610. The torque 1626 may be, for example, a twisting motion applied by a user. Application of the torque 1626 may cause the orientation of the handlebar 1612 to accordingly twist, resulting in the reaction 1624A for the first sensor first portion 1616A, which may be movement of the first sensor first portion 1616A in at least the positive XA direction, and the reaction 1624B for the second sensor first portion 1616B, which may be movement of the second sensor first portion 1616B in at least the negative XB direction. In certain embodiments, the first sensor first portion 1616A may additionally or alternatively move in the negative YA direction and the second sensor first portion 1616B may additionally or alternatively move in the negative YB direction.

Based on the determination that the first sensor first portion 1616A is moving in the positive XA direction and the second sensor first portion 1616B is moving in the negative XB direction, a determination may be made that the torque 1626 is causing the handlebar 1612 to rotate. The drive assembly 102 may be then operated to cause autonomous robot 100 to rotate orientations. Other embodiments may determine other types of rotation (e.g., with the first sensor first portion 1616A moving in the negative XA direction and the second sensor first portion 1616B moving in the positive XB direction).

In the examples of FIGS. 15 and 16, in addition to determination of the type and direction of movement of the handlebar, the magnitude of the force and/or torque applied may also be determined. Such magnitude may be determined based on the stiffness factor of the fixtures 1414A and 1414B and/or the compliant materials 1430A and 1430B. Thus, it is appreciated that disposing the first sensor portions as close as possible to their respective fixtures may provide a simpler technique for determination of movement of the handlebar at the position of the respective fixtures.

In some embodiments, the magnitude of the force and/or torque may be determined based on the relationship of F=kx and x=Bk/m, where k is the stiffness factor from the fixture and/or compliant materials and m is a factor relating distance to magnetic flux output from a hall effect sensor (e.g., as the magnet of the first sensor portion is disposed farther away from the hall effect sensor of the second sensor portion, the flux output by the hall effect sensor changes, allowing for determination of the distance between the first sensor portion and its respective second sensor portion). The lumped parameter k/m may be an empirically determined factor relating force and magnetic flux. In certain embodiments, such as embodiments where the hall effect sensor is one or more 3-axis (3 degree of freedom) hall effect sensors, the differences in magnetic flux based on the orientation of the magnet may be detected and, accordingly, whether the magnet is moving in the X or Y direction may be determined.

Figure 17:
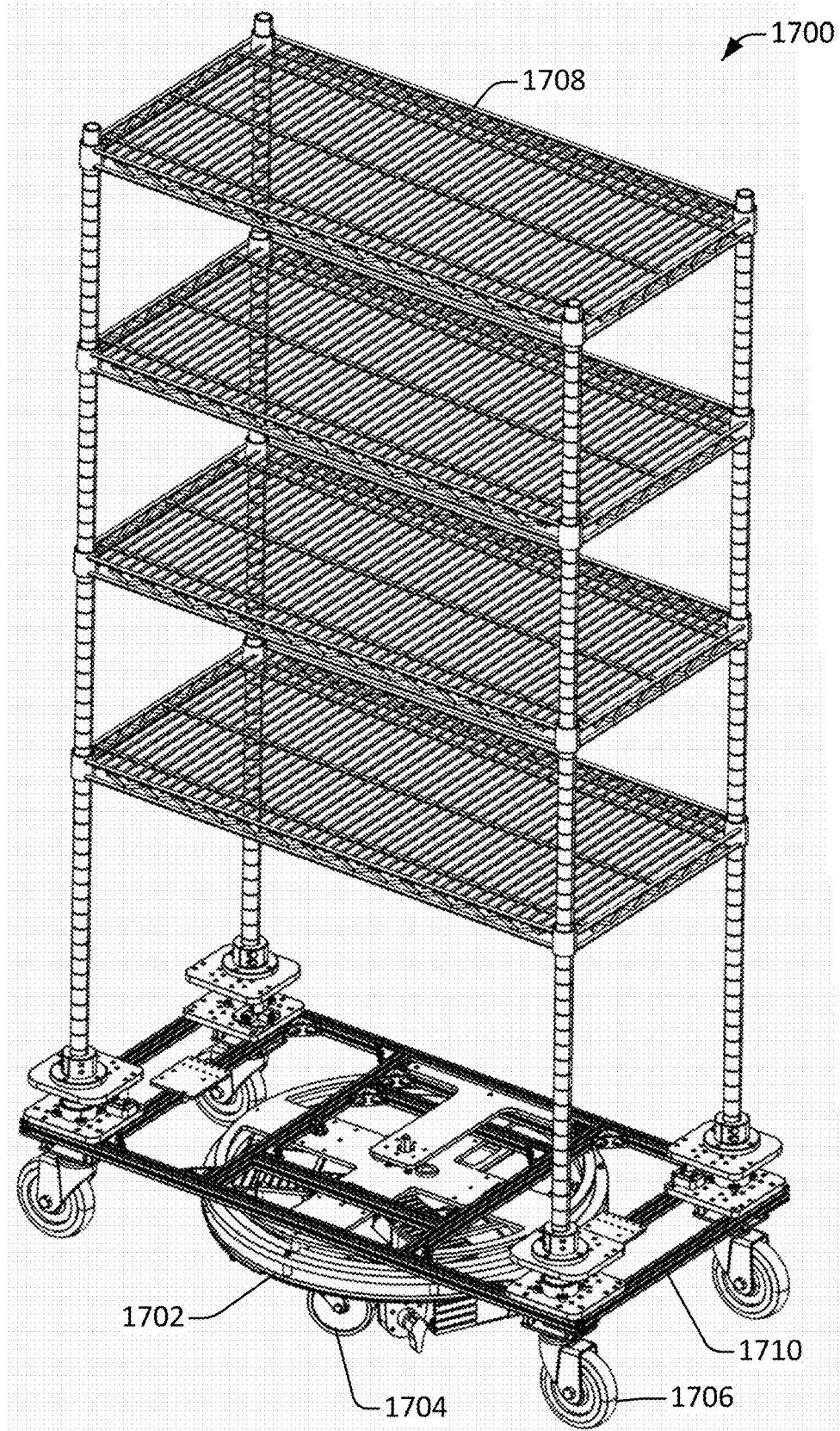
FIG. 17 illustrates a perspective view of an autonomous robot with a force sensing base, configured in accordance with one or more embodiments.

FIG. 17 illustrates a perspective view of an autonomous robot with a force sensing base, configured in accordance with one or more embodiments. FIG. 17 illustrates an autonomous robot 1700 that includes a drive assembly 1702 with a drive unit 1704, a payload support element 1706, a payload 1708, and the force sensing assembly 1710. A human operator may interact with the force sensing base by, for example, pushing or pulling on the force sensing base with a variety of different force input directions to cause the autonomous robot 1700 to translate and/or rotate (e.g., based on pushes that are orthogonal to the force sensing assembly 1710 to cause translational movement or pushes that are on the bias, such as within +/−15 degrees of 45 degrees, to the force sensing assembly 1710 to cause rotational movement). Furthermore, as the sensors are agnostic as to whether the payload 1708 or the force sensing assembly 1710 is being pushed/pulled due to the sensors being configured to determine relative movement between the payload 1708 and the force sensing assembly 1710, a human operator may also push or pull on the payload 1708 to translate and/or rotate the autonomous robot 1700 in a similar manner to that of interacting with the base.

Figure 18:
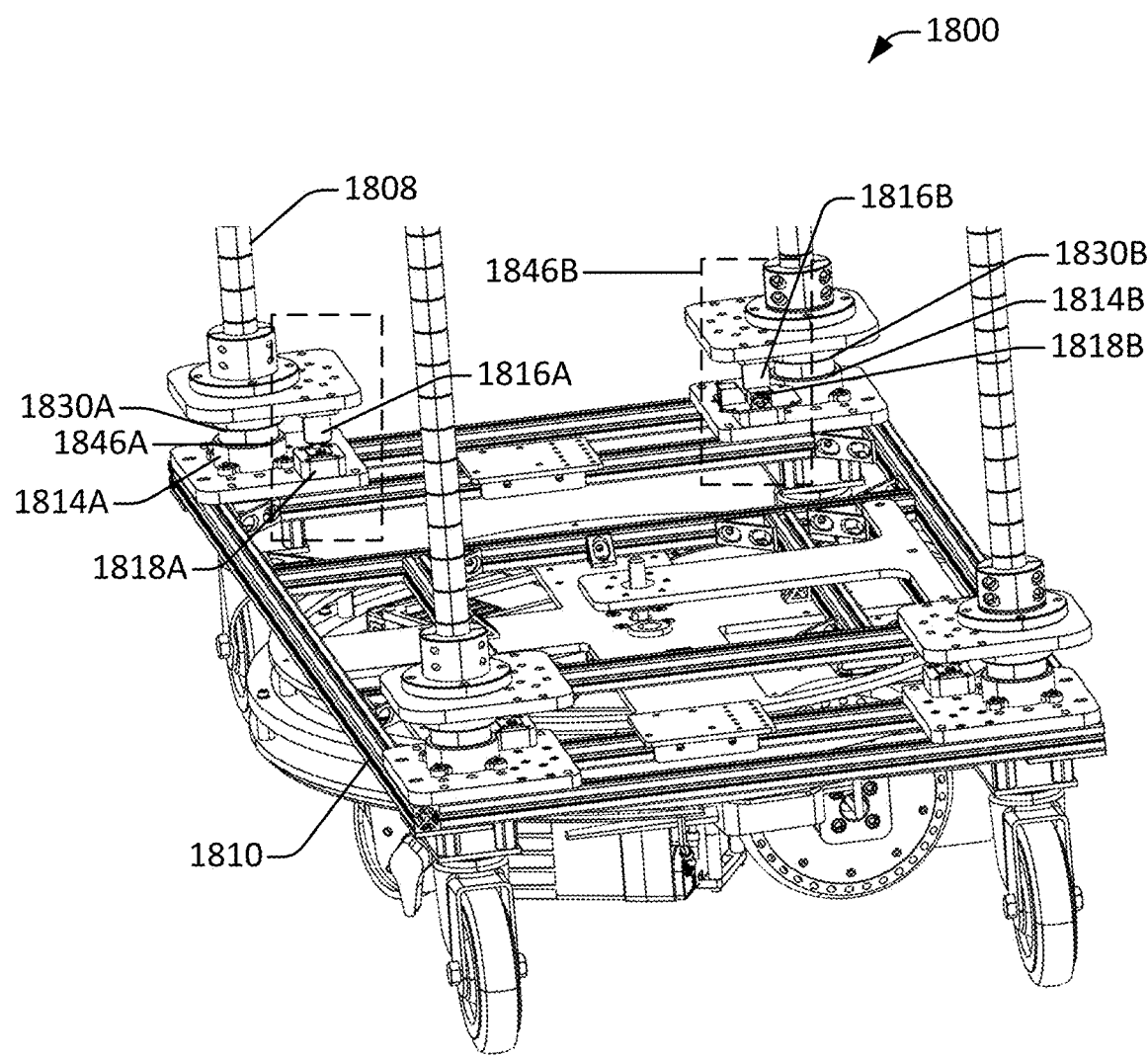
FIG. 18 illustrates a perspective view of portions of a force sensing base, configured in accordance with one or more embodiments.

FIG. 18 illustrates a perspective view of portions of a force sensing base, configured in accordance with one or more embodiments. FIG. 18 illustrates an autonomous robot 1800 that includes force sensing assembly 1810 that may be a force sensing base. As shown, force sensing base 1810 may include a plurality of sensors including a first sensor 1846A and a second sensor 1846B, as well as additional sensors.

In certain embodiments, the first sensor 1846A may include a first sensor first portion 1816A coupled to a portion of a payload 1808 and a first sensor second portion 1818A coupled to a portion of a force sensing assembly 1810. Additionally, the fixture 1814A, which may include compliant material 1830A configured in the same manner as that described herein, may allow for movement of the payload 1808 relative to the force sensing base 1810 (e.g., in response to user inputs). Such movement may result in the first sensor first portion 1816A moving relative to the first sensor second portion 1818A, due to the compliance of the compliant material.

Similarly, the second sensor 1846B may include the second sensor first portion 1816B, coupled to the payload 1808, and the second sensor second portion 1818B, coupled to the force sensing assembly 1810. Similarity or differences in the detected movement of the first sensor first portion 1816A and the second sensor first portion 1816B, as described herein, may result in a determination of whether the autonomous robot 1800 is moved in a translational, a rotational manner, or both.

Autonomous Mobile Robot Movement

Figure 19:
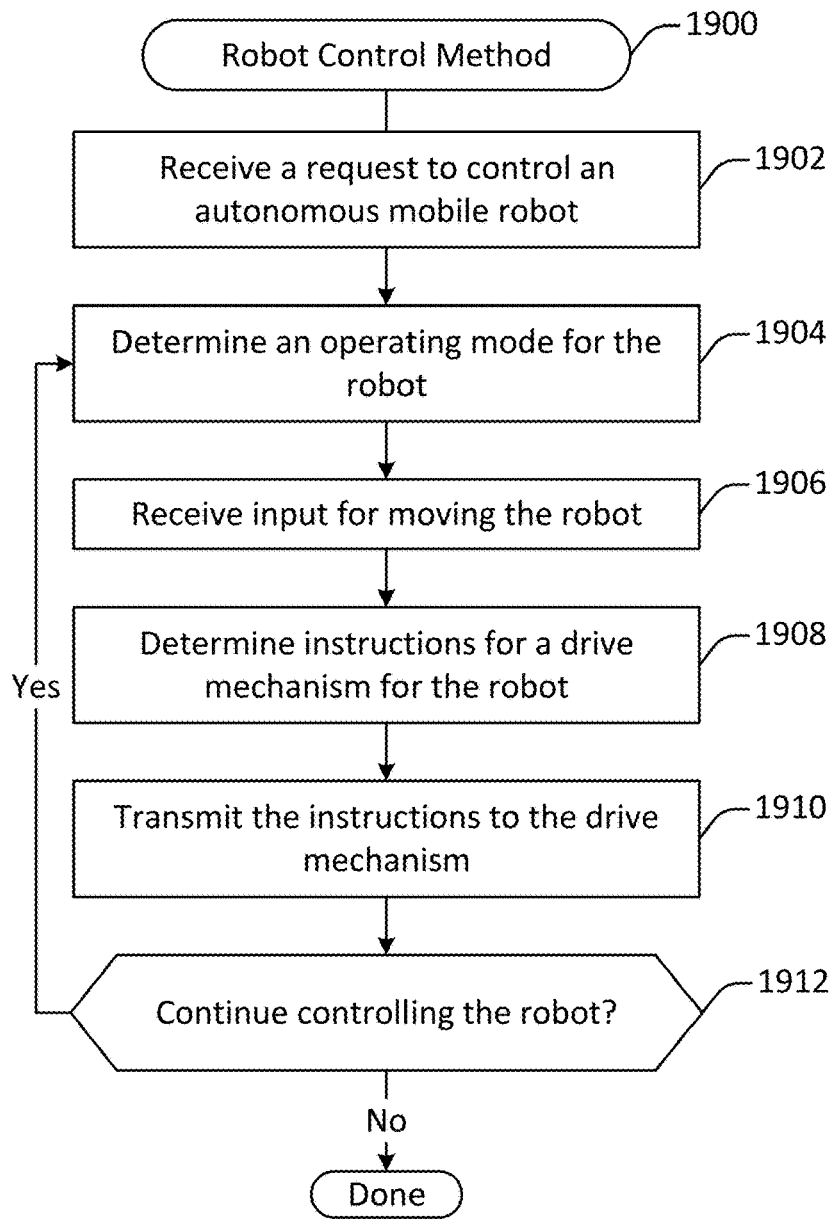
FIG. 19 illustrates a method of controlling an autonomous mobile robot, performed in accordance with one or more embodiments.

FIG. 19 illustrates a method 1900 of controlling an autonomous mobile robot, configured in accordance with one or more embodiments. The method 1900 may be performed at a robot configured as described herein.

According to various embodiments, the method 1900 may be used to transition between various operating modes. Examples of various operating modes are described herein. However, robots may be configured with various types of operating modes depending on the operating context.

In some embodiments, a robot may operate in an autonomous mode in which the robot operates autonomously to perform a task based on instructions received from a remote computing device, such as a fleet controller, or based on internal programming logic. For example, a robot operating in autonomous mode may perform operations such as moving from one location to another location while avoiding obstacles, taking one or more actions to avoid damage or injury to objects or humans, and/or operating one or more lights, mechanical arms, conveyer belts, and/or other components.

In some embodiments, a robot may operate in a manual mode in which the robot acts in a manner responsive to user input. For instance, a robot may remain stationary until force is detected at a force sensor, at which time the robot may move in a direction determined based on the detected force.

In some embodiments, an operating mode may include both manual and autonomous elements. For example, while operating in manual mode, a robot may nevertheless apply a force so as to avoid colliding with a person or object, effectively overriding the user input. For instance, the robot may apply a force that repels the robot from objects and that increases in magnitude with proximity to an object. As yet another example, while operating in autonomous mode, a robot may nevertheless adjust its movement based on user input, such as force received via a force sensor. As yet another example, a robot may operate in a hybrid mode in which it guides a user along a path but nevertheless allows itself to be redirected based on user input. As still another example, a robot may operating in a following mode in which it autonomously follows a human, for instance to aid in the human's efforts to perform a task.

In some embodiments, a robot may shift between operating modes based on user input. For example, a robot that detects the presence of a human may stop what it is doing and face the human. Then, if the human steps away from the robot, the robot may resume autonomous activity. As another example, a robot may operate autonomously until a human grasps the robot's handlebar, at which point the robot may enter into a manual operating model. Then, if the human releases the handlebar, the robot may resume autonomous operation, for instance after the passage of a designated period of time.

At 1902, a request to control an autonomous mobile robot is received. In some embodiments, the request may be generated automatically at a main processing unit or other controller of the robot, for instance during an initialization process.

An operating mode for the robot is determined at 1904. According to various embodiments, an autonomous mobile robot may be configured for operation in various modes, such as forced sensing, autonomous movement, unforced sensing, and/or other modes. In some embodiments, the mode may be determined based on user input. For example, a user may touch or approach the robot to remove it from autonomous movement mode. As another example, a user may activate a button or touch screen to place the robot into forced sensing mode. In some embodiments, the mode may be determined based on instructions received via a communication interface. For instance, the robot may receive an instruction from a fleet controller to enter or leave autonomous mode. As yet another example, the robot may detect when the operator has let go, for instance via one or more capacitive, tactile, and/or force sensing sensors.

Input for moving the robot is determined at 1906. In some embodiments, the input may be received via a user interface at the robot, such as a force sensing handlebar. Alternatively, the input may be received via a communication interface, for instance from a fleet controller.

Instructions for a drive mechanism for the robot are determined at 1908. The instructions are transmitted to the drive mechanism at 1910. The instructions may cause the robot to move in a particular direction. As discussed herein, various types of instructions are possible based on various types of input.

In some embodiments, an autonomous mobile robot in force sensing mode may move in a direction of force exerted by an operator on a force sensing handlebar. For example, the robot may detect a translational direction, rotational direction, and/or magnitude of force, and then direct the drive unit to move the robot in the direction. The robot may be configured such that the operator need only apply a small amount of force despite the robot carrying a heavy load, with the robot effectively magnifying that force to move in the requested direction. According to various embodiments, various types of modifications and constraints may be applied to such a force sensing motion configuration.

In some embodiments, force may be applied asymmetrically, for instance braking much more easily than accelerating. Further, the robot may sense its surroundings and adapt its instructions for safety and/or damage avoidance. For example, the robot may slow to a stop before striking a person or object, moving down a ramp, or entering a hole.

As another example, the robot may slow to a stop when it detects that the operator is no longer touching the robot.

A determination is made at 1912 as to whether to continue controlling the robot. According to various embodiments, the robot is controlled until it is deactivated.

Figure 20:
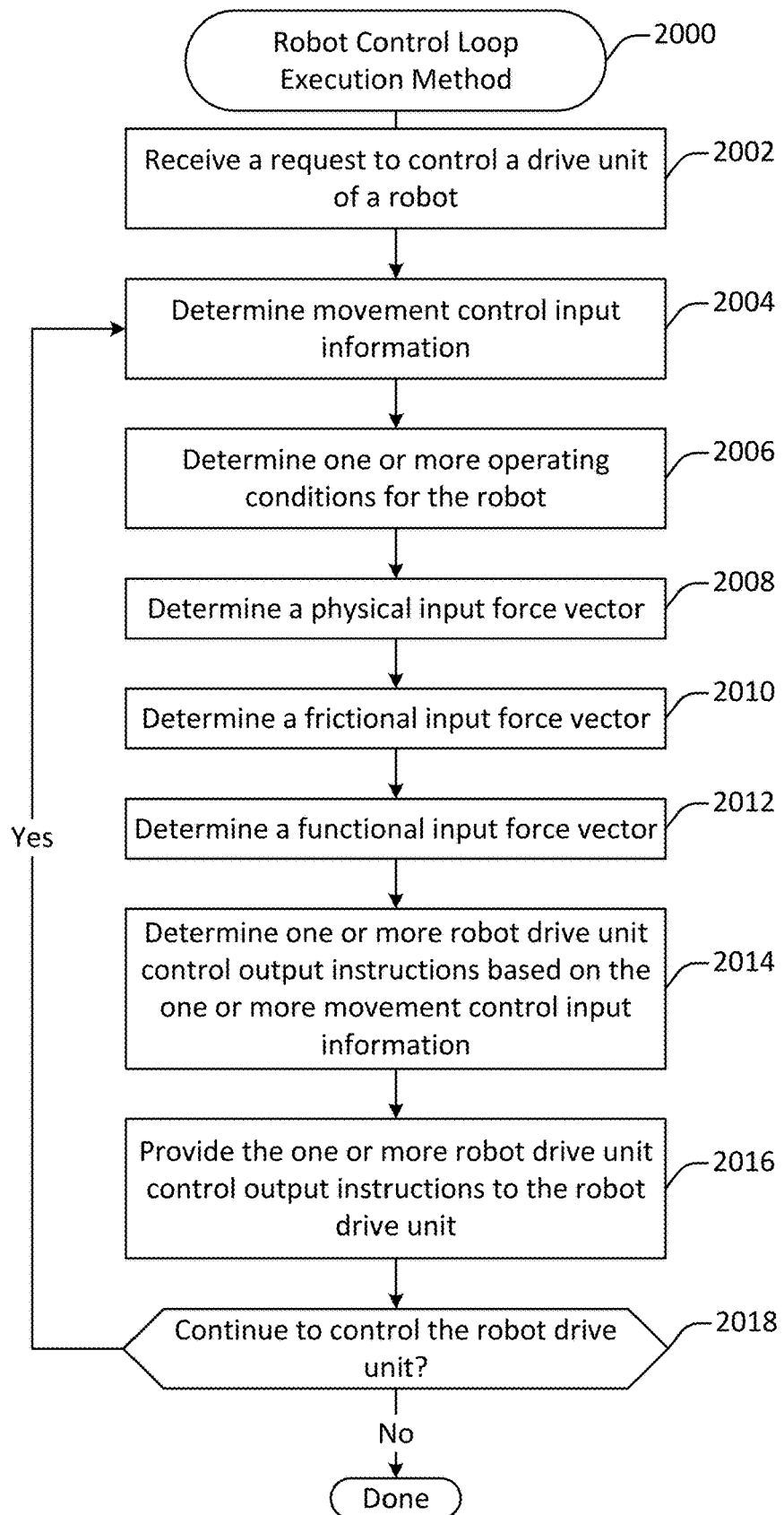
FIG. 20 illustrates a method for executing a robot control loop, performed in accordance with one or more embodiments.

FIG. 20 illustrates a method 2000 for executing a robot control loop, performed in accordance with one or more embodiments. The method 2000 may be used to determine instructions for providing to a robot drive unit for the purpose of causing the robot to move through space. The method 2000 illustrates a more detailed view of operations discussed with respect to the method 1900 shown in FIG. 19.

The method 2000 is described with reference to FIG. 21, which illustrates an architecture diagram for a control portion of a mobile robot configured in accordance with one or more embodiments. The architecture diagram includes drive control input sources 2102 through 2104, which may provide input to a robot drive controller 2106. The robot drive controller 2106 may determine output instructions for a robot drive unit 2110 and may provide the output instructions to the robot drive unit 2110 via a robot drive unit abstraction layer 2108. The method 2000 may be performed at the robot drive controller 2106, which in some embodiments may be implemented at the main board 524 shown in FIG. 5.

According to various embodiments, the method 2000 may be used with any of various types of robots and/or drive systems. Some examples of such robots and drive systems are discussed with respect to FIGS. 1-18. However, the method 2000 may be used in conjunction with various types of robots and/or drive systems. For example, suitable robots may or may not be autonomous, omnidirectional, and/or backdrivable.

A request to control a drive unit of a robot is received at 2002. In some embodiments, the request may be generated when the robot is activated and enters a mode in which it is controllable. The robot may be controlled based on one or more of user input, autonomous decision-making, and/or remote instructions received via a network interface from a remote system such as a fleet controller.

Movement control input information is determined at 2004. According to various embodiments, the movement control input information may include various types of input received from any of various sources, such as the sources 2102 through 2104 shown in FIG. 21. For example, the movement control information may include user input received from a user input device such as a force sensor, joystick, or other control device. For instance, the force sensor may be attached to a force sensing handlebar as discussed throughout the application. As another example, the movement control information may include one or more configuration parameters such as a force multiplier, a virtual friction coefficient, an indication of an operating mode, or the like. As yet another example, the movement control information may include one or more functional control parameters. For instance, the robot may be operating in a mode such that it behaves as if it is moving between virtual rails.

According to various embodiments, the drive unit of the robot may be controlled at least in part by transmitting an instruction determined based on user input received at a force sensor at the robot. For instance, when force is detected at a force sensing handlebar, the robot may be moved in the direction of the force. In general, a relatively larger force detected at the force sensor may correspond with a relatively higher velocity or force applied to the robot drive unit. The term "force multiplier" as used herein refers to any alteration applied to the user input to strengthen or weaken the relationship between the input force received at the force sensor and the force instruction sent to the drive unit. For a given input force, for example, a relatively larger force multiplier would yield a relatively larger increase in velocity. As discussed throughout the application, the force multiplier may be a fixed or configurable scalar, vector, or force output function that receives as inputs one or more parameters including data from the force sensor.

One or more operating conditions for the robot are determined at 2006. In some embodiments, the one or more operating conditions may include any conditions that may affect the robot's handling and control. Examples of such operating conditions may include, but are not limited to: the identity of an operator using the robot, a location of the robot, a direction in which the robot is traveling, an amount of traffic in the vicinity of the robot, a condition associated with the physical environment in which the robot is situated, and the like. For example, the detection of a potentially unsafe condition such as a wet surface may cause all robots to be placed in a safety mode in which a lower force multiplier is applied.

In some embodiments, information about operating conditions may be determined by the robot itself. For instance, the robot may detect the presence of a wet surface based on a loss of traction in the drive unit. Alternatively, or additionally, such information may be received via a communication interface, for instance from a fleet controller. As still another possibility, a user may provide input indicating one or more operating conditions.

A physical input force vector is determined at 2008. In some embodiments, the physical input force vector may be determined based on user input. The force sensor force vector may identify values for force exerted in one or more dimensions at one or more force sensors. For instance, a user may provide input by exerting force on a handlebar connected with the robot. As one example, the force sensor force vector may identify values for translational and rotational forces applied to a force sensor attached to a handlebar at the robot.

In some embodiments, the force sensor force vector may identify values for force exerted in one or more dimensions at one or more force sensors. For instance, the force sensor force vector may identify values for translational (e.g., an x-dimension and a y-dimension) and rotational forces applied to a force sensor attached to a handlebar at the robot.

In some embodiments, forces may be quantified in a coordinate system. In some configurations, the coordinate system may be parameterized relative to the robot. For instance, the x-direction may be treated as "forward" while the y-direction is treated as "sideways". Alternatively, the coordinate system may be parameterized relative to the physical environment. For instance, the x-direction may be treated as "north" or as a particular direction within a building. Additional details regarding an example of such a coordinate situation are discussed herein with respect to the force sensing handlebar assembly.

In particular embodiments, determining the physical input force vector may involve imposing one or more types of smoothing. For example, the system may impose a "dead band" around zero force. In such a configuration, the robot may ignore small amounts of force applied to the force sensor. In this way, the robot may be prevented from drifting when very little force is being applied to the force sensor. Thus, small amounts of force may be mechanically treated as zero force. As another example, the system may smooth force over time, for instance to avoid jitter.

In some embodiments, one or more smoothing operations may be applied in a dimension-specific manner. For instance, if a non-trivial force is being applied in the forward direction but only a trivial amount of force is being applied in the rotational direction, then the non-trivial forward movement force may be accounted for in the physical input force vector while the trivial rotational force is ignored. In this way, a user may be able to easily move the robot in one dimension without the robot drifting in another dimension. Alternatively, one or more smoothing operations may be applied in a dimensionless manner. For instance, if the sum of the magnitudes of the dimension-specific forces is non-trivial, then all forces may be accounted for in the physical input force vector.

A frictional input force vector is determined at 2010. In some embodiments, the friction forces may be applied in the direction opposite to velocity in each dimension. For instance, if the robot is rotating clockwise and moving in a forward direction, then the friction force input vector may be a vector with values applying force in an anticlockwise and backward direction. The current direction of movement may be determined based on the operating conditions determined at 2006.

According to various embodiments, a frictional input force vector may be composed of various components. The frictional input force vector may be determined by aggregating these components, for instance by summing them. Examples of components that may be included in a frictional input force vector include, but are not limited to: Coulomb friction, damping friction, static friction, dynamic friction, other types of friction, and/or combinations thereof.

In some embodiments, as discussed above, a Coulomb friction component may be applied. For instance, the Coulomb friction force vector may be constant in the direction against motion. The Coulomb friction may, for instance, cause the robot to slow down over time absent user input. The particular values used for Coulomb friction may depend on a variety of factors, such as the weight of the robot. For instance, a Coulomb friction coefficient between 0.01 and 0.25 may be applied by multiplying the coefficient by the weight of the robot.

In some embodiments, as discussed above, a damping friction component may be applied. For instance, the damping friction vector may be proportional to velocity in the direction against motion. The damping friction vector may, for example, limit the top speed of the robot in any direction. The damping friction vector may also help to reduce stability concerns, for instance in the event that a robot impacts an obstacle and then rebounds sharply in the opposite direction. In some configurations, a damping friction coefficient between 0.5 and 2.0 may be applied by multiplying the coefficient by the weight of the robot.

A functional input force vector is determined at 2012. According to various embodiments, the functional input force vector may be used to supply force based on functional considerations such as safety, obstacle avoidance, and/or other operational goals.

In some embodiments, the functional input force vector may be used to guide the robot to a particular location or along a particular route within an environment. For example, the functional input force vector may include a virtual magnet force that pulls the robot along a route or to a designated location provided as input. For instance, the functional input force vector may be used to move the robot along a route through an environment, effectively guiding the operator along. However, the operator may be able to override the functional input force by, for instance, exerting a sufficiently strong physical force in a different direction.

In some embodiments, the functional input force vector may be used to guide the robot safely within an environment. For example, to facilitate obstacle avoidance, the functional input force vector may include a virtual repellant force that causes walls, people, and/or other obstacles to effectively push back against the robot. As another example, the functional input force vector may include virtual rumble strips that vibrate the robot under one or more operating conditions.

In some embodiments, the functional input force vector may be used to enforce a speed limit. For example, the functional input force vector may include a component that pushes back in a direction against velocity to prevent the robot from attaining a speed greater than designated maximum. The designated maximum speed limit may change depending on one or more considerations, such as the robot's location within an environment.

In some embodiments, the functional input force vector may be used to provide virtual haptic rails or virtual train rails. Haptic rails may be modeled as a virtual track along which the robot tries to maintain alignment. Moving the robot off of the virtual corridor may require user input such as sharp torque to the handlebar to "pop" the robot off of the rail. At the moment of leaving the rail, the robot may apply a sharp impulse such as a pop or a step in velocity to simulate leaving a track.

In some embodiments, haptic rails or virtual train rails may be defined in any of various ways. For example, the robot may project rails onto the ground via a projector. As another example, haptic rails, virtual train rails, and/or areas of particular speed zones may be detected by a robot based on, for instance, tape or paint applied to a region of the ground.

In some embodiments, the functional input force vector may be used to simulate dynamic rails that lead the operator in a particular direction. For instance, the operator may be guided to move the robot along a virtual track, with movement along the track requiring much less force to the handlebars than movement in a different direction. The rails may be sharp or soft, and may be narrow or wide, depending on the application.

According to various embodiments, the location of virtual rails or obstacles or the initialization of a strafing mode may be determined in various ways. For example, environment detection may involve input from a visual SLAM, inertial measurement unit, or other such data source. As another example, such a mode may be detected based on user input or one or more configuration parameters. For instance, the robot may automatically enter a strafing mode when it enters an aisle. As still another example, virtual rails may be created based on lines painted or projected on the floor. Alternatively, the robot may project rails onto the floor that match the virtual rails being used by the robot.

In some embodiments, the functional input force vector may be used to assist in smooth obstacle avoidance. For instance, the robot may use the functional input force vector to simulate a repelling and/or dampening force when approaching an obstacle, finally slowing to a stop without hitting the obstacle and despite user input on the handlebars pushing the robot in the direction of the obstacle. The functional input force vector may be used to introduce jitter simulating a rumble strip when moving toward an obstacle or other area where the robot determines that it should not travel.

In some embodiments, the functional input force vector may be used to provide haptic feedback via one or more motors in a drive unit on the robot. The strength of the haptic feedback and/or the force needed to operate the robot may be adapted for the individual. The identity of the individual may be determined based on an identifier such as a badge, a bar code, an RFID tag, or other such indicator. Alternatively, or additionally, the adaptation may rely on an estimation of strength as a function of the user's size or force exerted on the robot.

In some embodiments, the functional input force vector may be used to model the inertia of the device and then change that inertia as experienced by the user. Such a model may be used, for instance, to make the robot seem lighter in rotation than an unpowered robot would be given its mass, or to move the effective center of rotational mass backward toward the operator to simulate a "shopping cart" feeling. As still another example, the functional input force vector may be used to lock the orientation of the robot into a "strafing mode". In the strafing mode, the robot may align its orientation with an aisle, grid, user, or other reference point. A strafing mode may be used to simulate inertia based on a direction. For instance, the robot may snap to a virtual grid but effectively provide a preference for a longitudinal axis. In such a configuration, the strafing mode may help to avoid drift down a long straightaway. Similarly, the robot may seem to be lighter in the preferred direction, with motion in a different direction requiring higher activation force.

In some embodiments, the functional input force vector may include a component damping motion in a direction lateral to the front of the robot. For example, such a component may be used, for instance, to facilitate smooth motion in the direction intended by the operator. For instance, such a force may facilitate smooth turning by increasing the force in the direction in which the robot is pointing.

In some embodiments, the functional input force vector may include multiple components. For example, the functional input force vector may include a combination of functional input force vector components corresponding with (1) haptic rails, (2) a speed limit, (3) a navigation objective, and/or any other elements.

In some embodiments, one or more components of a functional input force vector may be determined subject to one or more constraints. For example, an obstacle avoidance force component, a speed limit force, and/or other such forces may be limited to operating in a direction opposed to velocity.

In some embodiments, an unforced sensing mode may allow the robot to be moved without force detection. However, moving a heavy omnidirectional object without activating a drive mechanism can be difficult due to the challenge in changing inertia, such as when turning a corner. To address such a challenge, the functional input force vector may be used to simulate virtual fixed wheels at a point in the robot, making the robot more easily turnable in the unforced sensing model. In some configurations, the location of the virtual fixed wheels may be configurable or adjusted automatically, for instance being moved based on physical slide being detected.

In some embodiments, the functional input force vector may be applied in an unforced sensing mode for safety and/or convenience purposes. For instance, forward force may be applied to compensate for friction. As another example, stopping force may be applied whenever acceleration over a given threshold is detected.

In some embodiments, a mobile robot may lock to orientation, for instance in strafing mode or when following an operator. When locking orientation, the robot may resist attempts to rotate the robot. For instance, applying force to one corner of the robot in a way that would normally cause the robot to rotate may lead to the robot applying a virtual force to another corner to maintain the orientation. Such locking may occur even in an unforced sensing mode, for instance by measuring displacement, wheel movement, inertia, and/or other such sensor values.

In some embodiments, the functional input force vector may depend at least in part on configuration settings that may be adapted to the user. For example, a user may "level up" with experience to allow the use of additional features. As another example, some features may be disabled, depending on the application or area in which the robot is operating. As still another example, an operator or fleet manager may activate or disable one or more features.

In some implementations, the functional input force vector may include one or more elements received from a remote computing device, such as a fleet controller. The one or more elements may include force vector components to be included in the functional input force vector, a function to calculate such components, a goal to be used in calculating such components, and/or other suitable information.

One or more robot drive unit control output instructions are determined at 2014 based on the one or more movement control input instructions. In some embodiments, a movement control output instruction may be provided to the robot drive unit to cause the robot drive unit to apply force to the robot. The movement control output instruction may be determined by combining different types of movement control input information into an instruction capable of being acted upon by the robot drive unit.

According to various embodiments, a movement control output instruction may be specified as a vector in one or more dimensions. For instance, a vector may include different directional components corresponding to movement in the x-direction, the y-direction, and the rotational direction with the robot being positioned on a virtual x-y plane corresponding with the physical environment in which the robot is situated. A directional component may indicate a magnitude associated with movement in the indicated dimension. The magnitude may be indicated as, for instance, a value corresponding with a velocity or a force.

Various techniques may be used to determine the one or more robot drive unit control output instructions. Additional details regarding such techniques are discussed with respect to the method 2200 shown in FIG. 22.

The one or more robot drive unit control output instructions are provided to a drive unit for the robot at 2016. In some embodiments, the robot drive unit control output instructions may be provided to an abstraction layer for the robot, such as the abstraction layer 2108 shown in FIG. 21. The abstraction layer may provide separation between: (1) the determination of how the robot should move; and (2) the control of the hardware components of the drive unit to achieve that movement. In this way, the same controller logic may be applied to different physical configurations of drive units.

Figure 21:
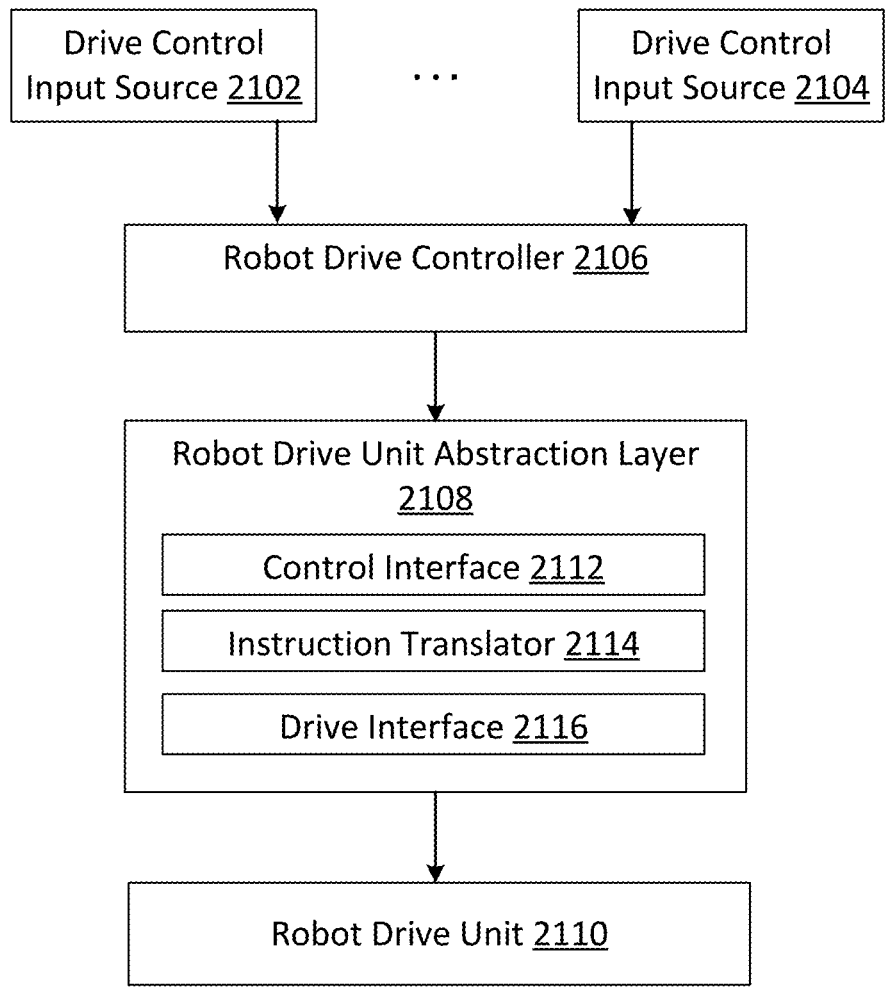
FIG. 21 illustrates an architecture diagram for a control portion of a mobile robot, configured in accordance with one or more embodiments.

As shown in FIG. 21, the robot drive unit abstraction layer 2108 includes a control interface 2112, an instruction translator 2114, and a drive interface 2116. The control interface 2112 receives the control instructions from the robot controller 2106. The instruction translator 2114 translates those control instructions into hardware-level instructions executable by the robot drive unit 2110. The drive interface 2116 then provides those control instructions to the robot drive unit 2110. For instance, the robot drive controller 2106 may issue a control output instruction to the robot drive unit abstraction layer 2108 through the control interface 2112 effectively instructing the drive unit to move with force magnitude (f1, f2, f3) in the (x, y, r) direction. The instruction translator 2114 may then translate that control output instruction into individual motor-level instructions to one or more motors included in the drive unit 2110, such as motors corresponding to different wheels.

Returning to FIG. 20, a determination is made at 2018 as to whether to continue to control the robot drive unit. According to various embodiments, the robot drive unit may continue to be controlled until a terminating condition is met. For example, control may be terminated when the robot enters a deactivated state, an error condition, a charging mode, or another situation in which movement is not indicated.

According to various embodiments, the operations 2004 through 2018 may be performed with any suitable frequency. For instance, this control loop may operate at a rate between the range of 25 hertz to 2 kilohertz.

Figure 22:
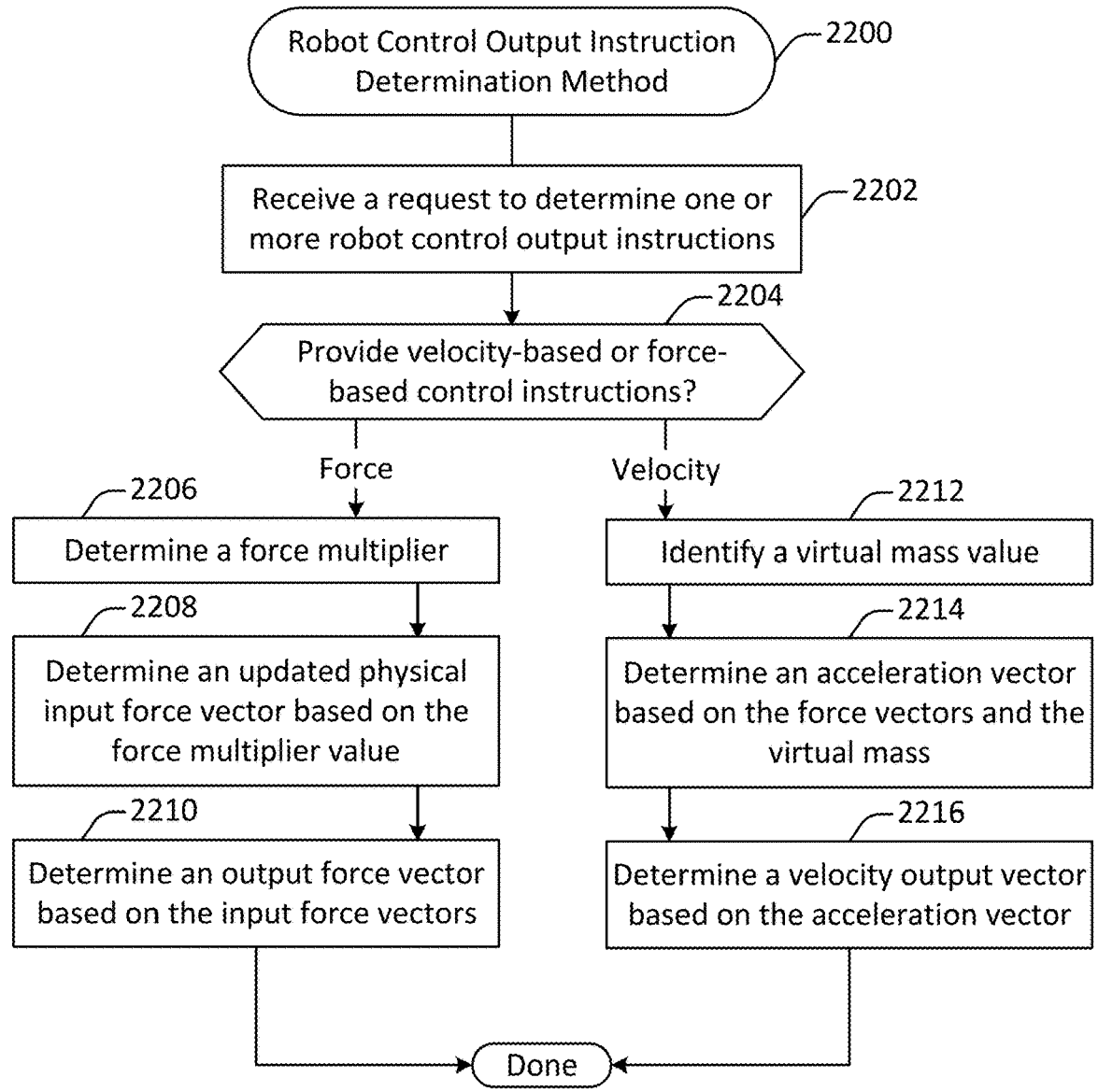
FIG. 22 illustrates a method for determining a robot control output instruction, performed in accordance with one or more embodiments.

FIG. 22 illustrates a method 2200 for determining a robot control output instruction, performed in accordance with one or more embodiments. The method 2200 may be performed at the robot drive controller 2106 shown in FIG. 21. The robot control output instruction may be specified in accordance with the control interface 2112 of the robot drive unit abstraction layer 2108. For instance, the robot control output instruction may be specified as a vector identifying values corresponding to magnitude of either force or velocity in one or more dimensions.

A request to determine one or more robot control output instructions is received at 2202. In some embodiments, the request may be generated in the course of executing a robot control loop. For instance, the request may be generated as discussed with respect to operation 2014 shown in FIG. 20.

A determination is made at 2204 as to whether to provide velocity-based control instructions. In some embodiments, the robot may be controlled by directing the drive unit to move the robot in accordance with a vector that specifies velocity values along one or more dimensions. Alternatively, the robot may be controlled by directing the drive unit to move the robot in accordance with a vector that specifies force values along one or more dimensions.

In some embodiments, the robot may operate entirely in one mode or another. For instance, the robot may be configured to operate entirely in a force-based control mode or a velocity-based control mode. Alternatively, the mode may be dynamically determined based on one or more considerations such as user input, operating conditions, payload weight, location, and/or communication with a remote computing system such as a fleet controller.

According to various embodiments, the determination made at 2204 may reflect one or more tradeoffs. For instance, employing velocity-based controls for a robot may allow the robot to operate with a constant apparent mass to the user, regardless of the actual mass of the robot and any load carried by the robot. However, a velocity-based control approach may create a counterintuitive situation in which the forces exerted on the robot that are not detected by the force sensor are effectively counteracted through the application of the velocity-based control logic since the robot drive unit is controlled so as to match the target velocity. Employing instead a force-based control through the use of a force multiplier may allow the robot to take into account forces exerted on the robot that do not act through the force sensor. However, loading the robot with an increased cargo mass will result in the operator feeling the additional mass in the absence of dynamic adjustment to the force multiplier, discussed in greater detail below.

Upon determining to apply a force-based control instruction, a force multiplier is determined at 2206. In some embodiments, the force multiplier may include one or more values applied as a multiplier to the force sensor force vector to determine control instructions for the robot. In this way, a user may move the robot in a particular direction by applying a force potentially much smaller than what would be required to move the robot in the direction were no force assistance provided.

In some embodiments, the force multiplier may be implemented as a scalar. In such a configuration, the same force multiplier may be applied to all dimensions. Alternatively, the force multiplier may be implemented as a vector. In such a configuration, different dimensions may receive different force multiplication. For example, the rotational dimension may be associated with a larger force multiplier due to the difficulty (relative to translational force) of applying rotational force to an input device such as a handlebar.

In some embodiments, the force multiplier may be fixed. For instance, a force multiplier of 1.5×, 2×, 3×, or another suitable value may be used. Alternatively, the force multiplier may be dynamically determined. For instance, the force multiplier may be increased or decreased based on the operating conditions optionally determined at 2006. In some configurations, the force multiplier may be determined based at least in part on configuration information provided by a fleet administrator and/or robot user.

In some embodiments, a force multiplier may be increased relative to a previously used and/or default value. As an example, a lower force multiplier may be used: (1) when the robot is located in an area designated for slower speed, (2) when a potentially unsafe condition is detected, (3) when a larger or stronger operator is using the robot, (4) when the robot has been manually configured to have a lower force multiplier, (5) when the robot has been detected as carrying less mass, and/or (6) when any other type of operating condition designated for use with a lower force multiplier is detected.

In some embodiments, a force multiplier may be increased relative to a previously used and/or default value. For example, a higher force multiplier may be used (1) when the robot is located in an area designated for higher speed, (2) when it is determined that the robot is operating in an area of low traffic, (3) when the robot has been manually configured to have a higher force multiplier, (4) when the robot has been detected as carrying more mass, when a smaller or weaker operator is using the robot, and/or (5) when any other type of operating condition designated for use with a higher force multiplier is detected.

In some embodiments, a force multiplier may depend on the direction of the physical force relative to a current velocity of the robot. For example, a higher force multiplier may be used when the physical force is in the opposite direction as the velocity. In this way, an operator may be able to slow or stop the robot more easily than the operator can increase the robot's speed. In some configurations, such determinations may be made on a dimension-by-dimension basis. For instance, in a situation in which the robot is moving in the x-direction while rotating counterclockwise, a physical force applied clockwise and in the x-direction may receive a higher force multiplier in the rotational direction than in the translational direction since the rotational physical force is against the direction of velocity while the translational force in the same direction as the velocity.

In some embodiments, a force multiplier may depend on the location of the robot relative to the operator. For example, a larger force multiplier may be used when moving the robot in a direction away from the operator than when moving the robot in a direction toward the operator. In this way, the robot may be safely accelerated away from the operator while at the same time preventing the operator from inadvertently cause the robot to unsafely accelerate toward the operator.

An updated physical input force vector is determined at 2208. In some embodiments, the physical input force vector may be determined by multiplying the physical input force vector determined at 2008 by the force multiplier determined at 2206.

An output force vector is determined at 2210 based on the input force vectors. In some embodiments, the output force vector may be determined by combining the updated physical input force vector determined at 2206 (i.e., $k \cdot F_{sensed}$, where k is the force multiplier and $F_{sensed}$ is the force detected at the force sensor(s)) with the frictional input force vector determined at 2210 (i.e., $F_{friction}$) and the functional input force vector determined at 2212 (i.e., $F_{functional}$. For instance, the various input force vectors may be summed to determine the output force vector. That is, $F_{applied} = k \cdot F_{sensed} + F_{friction} + F_{functional}$.

Upon determining instead to provide velocity-based control instructions, a virtual mass value for the robot is identified at 2212. By causing the robot to move at a velocity consistent with the virtual mass value when acted upon by a force applied to the robot by a user, the virtual mass value may be used to cause the robot to feel as if it weighs a particular amount.

In some embodiments, the virtual mass may be specified as a configuration value. In some configurations, the virtual mass may be fixed. For instance, a robot may be assigned a virtual mass of 60 pounds. Alternatively, the virtual mass may be dynamically determined. For example, the virtual mass value may be increased for users identified as being relatively larger and/or stronger. As another example, the virtual mass value may be dynamically determined based on observations about user input over time.

An acceleration vector for the robot is determined at 2214 based on the force vector and the virtual mass. In some embodiments, the acceleration vector may be determined by dividing the force vector by the virtual mass. Under Newton's second law of motion, the acceleration of an object is equal to the force applied to the object divided by the object's mass. Thus $$a = \frac{F_{sensed} + F_{friction} + F_{functional}}{m}$$

where m is the virtual mass and a is the mass. Thus, acceleration vector.

A velocity output vector for the drive unit is determined at 2216. In some embodiments, the velocity output vector may be determined based on the formula $v_t = v_{t-1} + a \cdot \Delta t$, where $v_{t-1}$ is the current velocity vector for the robot, a is the acceleration vector for the robot, and $\Delta t$ is the time interval for one iteration of the drive unit control loop. Thus, the velocity output vector may be obtained by integrating the acceleration vector over a suitable period of time.

In some embodiments, the current velocity vector may be identified as a vector in dimensions corresponding to those of the acceleration vector determined at 2214. The current velocity vector may be determined as part of the operating conditions determined at 1606. For instance, one or more sensors associated with the drive unit may provide sensor data indicating the velocity at which the robot is currently traveling.

Figure 23:
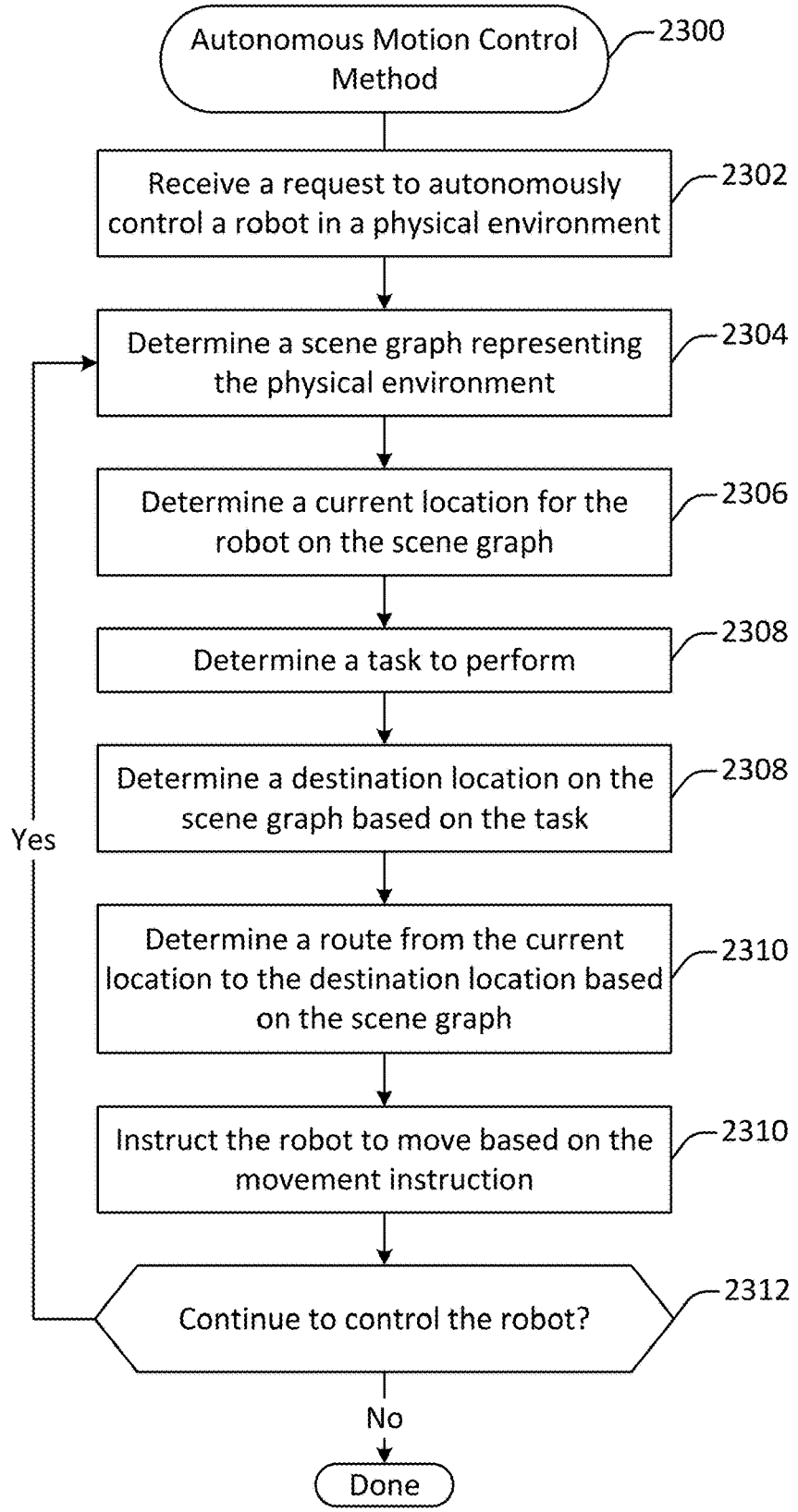
FIG. 23 illustrates a method for autonomous motion control of an autonomous mobile robot, performed in accordance with one or more embodiments.

FIG. 23 illustrates a method 2300 for autonomous motion control of an autonomous mobile robot, performed in accordance with one or more embodiments. The method 2300 may be used to direct an autonomous mobile robot to perform a task, for instance by aiding an operator.

A request to autonomously control an autonomous mobile robot in a physical environment is received at 2302. In some embodiments, the request may be received when the robot enters an autonomous mode, as discussed with respect to operation 1904.

A scene graph of the physical environment is determined at 2304. In some embodiments, the scene graph may provide a virtual representation of a physical environment. For instance, a scene graph of a warehouse may provide a virtual representation of aisles in the warehouse, along with locations of items, zones for dropping off items, and the like. The scene graph may be connected to one or more data sources, for instance allowing the robot to determine a correspondence between an item to be picked up or dropped off and a location in the physical environment. For example, a database may indicate that Item A134 is located in Bin 23 on Shelf 10 of Aisle 9, and the scene graph may provide a virtual representation location of Bin 23, Shelf 10, Aisle 9 in a way that allows the robot to navigate to that location.

In some embodiments, the scene graph may be received from a remote computing device. For instance, the scene graph may be received from a fleet controller configured to control multiple robots. Alternatively, or additionally, elements of the scene graph may be determined by the robot itself. For instance, the robot may analyze sensor data to determine or supplement a scene graph. As still another possibility, a scene graph may be received from a remote computing device and then updated by the robot.

A current location for the robot on the scene graph is determined at 2306. According to various embodiments, the location of the robot may be determined in any of various ways. For example, image data from one or more cameras at the robot may be analyzed using a visual SLAM and/or other techniques to determine a location of the robot relative to one or more reference points. A correspondence between a reference point and the scene graph may then allow the robot to determine its location on the scene graph.

A task to perform is determined at 2308. A destination location on the scene graph is determined at 2308 based on the task. A route from the current location to the destination location is determined at 2310 based on the scene graph. The robot is instructed to move at 2310 based on the movement instruction. According to various embodiments, the particular task, location, and movement instruction may depend in significant part on the application.

In some embodiments, the robotic cart may be configured to aid in the completion of a task in a warehouse. For example, the robot may be configured to aid in a task such as item picking in which it retrieves one or more items from storage in the warehouse for transport to another location. As another example, the robot may be configured to aid in a task such as item replenishment in which it delivers one or more items to one or more locations within the warehouse for future picking. As still another example, the robot may be configured to aid in another task, such as transporting a person, transporting a production input, transporting a production output, providing a mobile light source, monitoring a region, monitoring a person, removing trash, or the like.

In some embodiments, item picking may be performed using any of a variety of protocols. For example, in zone picking, a person may operate in an area of the warehouse to pick items while one or more robots travel to the person to collect those items. As another example, in batch picking, the robot may be equipped with one or more boxes, some or all of which may include items corresponding with multiple orders. As still another example, an autonomous mobile robot may be configured to follow a person as the person moves around a warehouse environment and places items into the robotic cart. As yet another example, an autonomous mobile robot may be configured to facilitate order consolidation, in which it moves to a location close to another robot and supports the movement of items between the two carts.

In some embodiments, in support of these tasks, the robot may use lights or other affordances to interact with humans. For example, a light strip may include lights that may be adapted to a width of a region on a cart. The lights may then be activated to indicate to a human where to remove an item from or where to place an item on the cart.

In some embodiments, a task for the robot to perform may be determined by a coordinator such as a fleet management system providing command and control instructions for a fleet of robots. In such a configuration, the fleet management system may perform route determination and/or optimization. For example, the fleet management system may spread the load to avoid traffic congestion, determine estimates for task completion time, and/or generally determine tasks in a manner that efficiently utilizes multiple robots.

In some embodiments, the route may be parameterized as a nominal trajectory that includes one or more individual waypoints. Each individual waypoint may be a location within the scene graph. However, the robot need not necessarily follow the exact path specified by the nominal trajectory. Instead, the path may be treated as, for instance, a force vector that serves as an input along with other force vectors, such as those associated with obstacle avoidance, that are combined together to determine a direction and magnitude of movement for the robot at any given time.

A determination is made at 2312 as to whether to continue controlling the robot. According to various embodiments, the robot may continue to be controlled as long as it remains in autonomous motion mode.

Figure 24:
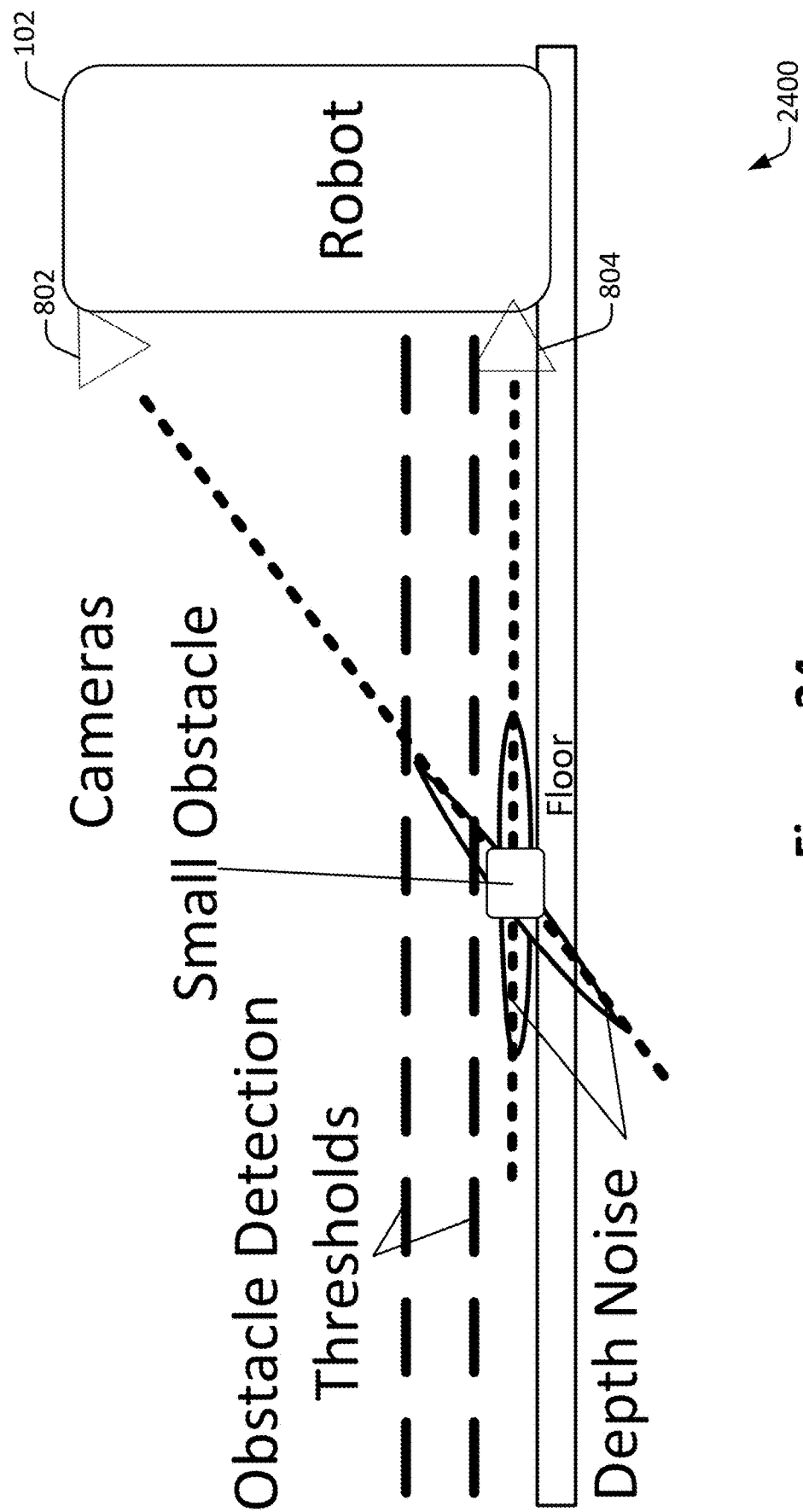
FIG. 24 illustrates a diagram showing sensor placement on an autonomous mobile robot configured in accordance with one or more embodiments.

In some embodiments, an autonomous mobile robot may be equipped with one or more sensors such as visible light cameras. FIG. 24 illustrates a diagram 2400 showing sensor placement on an autonomous mobile robot. Depending on the robot configuration, sensors may be located in various places. Locating a sensor lower on the autonomous mobile robot, for instance as shown at the camera 2404 in FIG. 24, provides improved obstacle detection for small obstacles located on the floor due to reduced depth noise. In contrast, locating a sensor higher on the autonomous mobile robot, for instance as shown at the camera 2402 in FIG. 24, provides for improved visibility of people close to the autonomous mobile robot and can avoid creating a blind spot around the base. However, such a configuration can reduce the field of view around the robot and render small objects located on the floor more difficult to detect.

Robot Light Control Processes and Architecture

Figures 25A, 25B:
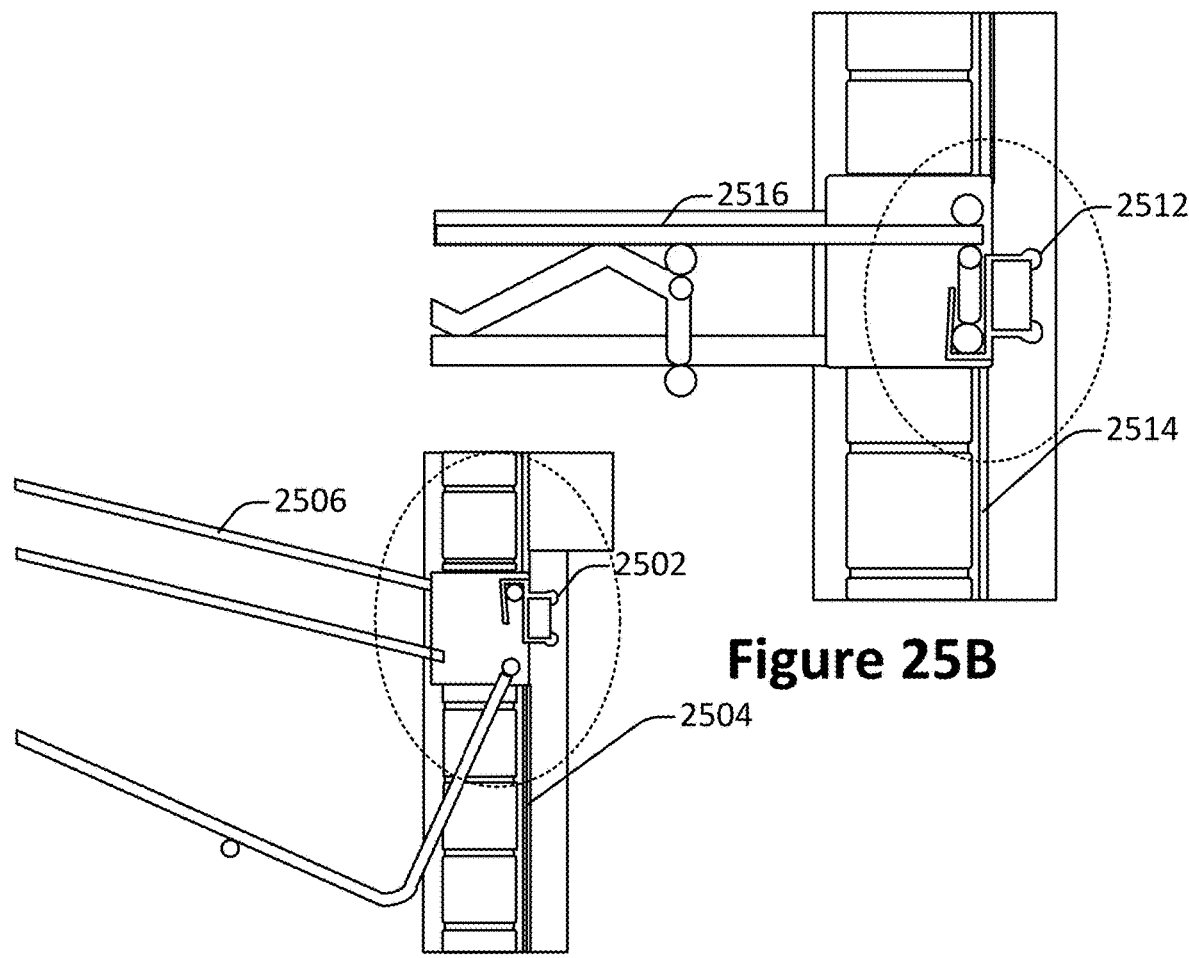
FIG. 25A illustrates a view of an attachment point between a lighting element and a communication channel in an embodiment including an angled shelf configuration.
FIG. 25B illustrates a view of an attachment point between a lighting element and a communication channel in an embodiment including a flat shelf configuration.

FIG. 25A illustrates a view of an attachment point 2502 between a lighting element 2506 and a communication channel 2504 in an angled shelf configuration, while FIG. 25B illustrates a view of an attachment point 2512 between a lighting element 2506 and a communication channel 2514 in a flat shelf configuration. According to various embodiments, the lighting elements 2506 and/or 2516 may be coupled with the communication channels 2504 or 2514 and may provide lighting in a way that assists in the performance of one or more operations using the autonomous mobile robot. For example, the lighting elements 2506 and/or 2516 may include one or more pick-to-light components that highlight one or more external locations such as a location on a shelf in the physical environment in which the autonomous mobile robot is situated. As another example, the lighting elements 2506 and/or 2516 may include one or more put-to-light components that highlight one or more internal locations on the autonomous mobile robot, such as a tote or shelf region. Such lighting elements may facilitate workflows such as picking items from an external shelf and placing them onto the autonomous mobile robot, placing items from the autonomous mobile robot onto an external location such as a shelf or other robot, or the like.

In some embodiments, lights may be used to support a virtual and/or regular pick wall and/or put wall. For example, a regular pick wall or put wall may be a wall of cubbies with lights on the robot and/or the cubbies indicating where to pick and/or place an item. As another example, a robot may be configured to operate as a virtual pick wall or put wall at any location by illuminating lights associated with locations on the robot's chassis (e.g., bins on shelves). In particular embodiments, multiple robots may coordinate to support item transfer between and among the robots and/or another location such as a regular pick and/or put wall.

Figure 26:
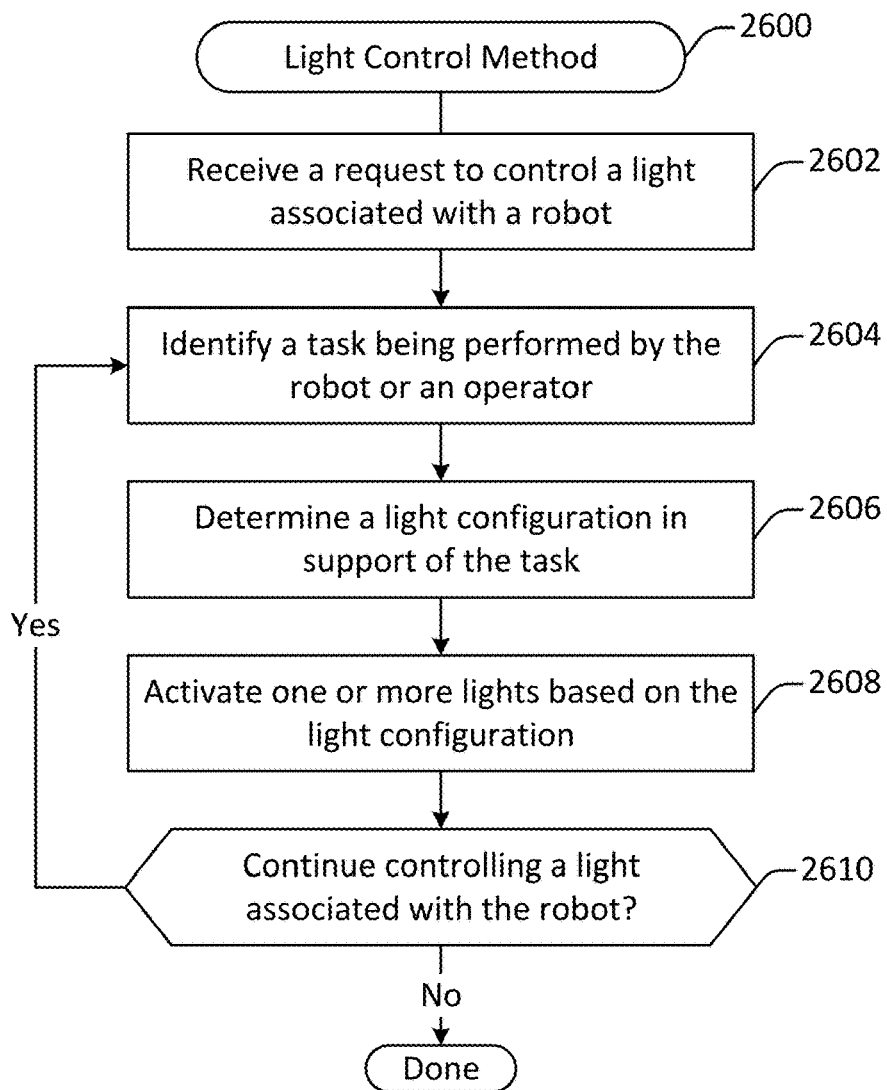
FIG. 26 illustrates a method for controlling one or more lights associated with an autonomous mobile robot, performed in accordance with one or more embodiments.

FIG. 26 illustrates a method 2600 for controlling one or more lights associated with an autonomous mobile robot, performed in accordance with one or more embodiments. A request to control a light associated with an autonomous mobile robot is received at 2602. A task being performed by the robot or an operator is identified at 2604. A light configuration in support of the task is determined at 2606. One or more lights are activated based on the light configuration at 2608. A determination is made at 2610 as to whether to continue to control a light associated with the robot.

According to various embodiments, the method 2600 may be used to configure various types of lights. For example, the robot may be equipped with projectors that can project light onto a surface inside the robot, such as onto a shelf location. For example, the robot may be equipped with projectors that can project light onto a surface off of the robot, such as onto a bin located on a shelf in a warehouse aisle. As still another example, the robot may be equipped with a light strip that can highlight an area of an autonomous mobile robot, such as a region of a shelf. A light may be configured as a laser beam on a gimbal, a laser line, and addressable LED strip, a fixed light whereby the robot moves the light by aligning the robot with the shelf, and/or any other suitable lighting configuration.

According to various embodiments, the method 2600 may be used to configure various types of lighting operations. For example, the robot may be configured to light up an area or container corresponding with where an item is to be picked up from or moved to. For instance, the robot may project a light onto an external bin corresponding to an item to be picked up and then instruct an addressable LED strip to light up an area on the robotic car where the item is to be placed.

Figure 27:
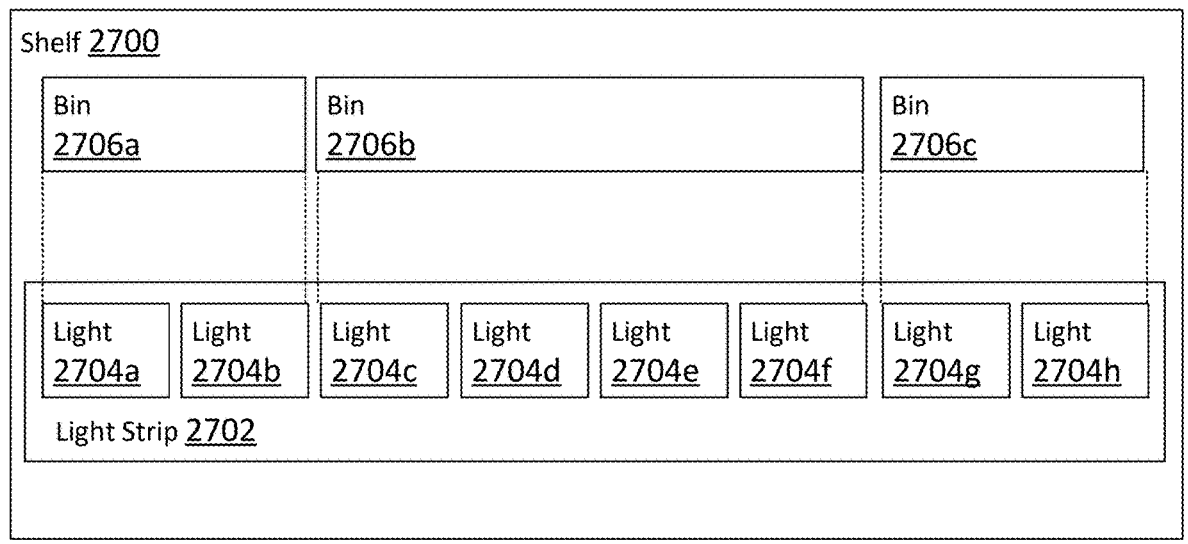
FIG. 27 illustrates a block diagram representation of a shelf that may form part of an autonomous mobile robot, configured in accordance with one or more embodiments.

FIG. 27 illustrates a block diagram representation of a shelf 2700 that may form part of an autonomous mobile robot, configured in accordance with one or more embodiments. The shelf 2700 includes a light strip 2702 which in turn includes the lights 2704a through 2704h. The shelf includes three storage bins: 2706a, 2706b, and 2706c.

As shown by the dotted lines, the bins are arranged vertically in line with the lights included on the light strip 2702. For instance, the bin 2706a is positioned vertically in line with the lights 2704a and 2704b, while the bin 2706b is positioned vertically in line with the lights 2704c through 2704f.

In some embodiments, the shelf 2700 may be coupled with the chassis of the robot. The light strip 2702 may be controlled by a controller associated with the robot, for instance as discussed with respect to the components 516 and 524 shown in FIG. 5, with respect to the components illustrated in FIG. 25A and/or FIG. 25B, and with respect to the method 2600 shown in FIG. 26.

According to various embodiments, the bins 2706a through 2706c may be used to store items. For instance, the bins 2706a through 2706c may be used to store items that are picked from a shelf in a warehouse for shipment or rearrangement and/or may be used to store items that are placed on the robotic cart for distribution into the warehouse.

In some embodiments, the bins 2706a through 2706c may be reconfigurable. For instance, the bin 2706b may be removed and replaced with two smaller bins each corresponding to two lights. Further, the particular size of the bins and lights and hence the number of lights corresponding to each bin may vary depending on the particular configuration of the robot. Thus, various configurations of an autonomous mobile robot may include various numbers and configurations of shelves, bins, light strips, and lights.

In some embodiments, the light strip 2702 may be used to facilitate efficient operation of the autonomous mobile robot by a human. For instance, when the robot is tasked with facilitating the transfer of an item from the bin 2706c to another location, the lights 2704g and 2704h may be activated to indicate the source of the item.

According to various embodiments, various patterns and combinations of patterns may be employed. For instance, when the robot is tasked with facilitating the transfer of an item to the bin 2706b from another location, the lights 2704c through 2704f may be activated and remain activated until the task is completed. Alternatively or additionally, the light strip 2702 may be instructed to display another pattern of light activations to guide the human operator to the correct bin, such as a sequence of blinking light activations from 2704a to 2704d and from 2704h to 2704e.

According to various embodiments, one or more light strips may be used to guide a human operator to move items between bins on the same autonomous mobile robot. For instance, the lights 2704a and 2704b may be activated in a blinking pattern while the lights 2704g and 2704h are activated in a solid pattern to indicate that an item is to be moved from the bin 2706a to the bin 2706c.

Fleet Control

Figure 28:
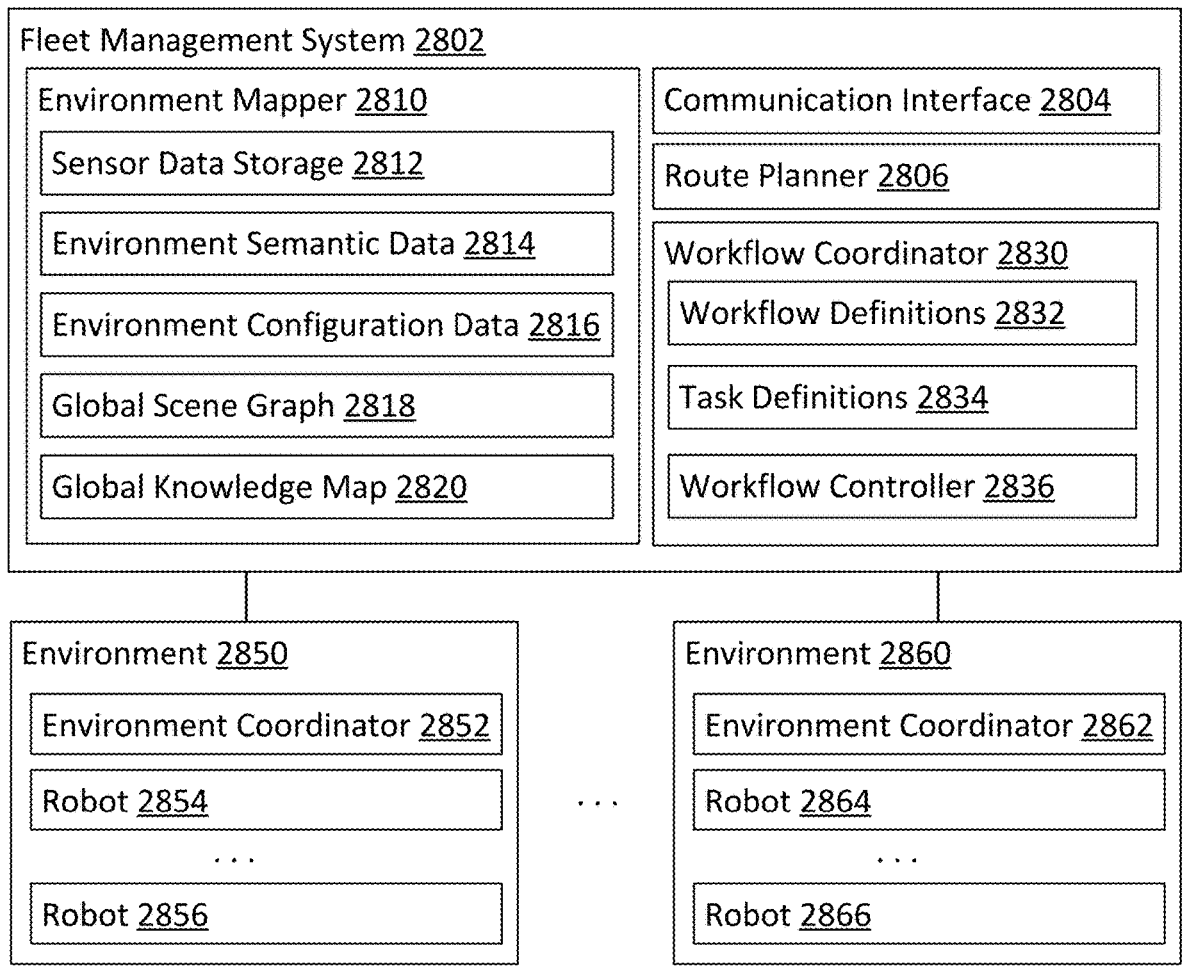
FIG. 28 illustrates a robotic cart ecosystem, configured in accordance with one or more embodiments.

FIG. 28 illustrates a robotic cart ecosystem 2800, configured in accordance with one or more embodiments. The robotic cart ecosystem 2800 may facilitate control and coordination of various autonomous mobile robots operating across one or more facilities. The robotic cart ecosystem 2800 includes a fleet management system 2802 in communication with computing devices located at one or more environments 2850 through 2860. The environments 2850 through 2860 include the environment coordinators 2852 through 2862 as well as the robots 2854 through 2856 and 2864 through 2866. The fleet management system 2802 includes an environment mapper 2810, a communication interface 2804, a route planner 2806, and a workflow coordinator 2830. The environment mapper 2810 includes sensor data storage 2812, environment semantic data 2814, environment configuration data 2816, a global scene graph 2818, and a global knowledge map 2820. The workflow coordinator 2830 includes workflow definitions 2832, task definitions 2834, and a workflow controller 2836.

According to various embodiments, the environment 2850 may correspond to a specific, defined physical area such as the interior of a warehouse. In some embodiments, an environment coordinator 2852 is a computing system that stores or can access information related to the environment 2850. For instance, the environment coordinator 2852 may include or may communicate with a warehouse management system that stores information regarding items stored in the environment 2850, orders that include items to be selected from the environment 2850, and/or other information.

In some embodiments, the environment coordinator 2852 can coordinate communication with and among the robots 2854 through 2856. For instance, the environment coordinator 2852 may provide a gateway through which the robots 2854 through 2856 communicate with the fleet management system 2802. Alternatively, or additionally, one or more of the robots 2854 through 2856 may communicate directly with the fleet management system 2802.

In some embodiments, a warehouse includes one or more robots 2854 through 2856 configured in accordance with techniques and mechanisms described herein. In some configurations, each of the robots may be configured identically. Alternatively, different robots may be configured with different characteristics, such as different numbers and arrangements of shelves and bins.

In some embodiments, the fleet management system 2802 may be located in a cloud computing environment. Alternatively, the fleet management system 2802 may be located in a different place, such as at the environment 2850. Communication with the 2802 may be conducted via the communication interface 2804, which may be configured to receive and transmit communications via a network interface.

According to various embodiments, the 2806 may be configured to determine nominal routes for the robots 2854 through 2856 based on the 2818 and on workflows assigned to the robots 2854 through 2856. For instance, a robot 2854 may be assigned a workflow that involves moving from a first location to a second location within the environment 2850. The two locations may be represented on the global scene graph 2818. The route planner 2806 may then determine a nominal path from the first location to the second location. The nominal path may be specified as a sequence of one or more waypoints within the global scene graph. These waypoints may then correspond to physical locations within the environment 2850. The route may be provided to the robot 2854 to aid in navigation. However, the robot 2854 need not strictly follow the nominal path. Rather, the robot 2854 may attempt to navigate to the waypoints in sequence while avoiding obstacles, maintaining the safety of humans near the robot, and following other directives that supersede the requirement of adhering to the nominal path. Additional details regarding the determination of routing information are discussed with respect to the method 3100 shown in FIG. 31.

According to various embodiments, the environment mapper 2810 may be configured to determine and maintain an up-to-date representation of the environment 2850 to aid in determining control instructions for the robots 2854 through 2856. The environment mapper 2810 may receive sensor data from one or more sensors located within the environment 2850. Such sensor data may be stored in the sensor data storage 2812.

In some embodiments, sensor data may be received from the robots 2854 through 2856. For instance, the robots 2854 through 2856 may each include one or more visible light cameras, depth sensors, LIDAR sensors, microphones, and/or other sensors, as discussed herein. Sensor data captured at such sensors may be transmitted to the environment mapper 2810 via the communication interface 2804.

In some embodiments, sensor data may be received from one or more sensors at the environment 2850 other than those included in the robots 2854 through 2856. For instance, the sensor data may be received from one or more handheld devices or one or more fixed sensors.

In some embodiments, the sensor data may include raw data captured by sensors at the environment 2850. Alternatively, or additionally, the sensor data may include processed data such as a representation of the 2850 determined at the environment 2850 based on raw sensor data.

In some embodiments, the environment semantic data 2814 may include semantic information about objects located within the environment 2850. For instance, the 2814 may include information characterizing items stored within the environment 2850. Such information may include location data, barcode data, object recognition data, and the like. For example, an item stored in a warehouse may be stored at a particular location (e.g., Zone 6A, aisle 3, bay 1, shelf A, slot 1), may be associated with one or more images to aid in object recognition, may be associated with a barcode value to determine when the object has been scanned, and/or may be associated with other metadata such as a quantity of the item available.

In some embodiments, some or all of the environment semantic data 2814 may be received from the environment coordinator 2852. For instance, the environment coordinator 2852 may periodically send updated environment semantic data 2814 to the environment mapper 2810 via the 2804.

In some embodiments, some or all of the environment semantic data 2814 may be determined via an enrollment or onboarding process. For instance, information characterizing and facilitating the recognition of elements of an environment, including objects within the environment, may be determined based on sensor data captured by traversing the physical environment with, for example, a handheld scanner. Additional details regarding the determination of such information are discussed in U.S. patent application Ser. No. 18/055,651 by Amer et al., titled PLACE ENROLLMENT IN A ROBOTIC CART COORDINATION SYSTEM, filed Nov. 15, 2022, and U.S. patent application Ser. No. 18/055,657 by Amer et al., titled OBJECT ENROLLMENT IN A ROBOTIC CART COORDINATION SYSTEM, filed Nov. 15, 2022, both of which are hereby incorporated by reference in its entirety and for all purposes.

According to various embodiments, the environment configuration data 2816 may include any information about the environment 2850. For example, the environment configuration data 2816 may indicate information about people within the environment 2850, such as the identities, numbers, roles, preferences, and other characteristics of the people. As another example, the environment configuration data 2816 may indicate information about the robots 2854 through 2856, such as the identities, numbers, configurations, battery lift, and other characteristics of the robots. As yet another example, the environment configuration data 2816 may include information about rules, guidelines, objectives, and/or other governance information for the environment 2850.

In some embodiments, some or all of the environment configuration data 2816 may be determined as part of an onboarding or configuration process. Alternatively, or additionally, some or all of the environment configuration data 2816 may be received from the environment coordinator 2852. For instance, the environment coordinator 2852 may provide updated environment configuration data 2816 on a periodic basis.

According to various embodiments, the global knowledge map 2820 may include information characterizing the location of elements within the environment 2850 over time. For example, the global knowledge map 2820 may indicate navigable areas of the environment 2850, the locations of robots within the environment 2850, the locations of humans within the environment 2850, the locations of items within the 2850, the locations of obstacles within the environment 2850, and/or any other location information.

In some embodiments, the global knowledge map 2820 may include multiple layers. For instance, different layers may be used to store the locations of navigable areas, robots, humans, obstacles, and/or items.

In some embodiments, the global knowledge map 2820 may include a graph data structure. For instance, intersections within the environment 2850 may be represented as nodes in the graph data structure, with corridors connecting intersections being represented as edges between the nodes. In such a configuration, the nodes may serve as waypoints in a nominal route. Further, the locations of elements such as robots, items, and people may be represented as points along edges or at nodes.

In some embodiments, the global knowledge map 2820 may represent fixed physical features within the environment 2850. For instance, in a warehouse environment, the global knowledge map 2820 may indicate the locations of doors, aisles, pick walls, put walls, robot charging stations, and the like.

In some embodiments, the global knowledge map 2820 may represent virtual features within the environment 2850. For instance, in a warehouse environment, the global knowledge map 2820 may represent robot waiting zones, zones that are off limits to robots, areas of reduced speed, high-speed transportation corridors, robot parking zones, and/or other such virtual features.

In some embodiments, the global knowledge map 2820 may be determined based on a combination of the sensor data stored in the 2812, the environment semantic data 2814, and the environment configuration data 2816. For example, object recognition may be performed on the sensor data in combination with the environment semantic data 2814 to determine the identity and location of items within the environment. As another example, inventory information received from the environment coordinator 2852 may be used to represent the locations of items within the global scene graph 2818.

According to various embodiments, the 2818 may represent the state of the global knowledge map 2820 at the current point in time. For instance, the global knowledge map 2820 may store location information for a robot 2854 at different points in time as the robot moves through the environment 2850. In contrast, the global knowledge map 2820 may serve as an up-to-date representation of the environment 2850 that includes only the most recent location of the robot 2854.

According to various embodiments, the 2830 is configured to determine workflow instructions for the robots 2854 through 2856. The workflow instructions may be determined by the workflow controller 2836. Additional details regarding a process for determining the workflow instructions are described with respect to the method 2900 shown in FIG. 29.

A task definition may characterize a set of actions for a robot to perform to complete a granular goal. According to various embodiments, a variety of task definitions 2834 may be used. The specific task definitions 2834 for a particular environment 2850 may depend on the configuration of the environment 2850 and the specific applications executed by the robots 2854 through 2856. However, some examples of task definitions are as follows.

In some embodiments, a robot may move from one location to another location while avoiding obstacles and maintaining safety.

In some embodiments, a robot may wait for a human to place a designated item on the robot, which may include actions such as activating a projected lighting element to indicate a source location corresponding to an original location for the item, activating a light strip lighting element to indicate a placement position for the item, following the human, re-orienting the position of the robot to face the human, and/or waiting to receive scanning data indicating that the item is being placed.

In some embodiments, a robot may wait for a human to place a designated item on a shelf from the robot, which may include actions such as activating a light strip lighting element to indicate a source location corresponding to an original location for the item, activating a projected lighting element to indicate a placement position for the item, following the human, re-orienting the position of the robot to face the human, and/or waiting to receive scanning data indicating that the item is being placed.

In some embodiments, a robot may facilitate the transfer of an item from one bin on the robot to another bin on the robot, which may include actions such as activating a light strip lighting element to indicate a source position for the item, activating a light strip lighting element to indicate a destination position for the item, re-orienting the position of the robot to face a human, and/or waiting to receive scanning data indicating that the item is being moved.

In some embodiments, a robot may conduct a systematic scan of an environment, which may include actions such as moving along a path, capturing sensor data, repositioning a sensor such as a movable camera, and transmitting the sensor data.

In some embodiments, a robot may perform activate a robotic arm or other device, which may include actions such as grasping and item and moving the item from one location to another.

In particular embodiments, a workflow may involve a task in which the robot turns around to expose an opposite side. Such an action may support item consolidation operations, picking operations, or replenishment operations involving a robot equipped with bins on both sides.

According to various embodiments, the workflow instructions may be determined based on a set of predefined workflow definitions 2832 that each characterize a sequence of operations for performing a workflow. The individual operations in a workflow may be parameterized as tasks defined based on the task definitions 2834. A workflow may be defined as one or more elements in a mutable layer of the global scene graph 2818.

The specific workflow definitions for a particular environment 2850 may depend on the configuration of the environment 2850 and the specific applications executed by the robots 2854 through 2856. However, some examples of workflow definitions are as follows.

In some embodiments, a workflow may support discrete picking, in which each individual bin on the robot corresponds with a single order, and items are placed into the bins to fill the orders.

In some embodiments, a workflow may support batch and sort picking. In such a workflow, a bin may correspond to multiple orders. After the items are picked, the items are then resorted from the bins into the boxes for shipping in a consolidation workflow.

In some embodiments, a full push-to-pick workflow may involve a robot configured as a robotic cart navigating to a designated location such as the location of a human, being pushed by the human or autonomously following the human around an area to move a set of items onto or off of the robotic cart, and then moving to a destination location after the items have been moved. In this way, a human worker may potentially be presented with a sequence of carts without having to move empty or full carts to or from the general location where picking occurs.

In some embodiments, a partial push-to-pick workflow may be similar to a full push-to-pick workflow except that a robotic cart that for which picking is partially complete may move to a different location at which full orders or boxes that are completed may be unloaded. Then, the now emptier robotic cart may return to the human so that picking may be completed.

In some embodiments, a workflow may support one-cart consolidation. In a one-cart consolidation workflow, a robotic cart may have items that need to be moved from one bin to another or from the robotic cart to another location off the robotic cart. In such a workflow, the robotic cart may activate lights to indicate bins from which items need to be removed and/or into which items need to be placed. For instance, items may be moved from the robotic cart to a set of stationary boxes or bins on a "put wall" in a warehouse environment.

In some embodiments, a workflow may support multi-cart consolidation. In a multi-cart consolidation workflow, two or more robotic carts move to positions proximate to one another. The robotic carts can then coordinate to activate lighting elements to facilitate the movement of items from one bin on one of the robotic carts to another bin, which may potentially be on a different robotic cart. For instance, one or more lights may be activated to indicate a source location of an item to be moved. Then, after the item is picked up and scanned, another one or more lights may be activated to indicate a destination location for the item.

In some embodiments, a workflow may support cascade picking. In a cascade picking workflow, multiple robotic carts may coordinate with a human to move items from the robotic carts to shelves in a warehouse. For instance, a first robotic cart may move to a first location, at which a human moves a first one or more items from the first robotic cart to a location on a warehouse shelf. After moving the one or more items, the human may continue to walk along a path along which a second robotic cart is pre-positioned to facilitate the transfer of a second one or more items from the second robotic cart. At the same time, the first robotic cart may be moving ahead to a later position along the human's path. A similar workflow may be adopted for cascade replenishment.

In some embodiments, a workflow may support a virtual cart. In a virtual cart workflow, multiple carts may be instructed to follow a lead cart in a virtual train. Then, a human may replenish the warehouse or put items onto the carts. The virtual train may be configured such that the cart onto which an item is to be placed or from which an item is to be selected is positioned in front of the human at a given time.

In some embodiments, a workflow may support a virtual pick wall that includes one or more robots. In a virtual pick wall workflow, one or more robots may be instructed to autonomously move to a designated area. When the workflow includes two or more robots, the robots may arrange themselves in a formation relative to one another. The robots may then coordinate to serve as a virtual wall from which items can be removed and placed elsewhere. For example, the robots may illuminate one or more lights to indicate shelves or bins on the robots from which items are to be removed and placed elsewhere, such as fixed shelves or bins in a warehouse. In this way, items may be quickly and efficiently transferred by a human from one or more robots to another location.

In some embodiments, a workflow may support a virtual put wall that includes one or more robots. In a virtual put wall workflow, one or more robots may be instructed to autonomously move to a designated area. When the workflow includes two or more robots, the robots may arrange themselves in a formation relative to one another. The robots may then coordinate to serve as a virtual wall into which items can be placed. For example, the robots may illuminate one or more lights to indicate shelves or bins on the robots onto or into which items are to be placed, for instance after being removed from fixed shelves or bins in a warehouse. In this way, items may be quickly and efficiently transferred by a human from a location onto one or more robots.

In some embodiments, a workflow may support a virtual pick wall and a virtual put wall in concert. In such a workflow, two or more robots may be instructed to autonomously move to a designated area and arrange themselves in a formation relative to one another. The robots may then coordinate to serve as virtual walls into which items can be placed and from which items can be picked. For example, the robots may illuminate one or more lights to indicate shelves or bins on the robots onto or into which items are to be placed and/or from which items may be picked. In this way, items may be quickly and efficiently transferred by a human between and among locations on and off of the robots.

In particular embodiments, a robotic cart may be equipped with weight sensors. Weight sensors may indicate electronically when an item has been removed from a bin, potentially eliminating the need to scan the item. For instance, when the weight sensors detect that an item has been lifted from a bin, the source lights may be turned off and the destination lights may be activated.

According to various embodiments, one or more of the determinations made by the workflow controller 2836 and/or the route planner 2806 may be adaptively improved over time, for instance via a machine learning algorithm. In this way, the workflow controller 2836 and/or the route planner 2806 may dynamically learn to predict various outcome values such as a time required to execute a workflow and may then, in consequence, learn to improve the determination of groups of tasks, workflows, and routes over time.

Figure 29:
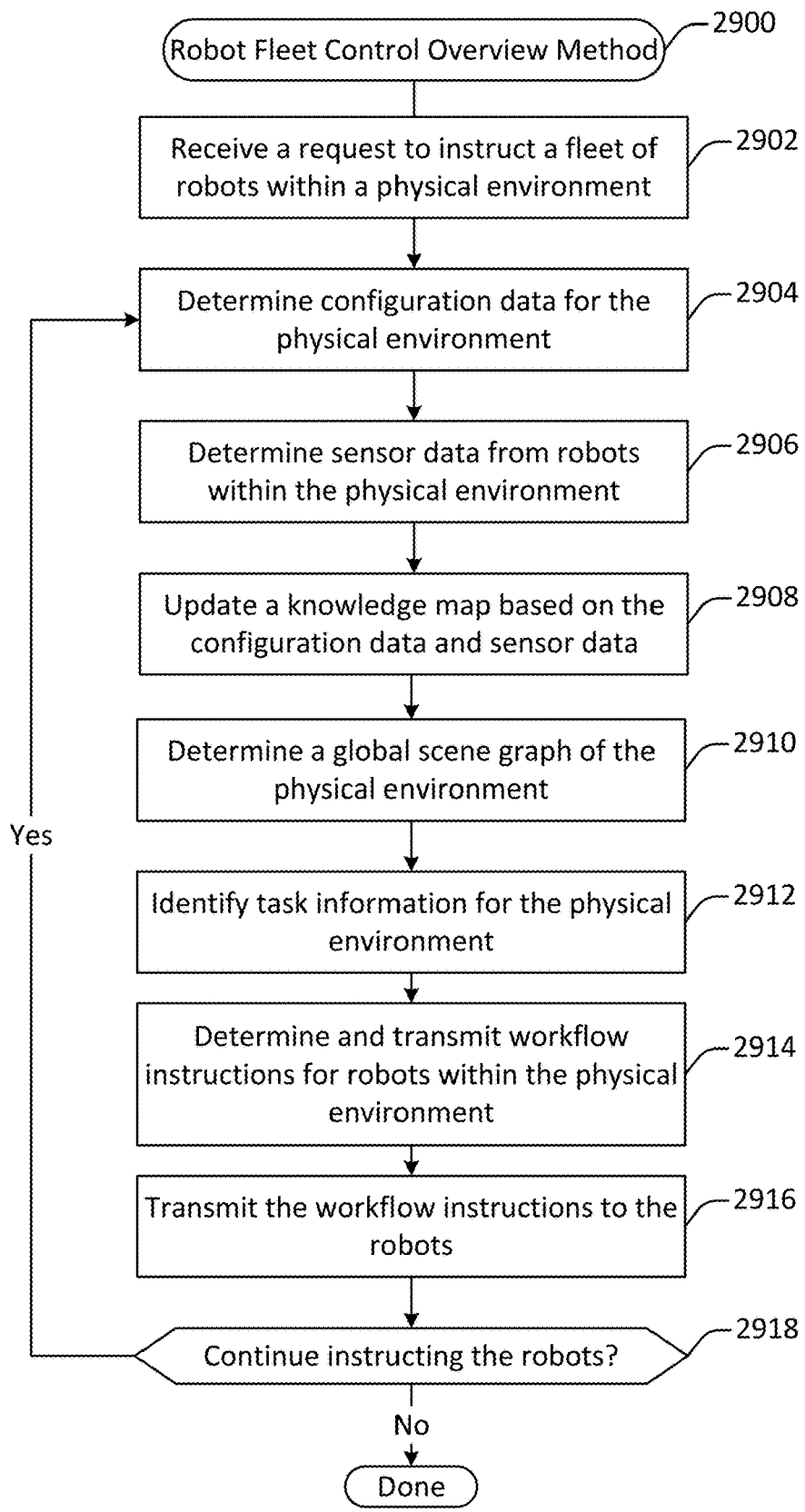
FIG. 29 illustrates an overview method of controlling a robot fleet, performed in accordance with one or more embodiments.

FIG. 29 illustrates an overview method 2900 of controlling a robot fleet, performed in accordance with one or more embodiments. In some embodiments, the method 2900 may be performed at a fleet control system such as the fleet control system 2800 shown in FIG. 28.

A request to instruct a fleet of one or more robots within a physical environment is received at 2902. In some embodiments, the request may be generated when a connection is established between a control system at the physical environment and the fleet control system. The request may be generated automatically when such a connection is established or may be generated based on user input, such as an instruction provided by a system administrator.

Configuration data for the physical environment are determined at 2904. According to various embodiments, the configuration data may include any data other than robot sensor data characterizing the physical environment. For example, the configuration data may information characterizing humans within the physical environment, such as a number of humans, role information, identity information, preference information, location information, and/or other characteristics associated with the humans. As another example, the configuration data may include information characterizing items located within the physical environment, such as type, quantity, and/or location information for items stored in a warehouse, located on a truck, or housed in some other fashion.

In some embodiments, some or all of the configuration data may already be stored in the global knowledge map 2820. Alternatively, or additionally, some or all of the configuration data may be received from the environment coordinator 2852 and/or one or more of the robots located at the physical environment.

Sensor data from robots within the physical environment is determined at 2906. In some embodiments, the sensor data may be transmitted directly from the robots. Alternatively, or additionally, some or all of the sensor data may be transmitted via the environment coordinator 2852.

According to various embodiments, any of a variety of sensor data may be transmitted, depending on the configuration of the robot fleet and the available sensors. For example, the sensor data may include imagery captured by visible light cameras at the one or more robots. Other examples of sensor data may include, but are not limited to: LIDAR data, robot location data, audio data, depth camera data, user input data, and robot operational status data. Some or all of the raw sensor data may be stored in the sensor data storage 2812.

A knowledge map is updated at 2908 based on the configuration data and sensor data. As discussed with respect to FIG. 28, the knowledge map may include a database that stores information about the physical environment over time. In some embodiments, updating the knowledge map may involve directly storing information some or all of the data received from the robots. For instance, robot location information may be stored in the global knowledge map to reflect the locations of the robots at a particular point in time.

In some embodiments, updating the knowledge map may involve processing sensor data to determine semantic information about the physical environment. For instance, a visual SLAM may be performed on image data, along with object recognition. Such a process may be used to, for instance, determine locations for obstacles such as non-robotic carts and shipping pallets in a warehouse. Then, the location information determined based on such analysis may be used to update the global knowledge map.

In some embodiments, updating the knowledge map may involve reflecting the absence of objects in addition to the presence of objects. For instance, at a first point in time, the knowledge map may reflect the presence of a shipping pallet in a warehouse aisle at a particular point in time. Then, when subsequently captured sensor data reveals that the shipping pallet is no longer present at the location, the knowledge map may be updated to reflect the absence of the shipping pallet.

A global scene graph of the physical environment is determined at 2910. In some embodiments, as discussed with respect to FIG. 28, the global scene graph may represent an up-to-date version of the physical environment determined based on the global knowledge map.

In some embodiments, determining the global scene graph may involve determining navigational paths through the physical environment, such as open areas and aisles in a warehouse. Such information may be relatively fixed, and may be represented as one or more nodes and edges in a graph. In such a representation, nodes may represent intersections and edges may represent paths between intersections. Although many such paths may be relatively fixed over time, the presence of obstructions such as shipping pallets may cause some of the available navigation paths to shift.

In some embodiments, determining the global scene graph may involve determining representations of nominal locations within the physical environment. For example, a warehouse may be divided into zones, isles, bays, shelves, slots, and/or other organizational units to facilitate the organization of items for placement and retrieval. As another example, a warehouse may include one or more designated areas such as robot parking zones, item consolidation zones, robot-free zones, high-speed transit corridors, and the like.

In some embodiments, determining the global scene graph may involve determining representations of the locations of humans within the physical environment. Humans may be located by performing object recognition on the visual imagery data received from the robots. Alternatively, or additionally, humans may be located through other mechanisms, such as electronic badges that determine and transmit location data via the robots and/or the environment coordinator. Humans may be associated with metadata within the global scene graph, which may detail characteristics such as preferences, roles, identity, and/or other relevant information for the different humans.

In some embodiments, the information included in the global scene graph may be drawn from the global knowledge map and may be represented in one or more layers. For example, different layers may be used to represent fixed features of the physical environment, temporary but stationary objects within the physical environment, item locations within the physical environment, the locations and characteristics of humans within the physical environment, and/or the locations and characteristics of robots within the physical environment.

Task information for the physical environment is identified at 2912. In some embodiments, the task information may reflect tasks requested by the environment coordinator 2852. For instance, in a warehouse environment, the task information may include one or more operations to moving items within the warehouse environment, such as for the purpose of restocking the warehouse and/or creating orders for item shipment.

Workflow instructions for robots within the physical environment are determined at 2914. According to various embodiments, the workflow instructions may indicate to the robot information such as one or more workflows to perform. Such workflow information may include supporting information such as one or more humans involved in the workflow, one or more locations at which the workflow is to be performed, one or more subtasks included in the workflow, one or more items involved in the workflow, sequence information for the workflow, and/or any other suitable information. Additional details regarding the determination of the workflow instructions are discussed with respect to the method 3000 shown in FIG. 30.

The workflow instructions are transmitted to the robots at 2916. In some embodiments, the workflow instructions may be transmitted to the robots via the communication interface 2804. The workflow instructions may be transmitted directly to the robots or may be transmitted via an intermediary such as the environment coordinator 2852.

A determination is made at 2918 as to whether to continue instructing the robots. According to various embodiments, the robots may continue to be instructed until a triggering condition is met. For instance, the robots may continue to be instructed until a message terminating such control is received from the environment coordinator 2852.

According to various embodiments, the operations 2904 through 2918 may constitute a control loop for the fleet of robots. This control loop may operate at any suitable frequency, such as once per second or once per minute.

In some embodiments, the operations 2904 through 2918 may be performed in an order different than that shown, or at a different frequency. For example, the sensor data may be determined and used to update the knowledge map and global scene graph at a first frequency, while workflow instructions are determined for robots at a second frequency. As another example, robot workflow instructions may be determined in a more RESTful manner. For instance, a new workflow may be determined for a robot when the robot has completed, or is projected to soon complete, an existing workflow.

Figure 30:
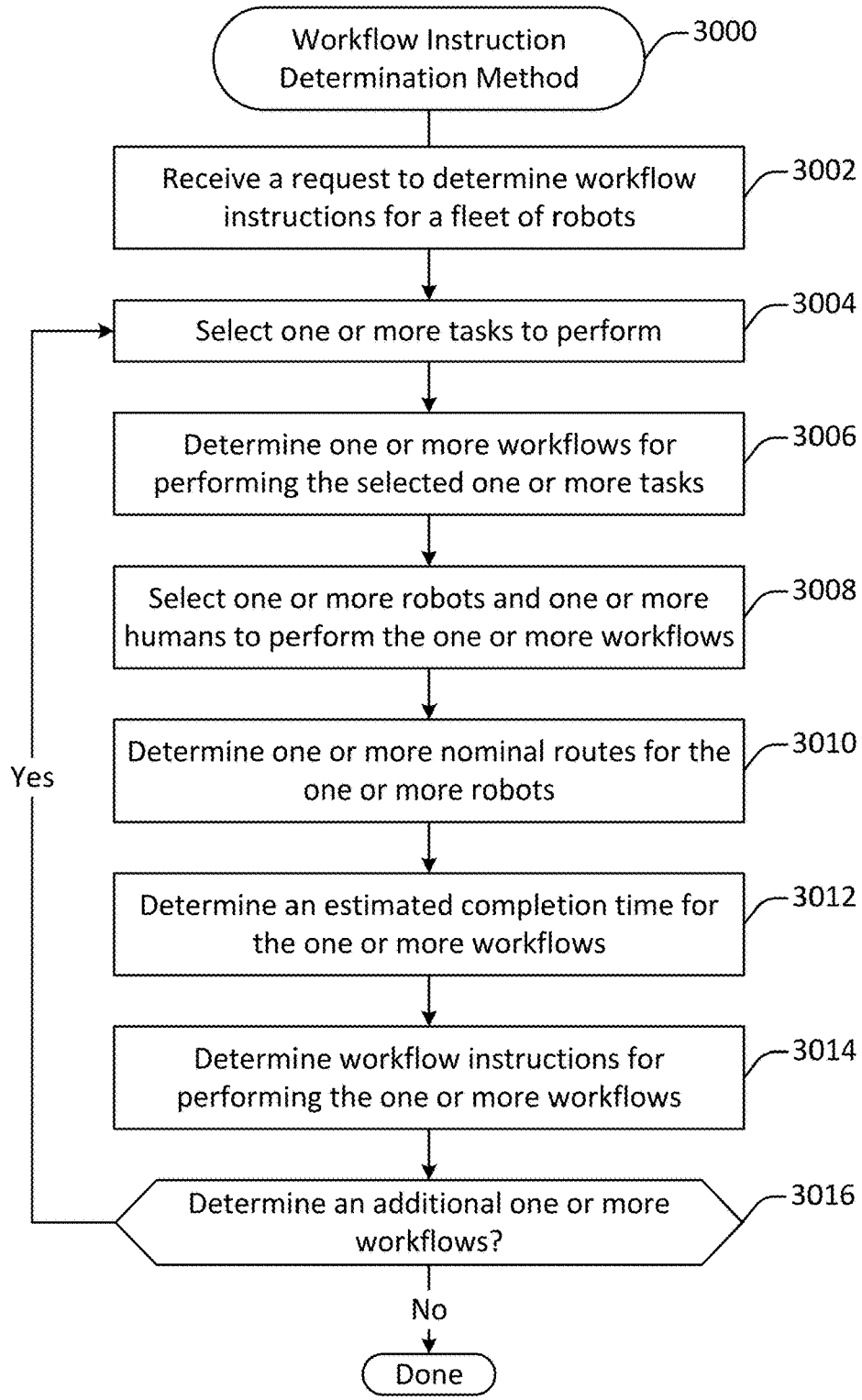
FIG. 30 illustrates a method for determining workflow instructions for a fleet of robots, performed in accordance with one or more embodiments.

FIG. 30 illustrates a method 3000 for determining workflow instructions for a fleet of robots, performed in accordance with one or more embodiments. The method 3000 may be performed at the fleet management system 2802 shown in FIG. 28.

A request to determine workflow instructions for a fleet of robots is received at 3002. In some embodiments, the request may be generated as discussed with respect to the operation 2914 shown in FIG. 29. That is, the request may be generated in the context of existing task information identified at 2912, a global scene graph determined as discussed with respect to operation 2910, and/or any other relevant supporting information.

One or more tasks to perform are selected at 3004. According to various embodiments, individual tasks may be selected from a list of available tasks in a group for being performed in a workflow or group of workflows. For example, a set of items that are included in a set of orders may be selected for picking. As another example, a set of items for picking from a designated zone or zones within a warehouse may be selected for picking. As yet another example, a set of item replenishment tasks may be selected based on a logical grouping of the source and/or destination of items included in the replenishment tasks.

One or more workflows for performing the selected one or more tasks are determined at 3006. According to various embodiments, the particular workflow to select in a particular situation may depend on considerations such as the number of available humans, the number of available carts, the number of items, the density of locations, and the like. For example, in a situation where humans disproportionately outnumber carts, then a zone picking workflow may be selected. In a situation where carts and humans are more equal in number, a different workflow such as a full push-to-pick workflow may be used. As another example, in a situation with lengthy distances, a cascade workflow may be selected to reduce the amount of walking involved in a workflow. As another example, in a situation with shorter distances, a partial push-to-pick workflow may be selected.

In some embodiments, the workflows may be selected so as to reduce one or more sources of inefficiency. For instance, workflows may be selected so as to minimize or reduce one or more of human walking distance, picking time, transfer of items between carts, or other such considerations.

In particular embodiments, workflows may be strategically selected based on operating conditions. For example, in times of relatively low rate of orders, workflows may be selected so as to prioritize reduced walking distance by human operators. However, in times with relatively many orders to be processed, workflows may be selected so as to maximize or increase order throughput.

One or more robots and, optionally, one or more humans are selected to perform the one or more workflows at 3008. In some embodiments, robots may be selected for performing the workflows based on any of various characteristics. For example, robots may be selected based on having enough battery power remaining to complete the one or more workflows. As another example, one or more robots may be selected based on proximity to the tasks selected for performance. As yet another example, one or more robots may be selected based on their capabilities. For instance, a robot with a refrigerated cabinet may be selected to facilitate picking of items that need to be kept cold, a robot with a larger capacity may be selected to pick items having a larger form factor, or a robot with smaller bins may be selected to pick items having a smaller form factor.

One or more nominal routes for the one or more robots are determined at 3010. According to various embodiments, a nominal route may include one or more waypoints. Each waypoint may be represented as a virtual location on the global scene graph, which may correspond to a physical location within the physical environment. Additional details regarding one approach for determining a nominal route are discussed with respect to the method 3100 shown in FIG. 31.

An estimated completion time for the one or more workflows is determined at 3012. In some embodiments, the estimated completion time may be determined based at least in part on the nominal routes. For instance, the route planner 2806 may determine estimated traversal times for the robots to traverse the one or more nominal routes when the nominal routes are determined. The estimated completion time may also be determined based on estimated task completion times. For instance, a workflow may involve the transfer of a designated number of items onto and/or off of the robot. The estimated workflow completion time may thus be determined at least in part by an estimated (e.g., average) time to complete the item transfers multiplied by the number of item transfers included in the workflow.

In some embodiments, the estimated completion time may be determined as a point estimate, such as an expected value. Alternatively, or additionally, the estimated completion time may be determined as a distribution representing a range of possibilities regarding the estimated completion time.

Instructions to perform the one or more workflows are determined at 3014. In some embodiments, the instructions may include information that the robots may use to execute the workflows. For example, the instructions may include a list of items to be transferred, one or more nominal routes including one or more waypoints to traversed, one or more identifiers for humans participating in the one or more workflows, and other such information. Then, the one or more robots that are participating in the one or more workflows may execute the instructions as discussed with respect to the method 3100 shown in FIG. 31.

In some embodiments, the instructions determined at 3014 may include one or more instructions transmitted to devices other than the robots. For example, a human working in a warehouse environment may be equipped with a device, such as a mobile phone, that receives instructions regarding tasks to be completed by the human. Such instructions may be determined at least in part by the fleet management system 2802 and may include, for example, one or more locations, one or more items, one or more time periods, and/or any other information relevant to task completion.

A determination is made at 3016 as to whether to determine one or more additional workflows? According to various embodiments, additional workflows may continue to be determined until a triggering condition is met. For instance, the determination of additional workflows may be paused or terminated if all tasks have been performed, if no humans and/or robots are available for performing tasks, or if a termination request has been received at the fleet management system 2802.

Figure 31:
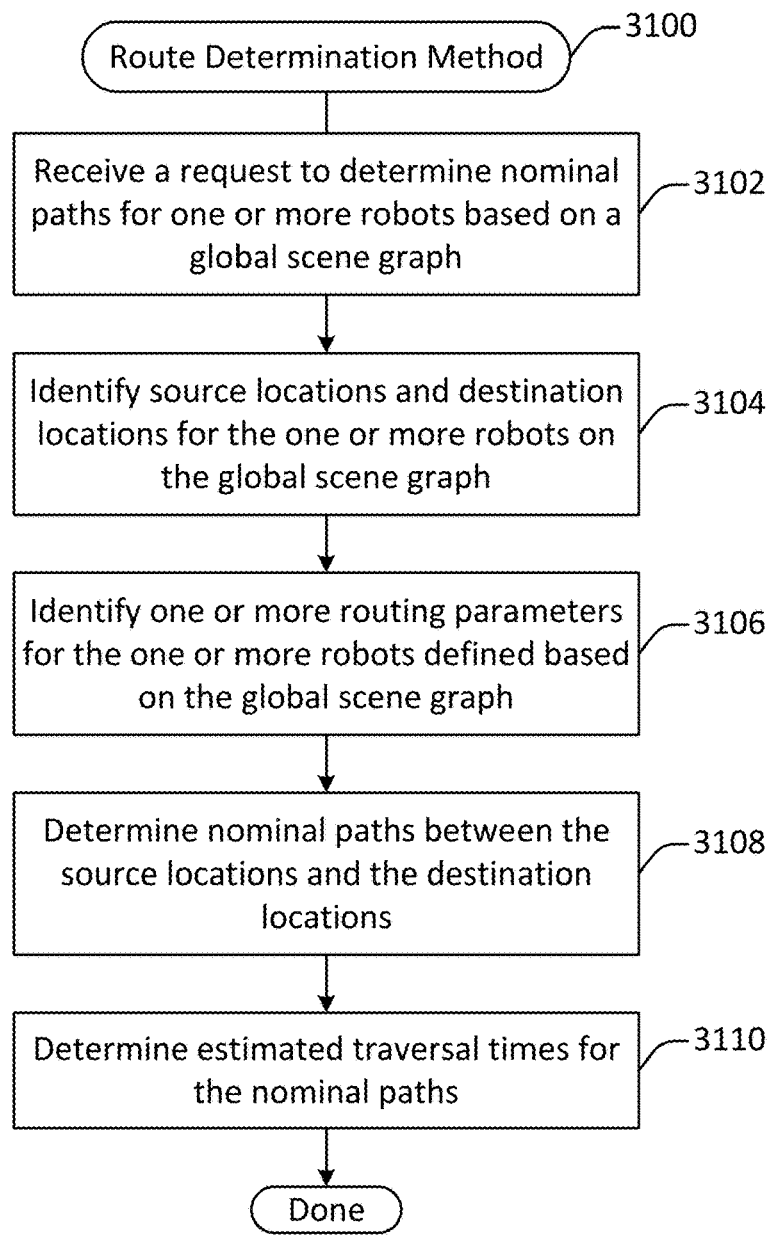
FIG. 31 illustrates a route determination method, performed in accordance with one or more embodiments.

FIG. 31 illustrates a route determination method 3100, performed in accordance with one or more embodiments. The method 3100 may be performed at the fleet management system 2802.

A request to determine nominal paths for one or more robots based on a global scene graph is determined at 3102. In some embodiments, the request may be generated as discussed with respect to the operation 3010 shown in FIG. 30.

Source locations and destination locations for the robots are identified at 3104. Such information may be included in the request received at 3102. For instance, such information may be determined based on the workflows determined at 3006 and the robots and humans selected at 3008. Locations may be identified, for instance, as nodes or regions on the global scene graph.

One or more routing parameters for the one or more robots are optionally identified at 3106. In some embodiments, routing parameters may include constraints be determined based on the global scene graph. For example, robots may be precluded from routing along paths through areas of high human density. As another example, routes may be determined so as to enforce minimum spacing between a robot and obstacles, other robots, and humans, in order of increasing buffer length. As yet another example, routes may be determined based on the location of humans. For instance, a robot that is near a human and is tasked with completing a task in association with the human may be instructed to follow a path consistent with that traversed by the human.

In some embodiments, routing parameters may include characteristics related to a human involved in a workflow. For example, a route may be associated with a parameter identifying an estimated walking speed of a human included in the workflow. As another example, a route may be associated with a parameter indicating a preference such as a preferred orientation of the cart to a particular human.

Nominal paths between the source locations and the destination locations are determined at 3108. In some embodiments, the nominal paths may be determined at least in part by first parameterizing the scene graph for adapting a dynamic vehicle routing algorithm and then applying the dynamic vehicle routing algorithm to the parameterization.

Estimated traversal times for the nominal paths are determined at 3110. In some embodiments, the estimated traversal times may be determined by identifying an estimated distance traversed by each robot along with estimated speeds for the robots along the nominal paths. Such information may be determined via a machine learning prediction model trained using historical route traversal data determined by observing the robots.

Figure 32:
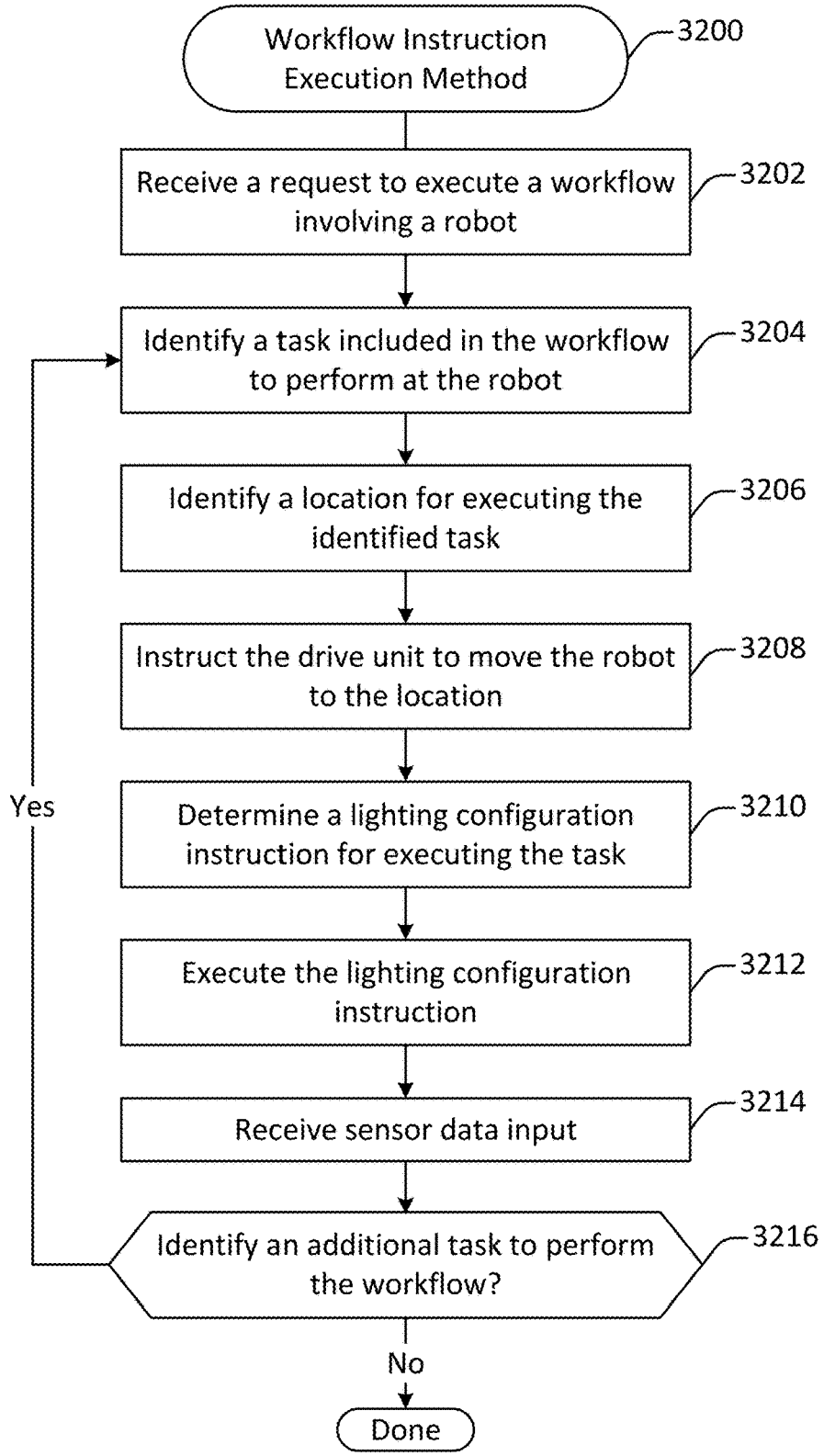
FIG. 32 illustrates a workflow instruction execution method, performed in accordance with one or more embodiments.

FIG. 32 illustrates a workflow instruction execution method 3200, performed in accordance with one or more embodiments. The workflow instruction execution method 3200 may be performed at an autonomous mobile robot configured in accordance with techniques and mechanisms described herein.

A request to execute a workflow involving a robot is received at 3200. In some embodiments, the request may be generated based on workflow instructions determined as discussed with respect to the operation 3014 shown in FIG. 30. As discussed herein, the workflow instructions may include information such as one or more tasks to complete, one or more humans or other robots included in the workflow, one or more locations, one or more nominal routes, and/or any other information to facilitate the performance of the workflow. The workflow instructions may also include sequence information, such as a strict or nominal order in which to perform the tasks.

A task included in the workflow to perform via the robot is identified at 3204. In some embodiments, the task may be included in the workflow information and identified from a set of tasks based on sequence information.

According to various embodiments, any of various types of tasks may be performed. Examples of tasks that may be included in a workflow include, but are not limited to: move along a designated route, await the transfer of an item, follow a designated human, move an item from one location to another location, pause operation, change a configuration setting, and/or any other operation capable of being performed by the autonomous mobile robot.

A location for executing the identified task is identified at 3206. At 3208, the drive unit is instructed to move the robot to the location. For example, the task may involve moving from one location to another location along a nominal route. In such a situation, the location identified at 3206 may be the next waypoint along the nominal route. As another example, a task that involves following a human or waiting for an item may involve repositioning the robot relative to the human. However, executing the identified task need not necessarily involve movement. For example, the robot may stay in a designated position if the robot is waiting for a human to move an item onto or off of the robot.

A lighting configuration instruction for executing the task is determined at 3210. The lighting configuration instruction is then executed at 3212. According to various embodiments, as discussed herein, the robot may activate one or more lights, for instance to guide a human in performing a task. For example, as discussed herein, the robot may activate one or more lights in a light strip to guide a human to a bin on the robot into which to place an item or from which to remove an item. As another example, the robot may activate a projected lighting element to project light onto a location in the environment corresponding with an item location. However, executing the identified task need not necessarily involve activating a lighting element. For instance, a light may not need to be activated while the robot is moving from one location to another location rather than assisting in the movement of an item on or off of the robot.

In some embodiments, other information may be presented in addition to lighting. For example, a display screen may show a representation of a destination location for the robot. The representation may include turn-by-turn directions, a complete route, or a final destination. As another example, a display screen may show a representation of an item to be picked or replenished. As yet another example, a display screen may present an icon, a name, or another identifier associated with a human, so that the human knows which robot with which to interact.

Sensor data is received at 3214. In some embodiments, the sensor data may be received from one or more cameras on the autonomous mobile robot. Alternatively, or additionally, sensor data may be received from another source. For example, a scanner may scan a barcode associated with an item. As another example, an RFID reader may detect the proximity of an item, an identification badge, or the like. As yet another example, a touch sensor may detect contact by a human. As still another example, a force sensor such as one associated with a handlebar may detect an amount and direction of force exerted by a human.

In some implementations, the sensor data may indicate information relevant to the identified task. For example, the sensor data may indicate that an item has been moved from a source location to a destination location. As another example, the sensor data may indicate that the task is to be skipped in favor of the next task.

In some embodiments, the sensor data input may indicate a desire by a human operator to perform a different task. For example, a robot may be autonomously navigating from one location to another along a nominal route. However, sensor data that detects force exerted on the handlebar may indicate a desire to travel along a different route. When such sensor data is detected, a different nominal route may be determined and then followed.

A determination is made at 3216 as to whether to identify an additional task to perform the workflow. In some embodiments, additional tasks may continue to be identified as long as the workflow includes additional uncompleted tasks.

According to various embodiments, the operation shown in FIG. 32 may be performed in an order different from that shown. For instance, one or more operations may be performed in parallel.

Figure 33:
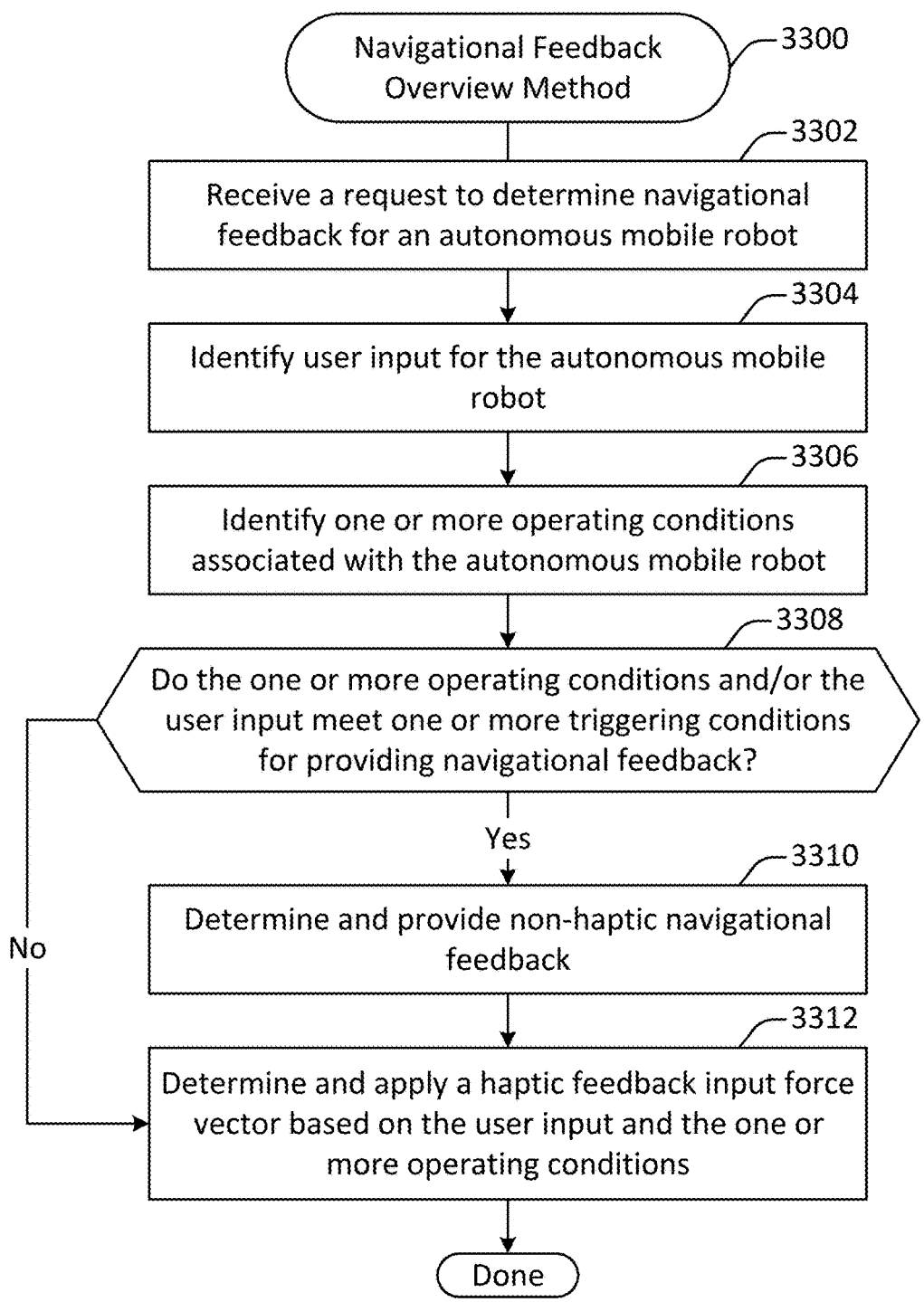
FIG. 33 illustrates a block diagram representation of a shelf that may form part of an autonomous mobile robot, configured in accordance with one or more embodiments.

In some embodiments, the method 3200 may include other operations not shown in FIG. 32. For instance, as part of executing the workflow, the robot may transmit information to a remote computing device such as the fleet management system 2802. Such information may indicate, for instance, sensor data, reporting data, and/or logging data, such as one or more tasks in the workflow that have been performed Navigational Feedback FIG. 33 illustrates a navigational feedback method 3300, performed in accordance with one or more embodiments. The navigational feedback method 3300 may be performed at an autonomous mobile robot configured in accordance with techniques and mechanisms described herein.

A request to provide navigational feedback for an autonomous mobile robot is received at 3302. In some embodiments, the request may be generated as discussed with respect to the operation 2012 shown in FIG. 20. That is, navigational feedback may be generated in the context of the execution of a robot control loop.

In some embodiments, navigational feedback may include a haptic feedback force input vector, which may be a type of functional input force vector that may be provided to the mechanical drive unit. Alternatively, or additionally, navigational feedback may include other types of feedback such as visual feedback or auditory feedback.

User input for the autonomous mobile robot is identified at 3304. In some embodiments, the user input may include force detected at one or more force sensors associated with a handlebar unit. For instance, the user input may include one or both of a translational force and a rotational force exerted on the handlebar.

One or more operating conditions associated with the autonomous mobile robot are identified at 3306. According to various embodiments, as discussed with respect to the operation 2006, operating condition for a robot may include any of a variety of conditions. Examples of such operating conditions may include, but are not limited to: the identity of an operator using the robot, a location of the robot, a direction in which the robot is traveling, an amount of traffic in the vicinity of the robot, a condition associated with the physical environment in which the robot is situated, and the like.

In some embodiments, the one or more operating conditions may include one or more situational aspects of the robot relative to its environment. Examples of such operating conditions may include, but are not limited to: a determination that the robot is moving along an aisle, a determination that the robot is approaching a real or virtual obstacle or barrier, a determination that the robot is approaching a zone associated with a different mode of operation, a determination that the robot is approaching the end of an aisle, a proximity of the robot to an edge of a virtual corridor, and/or other such considerations.

In some embodiments, one or more operating conditions may include one or more functional aspects related to a task being performed by the robot, for instance in the context of a workflow. Examples of such operating conditions may include, but are not limited to: determining that a robot is approaching an area corresponding to an item to be moved, determining that a robot is moving away from an area corresponding to an item to be moved, determining that a human operator of the robot is to be notified of information, and/or other operational information.

A determination is made at 3308 as to whether the one or more operating conditions and/or the user input meet one or more triggering conditions for providing navigational feedback. In some embodiments, the determination may involve evaluating whether the robot's position coupled with the user input suggests that the robot, absent a correction, is projected to cross a threshold, violate a rule, create a dangerous situation, and/or perform an action that is deemed inefficient. For example, the robot's position, direction, and user input may be collectively analyzed to project that the robot is heading toward a virtual barrier.

In some embodiments, the determination made at 3308 may involve evaluating whether the robot's position coupled with the user input suggests that the robot is approaching or departing a virtual navigational affordance. For instance, a warehouse environment may be configured with one or more virtual high-speed navigational corridors, virtual low speed handling areas, virtual navigational rails, virtual parking areas, or the like. A robot approaching or departing from such a virtual navigational affordance may generate a haptic feedback pattern appropriate for the affordance, such as snapping into or out of a parking spot, navigational rail, or corridor.

In some embodiments, the determination made at 3308 may involve evaluating whether the robot's position coupled with the user input suggests that the robot is approaching or departing a configuration associated with a workflow. For example, a consolidation workflow may involve an arrangement of two or more robotic carts in which the carts are positioned near each other to facilitate the transfer of items from one cart to another. Such a consolidation workflow may be associated with a predetermined relative spatial orientation of robotic carts to facilitate efficiency on the part of the human operator. As another example, a virtual train workflow may involve a sequence of carts configured to closely follow one another in a row, with a human user capable of creating such a sequence by moving the carts in proximity to one another. As with a virtual navigational affordance, a robot approaching or departing from a workflow configuration may generate a haptic feedback pattern appropriate for the affordance, such as snapping into or out of position.

In some embodiments, the determination made at 3308 may involve evaluating whether the robot's position coupled with the user input suggests that the robot is entering or leaving a particular operating mode. For instance, in a guided navigation mode, the robot may autonomously navigate along a path despite the user's hand on the handlebar. In contrast, in a fully manual mode, the robot may cease autonomous navigation apart from obstacle avoidance and instead be fully responsive to user input. The robot may generate haptic or non-haptic feedback to indicate that such a transition has occurred.

In some embodiments, the determination made at 3308 may be made based at least in part on sensor data identifying one or more indicators of a virtual barrier, corridor, rail, zone, or other such navigational affordance. For example, paint or tape on the floor of a warehouse may be used to indicate the presence of a navigational affordance. As another example, a caution sign or other such warning may indicate the presence of a zone associated with reduced speed. As yet another example, a virtual navigational rail or corridor may be automatically created along a linear surface such as a shelf in a warehouse.

Upon determining that the one or more operating conditions and/or the user input meet one or more triggering conditions for providing navigational feedback, non-haptic navigational feedback is determined and provided at 3310.

In some embodiments, non-haptic navigational feedback may include visual feedback provided via one or more light projectors. For example, the autonomous mobile robot may project onto the ground an indication of one or more virtual rails, barriers, or corridors. As another example, the autonomous mobile robot may project onto the ground or another surface an indication of a recommended direction or route of travel. As yet another example, the autonomous mobile robot may project onto the ground or another surface one or more messages or indicators.

In some embodiments, non-haptic navigational feedback may include visual feedback provided via a display screen or light strip. For example, the autonomous mobile robot may update the display screen to display a map with a route, one or more turn-by-turn direction, or a message.

In some implementations, non-haptic navigational feedback may include one or more sounds. For example, the autonomous mobile robot may play a sound to indicate that the user is guiding the autonomous mobile robot in a direction that is not recommended.

Upon determining that the one or more operating conditions and/or the user input meet one or more triggering conditions for providing navigational feedback, a haptic feedback input force vector is determined and applied at 3312. According to various embodiments, the haptic feedback force vector may be applied by combining it with other input force vectors as discussed with respect to the method 2000 to determine aggregate robot drive unit control output instructions for controlling the robot's mechanical drive unit.

In some embodiments, the haptic feedback may be experienced by a human operator as a force sensation in the operator's hand while holding the force-sensitive handlebar. For instance, the drive unit may cause the entire autonomous mobile robot to jerk in a particular direction, vibrate, create a feeling of push or pull, or otherwise generate the feeling of force in the handlebar.

According to various embodiments, one or more of various types of haptic feedback may be provided. In some configurations, haptic feedback may include generating a force vector that provides the feel of a bump in one direction. For example, such a pattern of haptic feedback may involve generating a short but sharp increase in force in one direction.

In some embodiments, haptic feedback may include generating a force vector that provides a steady force in one direction or a force that steadily increases or decreases in intensity.

In some implementations, haptic feedback may include a force vector generated so as to create via the drive unit a feeling of vibration, for instance by generating a temporal sequence of oscillating haptic feedback input force vectors pointed in opposite directions that collectively cancel out in terms of their ultimate effect on the directional motion of the autonomous mobile robot.

In some embodiments, haptic feedback may include one or more complex patterns. For example, when it is determined that the autonomous mobile robot has nearly aligned with a virtual rail, a profile of haptic feedback vectors may be determined to provide the feeling that the robot has snapped into a physical rail. As another example, when it is determined that the autonomous mobile robot is moving along a virtual rail, the force vectors may initially act to keep the autonomous mobile robot aligned with the rail, effectively resisting or ignoring user input forces in the direction orthogonal to the rail or in the rotational direction. However, if a sufficiently strong lateral or rotational user input force is detected, a profile of haptic feedback vectors may be determined to provide the feeling that the robot has snapped out of a physical rail.

In some embodiments, the presence of haptic feedback may cause the autonomous mobile robot to temporarily nullify or ignore input provided via the handlebar. For example, the haptic feedback force input vector may cause the autonomous mobile robot to suddenly snap into or out of a virtual rail, temporarily disregarding user input to the contrary.

According to various embodiments, the particular type of haptic feedback that is provided may be strategically determined based on factors such as the characteristics of the autonomous mobile robot, the physical environment in which it operates, the tasks for which it is employed, and the human users operating the autonomous mobile robot. However, additional examples of the types of haptic feedback that may be provided and the triggering conditions for generating the haptic feedback are discussed with respect to FIG. 34A through FIG. 36.

In some embodiments, non-haptic navigational feedback may be provided in the absence of haptic navigational feedback, or vice versa. Further, non-haptic navigational feedback may be provided as a precursor to providing haptic navigational feedback. For instance, before causing the drive unit to vibrate the robot, the robot may first display or project blinking lights, emit a sound, or provide other such non-haptic feedback. Alternatively, non-haptic feedback may be provided during or after haptic feedback is provided. For instance, a display screen may be updated to display a recommended path of action after or during a time in which the robot provides haptic feedback via the mechanical drive unit.

In some embodiments, the triggering conditions for providing navigational feedback may be configurable by an environment administrator, system administrator, and/or end user. Thus, the examples of triggering conditions and navigational feedback described herein are provided as illustrative examples and are not an exhaustive list of the types of triggering conditions and feedback that may be used. Rather, the triggering conditions and navigational feedback may be strategically determined based on factors such as the characteristics of the autonomous mobile robot, the physical environment in which it operates, the tasks for which it is employed, and the human users operating the autonomous mobile robot.

Figure 34A:
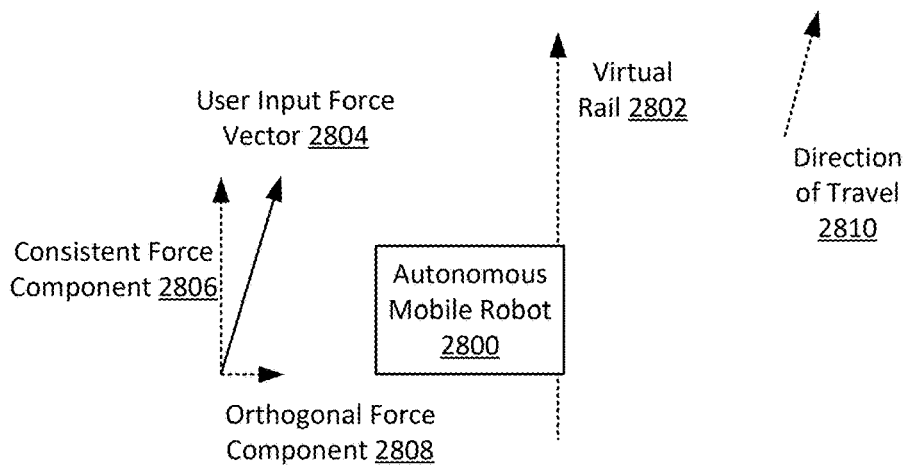
FIG. 34A, FIG. 34B, and FIG. 34C illustrate diagrams of situations in which haptic feedback may be provided via a mechanical drive unit, generated in accordance with one or more embodiments.
Figure 34B:
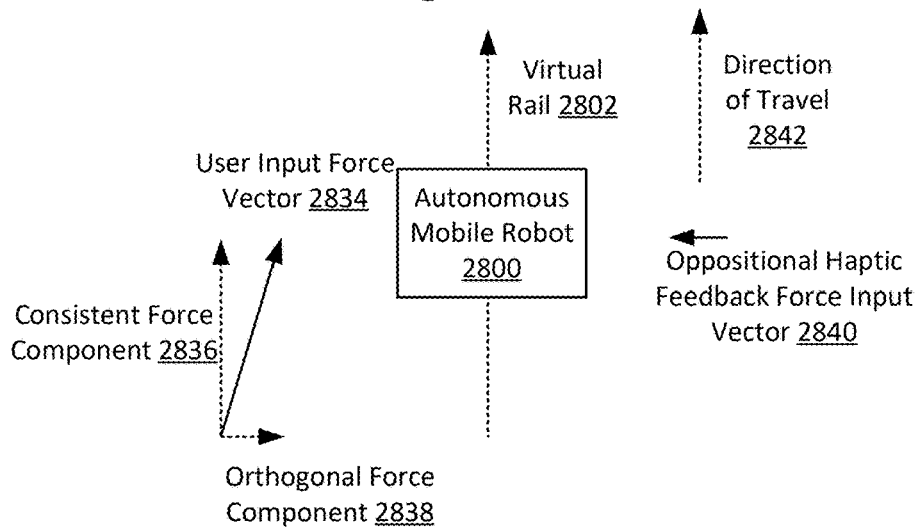
Figure 34C:
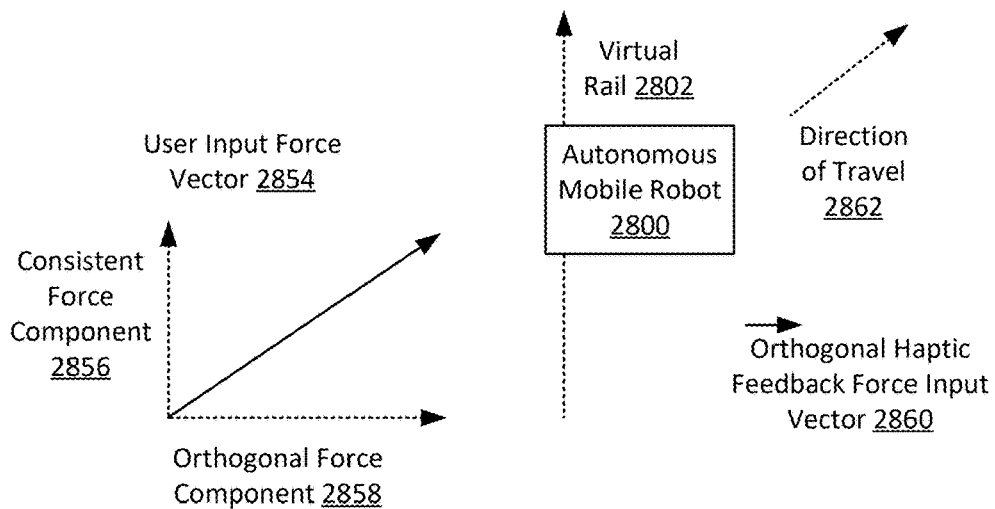

FIG. 34A, FIG. 34B, and FIG. 34C illustrate diagrams of situations in which haptic feedback may be provided via a mechanical drive unit, generated in accordance with one or more embodiments. In FIG. 34A, an autonomous mobile robot 3400 is traveling obliquely toward a virtual rail 3402. The autonomous mobile robot 3400 receives as input an input force vector 3404. The input force vector 3404 includes a consistent force component 3406 in the direction of the virtual rail 3402 and an orthogonal force component 3408 that is orthogonal to the direction of travel. Because the autonomous mobile robot 3400 has not yet arrived at the virtual rail 3402, the direction of travel 3410 mirrors the user input force vector 3404. That is, haptic feedback is not provided.

In FIG. 34B, the autonomous mobile robot 3400 has reached the virtual rail 3402. The autonomous mobile robot 3400 receives as input an input force vector 3434. The input force vector 3434 includes a consistent force component 3436 in the direction of the virtual rail 3432 and an orthogonal force component 3438 that is orthogonal to the direction of travel.

In FIG. 34B, the consistent force component 3436 is relatively large, while the orthogonal force component 3438 is relatively small. In such a situation, an oppositional haptic feedback force input vector 3440 may be generated. Because the oppositional haptic feedback force input vector 3440 is directionally opposed to the orthogonal force component 3408 and of equal magnitude, the two force vectors cancel out each other. The resulting direction of travel 3442 is in the same direction as the virtual rail 3402.

Thus, the configuration shown in FIG. 34B initially provides the sensation of the autonomous mobile robot 3400 being snapped into the virtual rail 3402 when the autonomous mobile robot 3400 reaches the virtual rail 3402. Such a situation may continue even if the hum orthogonal force component 3438 is maintained.

After the autonomous mobile robot 3400 is snapped to the virtual rail, small forces in the orthogonal direction may be effectively ignored. Thus, the situation is one in which the human operator seems to be guiding the autonomous mobile robot 3400 along the virtual rail 3402 while, perhaps inadvertently, exerting a slight force orthogonal to the virtual rail 3402. This approach helps the human user maintain the position of the autonomous mobile robot 3400 on the virtual rail 3402 without needing to steer the autonomous mobile robot 3400.

In FIG. 34C, the autonomous mobile robot 3400 receives as input an input force vector 3454. As in FIG. 34B, the input force vector 3454 includes a consistent force component 3456 in the direction of the virtual rail 3452 and an orthogonal force component 3408 that is orthogonal to the virtual rail 3402. However, in contrast to FIG. 34B, the orthogonal force component 3458 is large.

In such a situation, the autonomous mobile robot 3400 does not generate an oppositional haptic feedback force input vector, and instead may optionally generate an orthogonal haptic feedback force input vector 3460 in the direction of the orthogonal force component 3458. The combination of these vectors leads to a direction of travel 3462 away from the virtual rail 3402 in the direction of the user input force vector 3454.

Thus, the configuration shown in FIG. 34C provides the sensation of the autonomous mobile robot 3400 being snapped off of the virtual rail 3402 based on a large orthogonal force applied by the human user. This approach allows the human user to leave the virtual rail 3402 intentionally.

The configurations shown in FIG. 34A, FIG. 34B, and FIG. 34C involve static force vectors. However, changes in force vectors may also be considered when determining or applying haptic feedback. For instance, snapping the autonomous mobile robot 3400 off of the virtual rail 3402 may require a sharp increase in the orthogonal force component 3458 rather than steady pressure. That is, a sharp jerk of the autonomous mobile robot 3400 in the orthogonal direction may cause the autonomous mobile robot 3400 to suddenly leave the virtual rail 3402, while a continuous force in the same direction may not have such an effect.

Figure 35A:
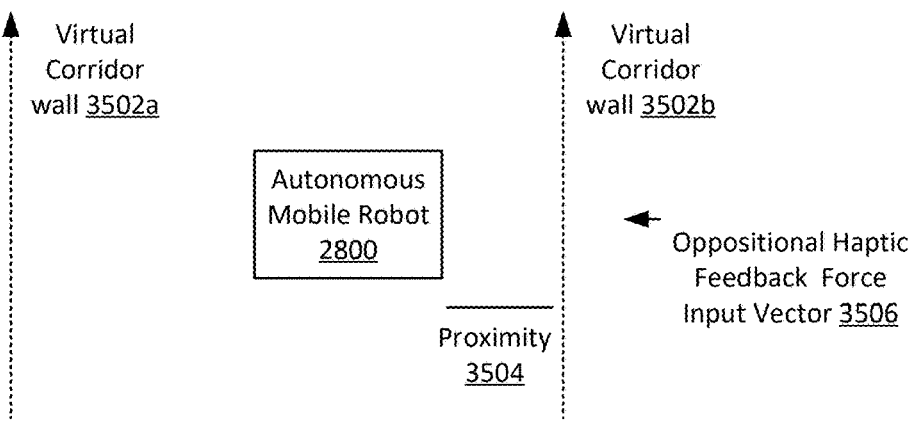
FIG. 35A, FIG. 35B, and FIG. 35C illustrate diagrams of situations in which haptic feedback may be provided via a mechanical drive unit, generated in accordance with one or more embodiments.
Figure 35B:
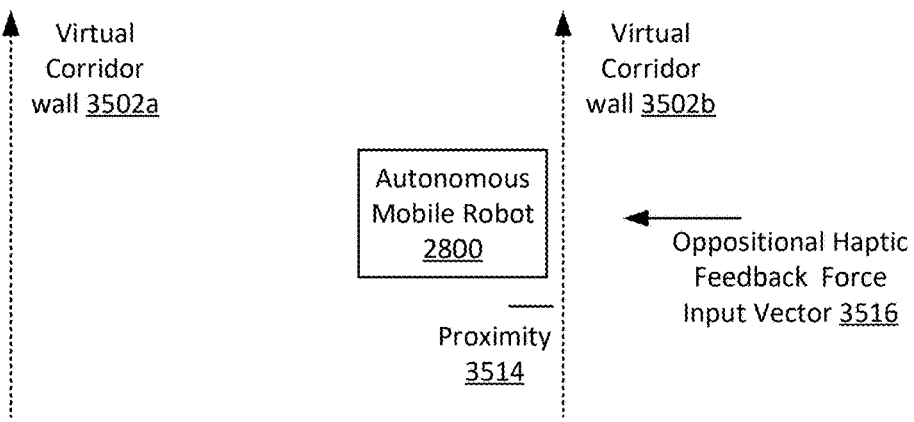
Figure 35C:
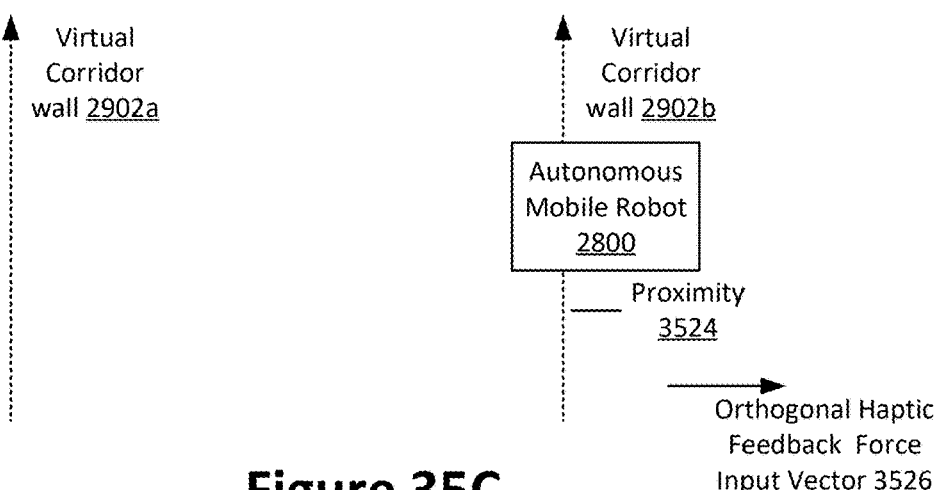

FIG. 35A, FIG. 35B, and FIG. 35C illustrate diagrams of situations in which haptic feedback may be provided via a mechanical drive unit, generated in accordance with one or more embodiments. In FIG. 35A, the autonomous mobile robot is traveling in a virtual corridor between the virtual corridor wall 3502a and the virtual corridor wall 3502b. As the proximity 3504 of the autonomous mobile robot 3400 to the virtual corridor wall 3502b decreases, an oppositional haptic feedback force input vector 3506 is applied to gently push the autonomous mobile robot 3400 back toward the center of the virtual corridor.

In the configuration shown in FIG. 35A, the human operating the autonomous mobile robot 3400 is in control of the autonomous mobile robot 3400. However, the human operator receives guidance for keeping the autonomous mobile robot 3400 within the virtual corridor.

In FIG. 35B, the autonomous mobile robot 3400 has moved close to the virtual corridor wall 3502b. In response to the decreased proximity 3514, the oppositional haptic feedback force input vector 3516 is increased in magnitude, pushing the autonomous mobile robot 3400 more forcefully back toward the center of the virtual corridor.

In the configuration shown in FIG. 35B, the human operating the autonomous mobile robot 3400 remains in control of the autonomous mobile robot 3400. However, the human operator receives more forceful guidance for keeping the autonomous mobile robot 3400 within the virtual corridor.

In FIG. 35C, the autonomous mobile robot 3400 has moved over the virtual corridor wall 3502b. In response to such a traversal coupled with the close proximity 3524, the orthogonal haptic feedback force input vector 3516 is provided, pushing the autonomous mobile robot 3400 away from the virtual corridor.

In the configuration shown in FIG. 35B, the human operating the autonomous mobile robot 3400 again remains in control of the lateral steering of the autonomous mobile robot 3400. However, the human operator receives guidance to remove the autonomous mobile robot 3400 entirely from the virtual corridor rather than operating it partially within the virtual corridor. Such guidance may help to keep the virtual corridor clear for other robots or humans.

In some embodiments, a virtual corridor may be dynamically determined based on the routes planned for multiple robots. For instance, when multiple robots are moving in the same direction, they may coordinate to adhere to a dynamically determined virtual corridor in that direction. Then, the robots may generate navigational guidance through haptic feedback to stay within the virtual corridor. If a robot departs from the virtual corridor it may also generate navigational guidance through haptic feedback to fully depart the virtual corridor. In this way, the other robots traveling in the virtual corridor need not adjust their courses.

Figure 36A:
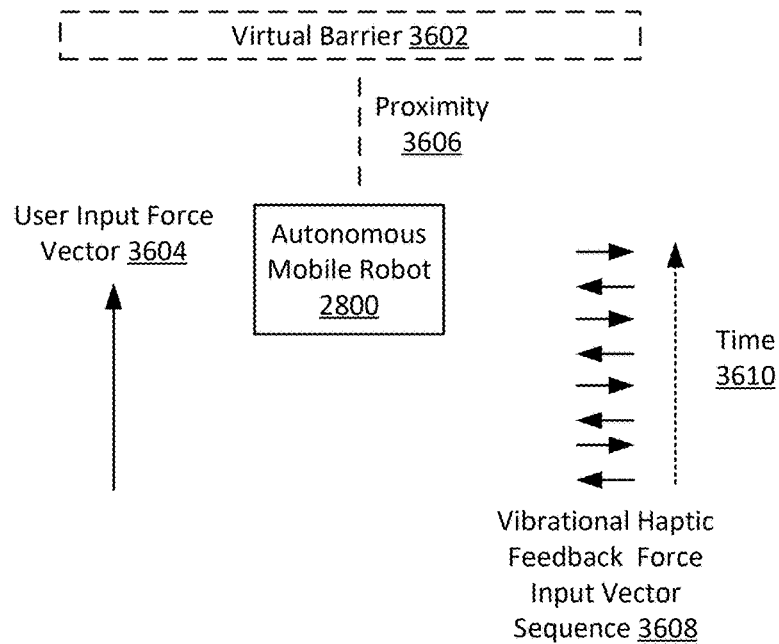
FIG. 36A and FIG. 36B illustrate diagrams of situations in which haptic feedback may be provided via a mechanical drive unit, generated in accordance with one or more embodiments.
Figure 36B:
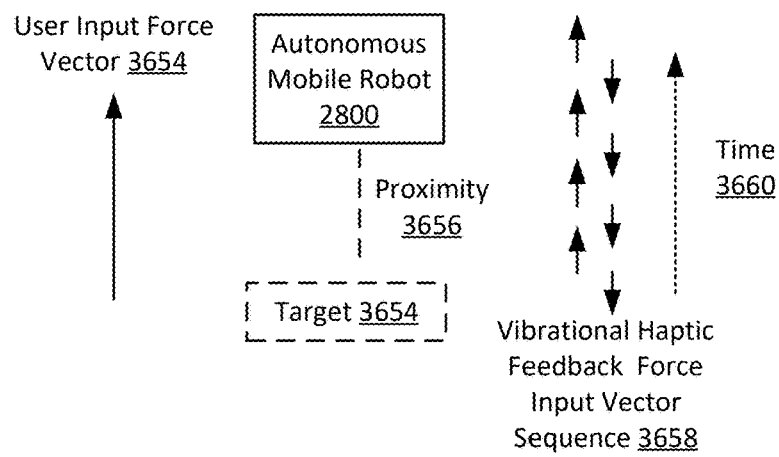

FIG. 36A and FIG. 36B illustrate diagrams of situations in which haptic feedback may be provided via a mechanical drive unit, generated in accordance with one or more embodiments. In FIG. 36A, the autonomous mobile robot autonomous mobile robot 3400 is approaching a virtual barrier 3602 based on a user input force vector 3604. As the autonomous mobile robot 3400 approaches the virtual barrier 3602, the proximity 3606 is decreased. This decrease in the proximity 3606 triggers the generation of a haptic feedback force input vector sequence 3608.

In some embodiments, the haptic feedback force input vector sequence 3608 may be implemented as a sequence of individual haptic feedback force input vectors over time 3610. For instance, the haptic feedback force input vector sequence 3608 may include a sequence of individual force vectors pointed in opposite directions.

In some embodiments, the collective effect of the haptic feedback force input vector sequence 3608 may be experienced by the human operator as a back-and-forth vibration in the autonomous mobile robot 3400. The vibration may be felt in the handlebar attached to the force sensor, or any other portion of the autonomous mobile robot 3400 in contact with the human operator.

In FIG. 36B, the autonomous mobile robot 3400 is participating in a task that involves navigating to a target 3654. However, the autonomous mobile robot 3400 has passed the target 3654, responsive to the user input force vector 3654. As the proximity 3656 to the target 3654 decreases, the autonomous mobile robot 3400 generates a vibrational haptic feedback force input vector sequence 3658.

According to various embodiments, the vibrational haptic feedback force input vector sequence 3658 is substantially similar to the haptic feedback force input vector sequence 3608. However, the vibrational haptic feedback force input vector sequence 3658 includes oppositional vectors arranged in an orthogonal, side-to-side direction rather than a parallel, forward-and-back direction.

The configuration shown in FIG. 34A, FIG. 34B, FIG. 34C, FIG. 35A, FIG. 35B, FIG. 35C, FIG. 36A, and FIG. 36B as well as other configurations using haptic feedback, may support smooth and intuitive operation of the autonomous mobile robot 3400. For instance, many autonomous mobile robots may operate in an area while maintaining both safe distances from one another and sufficiently high movement speed.

In some embodiments, the presence of haptic feedback in combination with virtual navigational affordances may allow system operators to reduce the distance between robots without generating obstacle avoidance procedures. For example, in the absence of a virtual navigational affordance, two robots may be prevented from passing within one foot of each other by way of obstacle avoidance force vectors. However, such a situation may be permitted if each of the two robots is locked to a respective navigational rail.

In some embodiments, haptic feedback may be used for purposes other than navigational guidance. For example, a bump or vibration may be used to notify the human operator of a message, which the human operator may access on a display screen associated with the autonomous mobile robot. As another example, a sequence of slowly oscillating force vectors may serve to notify the human operator of a dangerous condition or other situation. Various configurations are possible.

It should be noted that haptic feedback can be provided using force vectors in a rotational direction, and/or can be triggered based on one or more conditions associated with rotational movement. However, for the purposes of clear exposition, the illustrative examples presented herein have employed translational force vectors and omitted rotational components.

Friction

Figure 37:
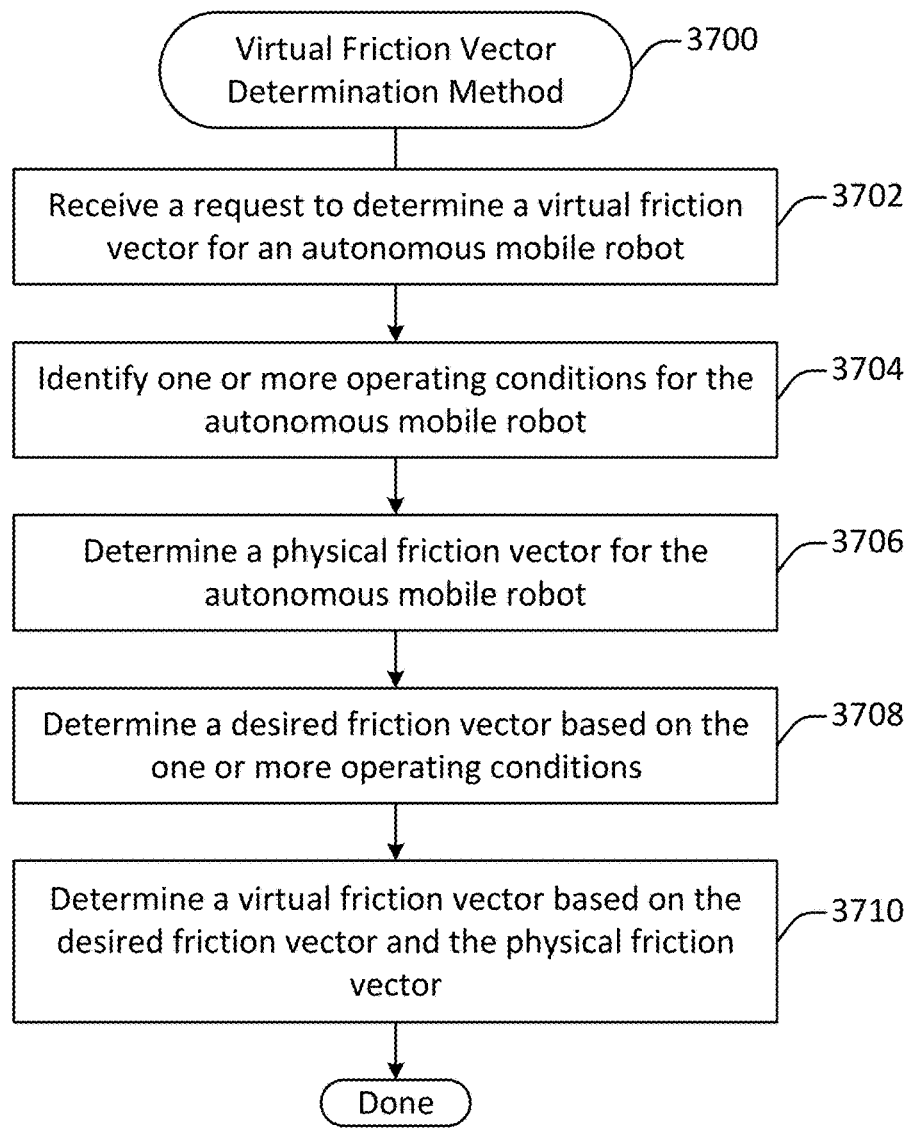
FIG. 37 illustrates a method of determining a virtual friction vector, performed in accordance with one or more embodiments.

According to various embodiments, techniques and mechanisms described herein may be used to adjust the apparent friction felt by an operator of an autonomous mobile robot. FIG. 37 illustrates a method 3700 of determining a virtual friction vector, performed in accordance with one or more embodiments.

A request to determine a virtual friction vector for an autonomous mobile robot is received. In some embodiments, the request may be received as discussed with respect to the operation 2010 shown in FIG. 20.

One or more operating conditions for the autonomous mobile robot are identified at 3704. In some embodiments, the one or more operating conditions may be identified as discussed with respect to the operation 2006 shown in FIG. 20.

A physical friction vector for the autonomous mobile robot is determined at 3706. In some embodiments, the physical friction vector may represent friction imposed by the components of the robot in one or more dimensions. Such friction may be due to components such as wheels, tires, motors, bearings, and the like. For instance, a robot may be anticipated to have a friction of between 1N and 100N based on such components.

In some embodiments, the physical friction vector may be identified based on a predetermined configuration parameter. Alternatively, the physical friction vector may be dynamically determined based on a calibration method. An example of such a method is discussed with respect to the method 3800 shown in FIG. 38.

A desired friction vector is determined at 3708 based on the one or more operating conditions. According to various embodiments, various considerations may influence the configuration of the desired friction vector. The following examples are non-exhaustive.

In some embodiments, lateral friction may be applied. Consider a robot that is moving along a straight line or a curve. Movement in a direction orthogonal to the line or curve may be referred to as the lateral direction. Friction may be applied in the lateral direction to oppose force applied to the robot to move the robot off of the line or the curve. In this way, the friction may help keep the robot on track and reduce the effort needed to control the robot. Such friction may potentially be increased as the robot's speed increases, for instance to provide additional stability.

In some embodiments, forward friction force may be applied. Consider a robot that has is moving along a straight line or a curve, and suppose that the robot has a physical friction vector of 12N. Left uncorrected, the physical friction vector would represent a force that the operator would need to consistently apply to avoid having the robot slow down. Accordingly, a forward friction compensation vector of, for instance, 10N may be applied to correct for the robot's physical friction. To achieve such an effect, a desired friction vector of 2N in the backward direction may be specified. A small amount of desired friction may be maintained to avoid a situation in which the robot is felt to accelerate away from the operator.

In some embodiments, a friction compensation force presented as forward friction may be applied when motion exceeds a designated velocity. That is, a dead band around zero velocity may be maintained. Alternatively, the friction compensation force may be gradually increased as velocity rises above zero according to a specified function.

A virtual friction vector is determined at 3710 based on the desired friction vector and the physical friction vector. In some embodiments, the virtual friction vector may be determined by subtracting the physical friction vector from the desired friction vector.

Figure 38:
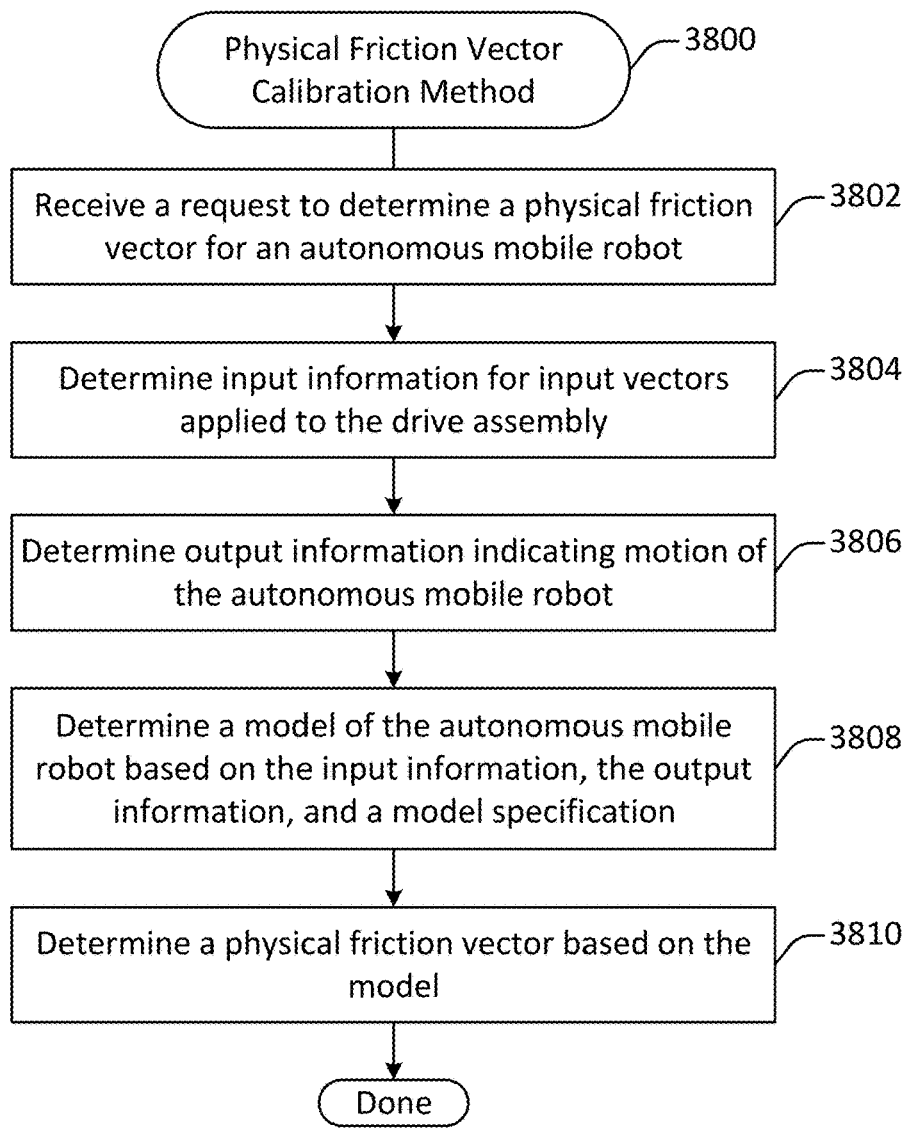
FIG. 38 illustrates a method of calibrating a physical friction vector for an autonomous mobile robot, performed in accordance with one or more embodiments.

FIG. 38 illustrates a method 3800 of calibrating a physical friction vector for an autonomous mobile robot, performed in accordance with one or more embodiments. In some embodiments, the method 3800 may be performed at the autonomous mobile robot. Alternatively, the method 3800 may be performed at a different location, such as a fleet controller. The method 3800 may be used to determine a physical friction vector employed as discussed with respect to the method 3700 shown in FIG. 37.

A request to determine a physical friction vector for an autonomous mobile robot is received at 3802. In some embodiments, the request may be generated periodically or upon detection of a triggering condition. For instance, the request may be generated when a designated number of operating hours elapses.

Input information for input vectors applied to the drive assembly is determined at 3804. In some embodiments, the input information may include recent or current data that includes a set of observations for input vectors applied to the drive assembly over time. Such information may be stored at the robot itself and/or at a remote computing device.

At 3806, output information indicating motion of the autonomous mobile robot is determined. In some implementations, the output information may include values for velocity realized by the autonomous mobile robot in response to the input vectors identified at 3804.

A model of the autonomous mobile robot is determined at 3808 based on the input information, the output information, and a model specification. According to various embodiments, any of a variety of model specifications may be used. For instance, a polynomial model may represent values such as force, acceleration, velocity, mass, Coulomb friction, and the like. The model specification may then be applied to the input and output information and solved to determine an estimated friction vector.

A physical friction vector is determined at 3810. According to various embodiments, the physical friction vector may be determined based on the model determined at 3808. For instance, the model determined at 3808 may include friction as a parameter that is solved for.

In some embodiments, the friction vector may be represented as a single value. Alternatively, the friction vector may include multiple values, for instance corresponding to rotational and translational movement.

CONCLUSION

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of industrial autonomous mobile robots configured for operation in a warehouse settings. However, the techniques of the present invention apply to a wide variety of autonomous mobile robots configured for operation in a wide variety of settings. Particular embodiments may be implemented without some or all of the specific details described herein. In other instances, well known process operations have not been described in detail in order not to unnecessarily obscure the present invention. Accordingly, the breadth and scope of the present application should not be limited by any of the implementations described herein, but should be defined only in accordance with the claims and their equivalents.

The invention claimed is:

1. A computing system configured as a fleet controller for a plurality of autonomous mobile robots operating within a physical environment, the computing system comprising:
   a communication interface configured to receive sensor data from an autonomous mobile robot of the plurality of autonomous mobile robots, the sensor data including image data captured by a plurality of visible light cameras located on the autonomous mobile robot;
   an environment mapper configured to determine a global scene graph representing the physical environment based at least in part on the sensor data, the global scene graph identifying navigable regions of the physical environment;
   a workflow coordinator configured to determine a workflow based on the global scene graph, the workflow including a plurality of tasks to be performed within the physical environment by the autonomous mobile robots in cooperation with a human, the plurality of tasks including autonomously following the human, wherein the autonomous mobile robot includes a handlebar and a force sensor configured to detect a translational force and a rotational force exerted on the handlebar; and
   a route planner configured to determine routing information for the autonomous mobile robot, the routing information including a nominal route from a source location to a destination location, the autonomous mobile robots being configured to autonomously navigate the physical environment to execute the plurality of tasks based at least in part on the routing information when in an autonomous mode, the autonomous mobile robot including a mechanical drive unit configured to move the autonomous mobile robot in a direction determined based on the translational force and the rotational force when in a manual mode, the autonomous mobile robot being configured to autonomously enter the manual mode.

2. The computing system recited in claim 1, wherein the physical environment is a warehouse, and wherein the workflow involves retrieving or replenishing a plurality of items stored in the warehouse.

3. The computing system recited in claim 2, wherein the plurality of tasks includes autonomously navigating the warehouse in coordination with the human to facilitate transfer of the plurality of items between a plurality of storage locations in the warehouse and the one or more autonomous mobile robots.

4. The computing system recited in claim 3, wherein the plurality of tasks includes activating one or more lighting elements at the one or more autonomous mobile robots to indicate a location of an item of the plurality of items.

5. The computing system recited in claim 3, wherein the plurality of tasks includes instructing two or more of the plurality of autonomous mobile robots to act together as a virtual pick wall or a virtual put wall.

6. The computing system recited in claim 2, wherein the plurality of tasks includes receiving scanner data or weight sensor data indicating that an item of the plurality of items has been scanned or moved by the human.

7. The computing system recited in claim 1, wherein the autonomous mobile robot is configured to update a local scene graph representing the physical environment based at least in part on the sensor data, and wherein autonomously navigating the physical environment involves avoiding obstacles based on the local scene graph.

8. The computing system recited in claim 1, wherein the nominal route includes a plurality of waypoints indicated within the global scene graph and corresponding to locations in the physical environment.

9. The computing system recited in claim 1, wherein the global scene graph is determined based on a knowledge map that represents locations of elements within the physical environment over time.

10. The computing system recited in claim 1, wherein the mechanical drive unit is holonomic, omnidirectional, and backdriveable.

11. The computing system recited in claim 1, wherein the autonomous mobile robot switches to the manual mode upon detecting human presence.

12. The computing system recited in claim 1, wherein the autonomous mobile robot switches to the manual mode upon determining that a human has grasped the handlebar.

13. The computing system recited in claim 1, wherein the mechanical drive unit includes a first drive unit and a second drive unit, each of the first drive unit and the second drive unit including a respective powered first wheel and a respective powered second wheel offset from a respective axis, each of the first drive unit and the second drive unit freely rotating around the respective axis.

14. The computing system recited in claim 1, wherein moving the autonomous mobile robot when in the manual mode comprises determining a force vector that multiplies the translational force and the rotational force by a force multiplier.

15. A method of operating a computing system configured as a fleet controller for a plurality of autonomous mobile robots operating within a physical environment, the computing system, the method comprising:
- receiving sensor data at a communication interface from an autonomous mobile robot of the plurality of autonomous mobile robots, the sensor data including image data captured by a plurality of visible light cameras located on the autonomous mobile robot;
- determining a global scene graph representing the physical environment based at least in part on the sensor data, the global scene graph identifying navigable regions of the physical environment;
- determining a workflow based on the global scene graph via a workflow coordinator, the workflow including a plurality of tasks to be performed within the physical environment by the autonomous mobile robot in cooperation with a human, the plurality of tasks including autonomously following the human, wherein the autonomous mobile robot includes a handlebar and a force sensor configured to detect a translational force and a rotational force exerted on the handlebar;
- determining routing information for the autonomous mobile robot, the routing information including a nominal route from a source location to a destination location, the autonomous mobile robot being configured to autonomously navigate the physical environment to execute the plurality of tasks based at least in part on the routing information when in an autonomous mode, the autonomous mobile robot including a mechanical drive unit configured to move the autonomous mobile robot in a direction determined based on the translational force and the rotational force when in a manual mode, the autonomous mobile robot being configured to autonomously enter the manual mode; and
- transmitting workflow instructions indicating the workflow and the routing information to the one or more autonomous mobile robots.

16. The method recited in claim 15, wherein the physical environment is a warehouse, and wherein the workflow involves retrieving or replenishing a plurality of items stored in the warehouse, and wherein the plurality of tasks includes autonomously navigating the warehouse in coordination with the human to facilitate transfer of the plurality of items between a plurality of storage locations in the warehouse and the one or more autonomous mobile robots.

17. The method recited in claim 15, wherein the autonomous mobile robot is configured to update a local scene graph representing the physical environment based at least in part on the sensor data, and wherein autonomously navigating the physical environment involves avoiding obstacles based on the local scene graph.

18. One or more non-transitory computer readable media having instructions stored thereon for performing a method of operating a computing system configured as a fleet controller for a plurality of autonomous mobile robots operating within a physical environment, the computing system, the method comprising:
- receiving sensor data at a communication interface from an autonomous mobile robot of the plurality of autonomous mobile robots, the sensor data including image data captured by a plurality of visible light cameras located on the autonomous mobile robot;
- determining a global scene graph representing the physical environment based at least in part on the sensor data, the global scene graph identifying navigable regions of the physical environment;
- determining a workflow based on the global scene graph via a workflow coordinator, the workflow including a plurality of tasks to be performed within the physical environment by the autonomous mobile robot in cooperation with a human, the plurality of tasks including autonomously following the human, wherein the autonomous mobile robot includes a handlebar and a force sensor configured to detect a translational force and a rotational force exerted on the handlebar;
- determining routing information for the autonomous mobile robot, the routing information including a nominal route from a source location to a destination location, the autonomous mobile robot being configured to autonomously navigate the physical environment to execute the plurality of tasks based at least in part on the routing information when in an autonomous mode, the autonomous mobile robot including a mechanical drive unit configured to move the autonomous mobile robot in a direction determined based on the translational force and the rotational force when in a manual mode, the autonomous mobile robot being configured to autonomously enter the manual mode; and
- transmitting workflow instructions indicating the workflow and the routing information to the one or more autonomous mobile robots.

19. The one or more non-transitory computer readable media recited in claim 18, wherein the physical environment is a warehouse, and wherein the workflow involves retrieving or replenishing a plurality of items stored in the warehouse, and wherein the plurality of tasks includes autonomously navigating the warehouse in coordination with the human to facilitate transfer of the plurality of items between a plurality of storage locations in the warehouse and the one or more autonomous mobile robots.

20. The one or more non-transitory computer readable media recited in claim 18, wherein the autonomous mobile robot is configured to update a local scene graph representing the physical environment based at least in part on the sensor data, and wherein autonomously navigating the physical environment involves avoiding obstacles based on the local scene graph.

* * * * *